United States Patent
Wnek et al.

(10) Patent No.: US 7,019,271 B2
(45) Date of Patent: Mar. 28, 2006

(54) INSULATING MICROWAVE INTERACTIVE PACKAGING

(75) Inventors: Patrick H. Wnek, Sherwood, WI (US); Terrence P. Lafferty, Winneconne, WI (US); Richard G. Robison, Appleton, WI (US); Lorin R. Cole, Larsen, WI (US); Brian R. O'Hagan, Appleton, WI (US); Scott W. Middleton, Oshkosh, WI (US)

(73) Assignee: Graphic Packaging International, Inc., Marietta, GA (US)

( * ) Notice: Subject to any disclaimer, the term of this patent is extended or adjusted under 35 U.S.C. 154(b) by 0 days.

(21) Appl. No.: 10/501,003

(22) PCT Filed: Feb. 7, 2003

(86) PCT No.: PCT/US03/03779

§ 371 (c)(1),
(2), (4) Date: Mar. 7, 2005

(87) PCT Pub. No.: WO03/066435

PCT Pub. Date: Aug. 14, 2003

(65) Prior Publication Data

US 2005/0173425 A1 Aug. 11, 2005

Related U.S. Application Data

(60) Provisional application No. 60/355,149, filed on Feb. 8, 2002.

(51) Int. Cl.
*H05B 6/80* (2006.01)
*B65D 81/34* (2006.01)

(52) U.S. Cl. .................. 219/730; 219/732; 219/734; 426/107; 426/234; 99/DIG. 14

(58) Field of Classification Search ........ 219/725–735, 219/759, 762; 426/107, 109, 118, 234, 241, 426/243; 99/DIG. 14
See application file for complete search history.

(56) References Cited

U.S. PATENT DOCUMENTS

| 3,098,583 | A | 7/1963 | Skees |
| 4,132,811 | A | 1/1979 | Standing et al. |
| 4,641,005 | A | 2/1987 | Seiferth ............ 219/10.55 E |
| 4,786,513 | A | 11/1988 | Monforton et al. ......... 426/107 |
| 4,825,025 | A | 4/1989 | Seiferth ............ 219/10.55 E |

(Continued)

FOREIGN PATENT DOCUMENTS

WO    WO 91/07861    5/1991

*Primary Examiner*—Philip H. Leung
(74) *Attorney, Agent, or Firm*—Womble Carlyle Sandridge & Rice, PLLC

(57) ABSTRACT

The combination of insulating material with microwave interactive food packaging for enhanced cooking properties is disclosed. An insulating microwave packaging material (200) and a method of making the same are also disclosed. In one embodiment, the insulating microwave packaging material (200) is formed by bonding a microwave interactive material substrate (205) that creates sensible heat upon exposure to microwave energy to a second substrate (210) along bond lines (212) arranged in a pattern to form closed cells (214). Upon impingement of the insulating microwave packaging material (200) by microwave energy in a microwave oven, the closed cells (214) expand to form insulating pockets (216). One side of the insulating pocket (216) bulges and lofts above the opposite side. When a food product is situated on the insulating microwave packaging material (200), the insulating pockets (216) insulate the food product from the microwave oven environment.

130 Claims, 26 Drawing Sheets

U.S. PATENT DOCUMENTS

| | | | |
|---|---|---|---|
| 4,865,921 A | 9/1989 | Hollenberg et al. | 428/461 |
| 4,883,936 A | 11/1989 | Maynard et al. | 219/10.55 F |
| 4,943,456 A | 7/1990 | Pollart et al. | 428/34.3 |
| 5,003,142 A | 3/1991 | Fuller | |
| 5,077,455 A | 12/1991 | Peleg et al. | 219/10.55 E |
| 5,081,330 A | 1/1992 | Brandberg et al. | |
| 5,177,332 A | 1/1993 | Fong | |
| 5,180,894 A | 1/1993 | Quick et al. | 219/10.55 E |
| 5,217,768 A | 6/1993 | Walters et al. | 428/35.8 |
| 5,230,914 A | 7/1993 | Akervik | 426/107 |
| 5,260,536 A | 11/1993 | Peery | 219/10.55 E |
| 5,317,118 A | 5/1994 | Brandberg et al. | 219/727 |
| RE34,683 E | 8/1994 | Maynard et al. | 219/703 |
| 5,338,921 A | 8/1994 | Maheux et al. | 219/730 |
| 5,630,959 A | 5/1997 | Owens | 219/730 |
| 6,093,920 A | 7/2000 | Beckwith | 219/734 |
| 6,133,560 A | 10/2000 | Zeng et al. | 219/730 |
| 6,204,492 B1 | 3/2001 | Zeng et al. | 219/728 |
| 6,303,913 B1 | 10/2001 | Bono et al. | 219/730 |
| 6,414,290 B1 | 7/2002 | Cole et al. | 219/759 |

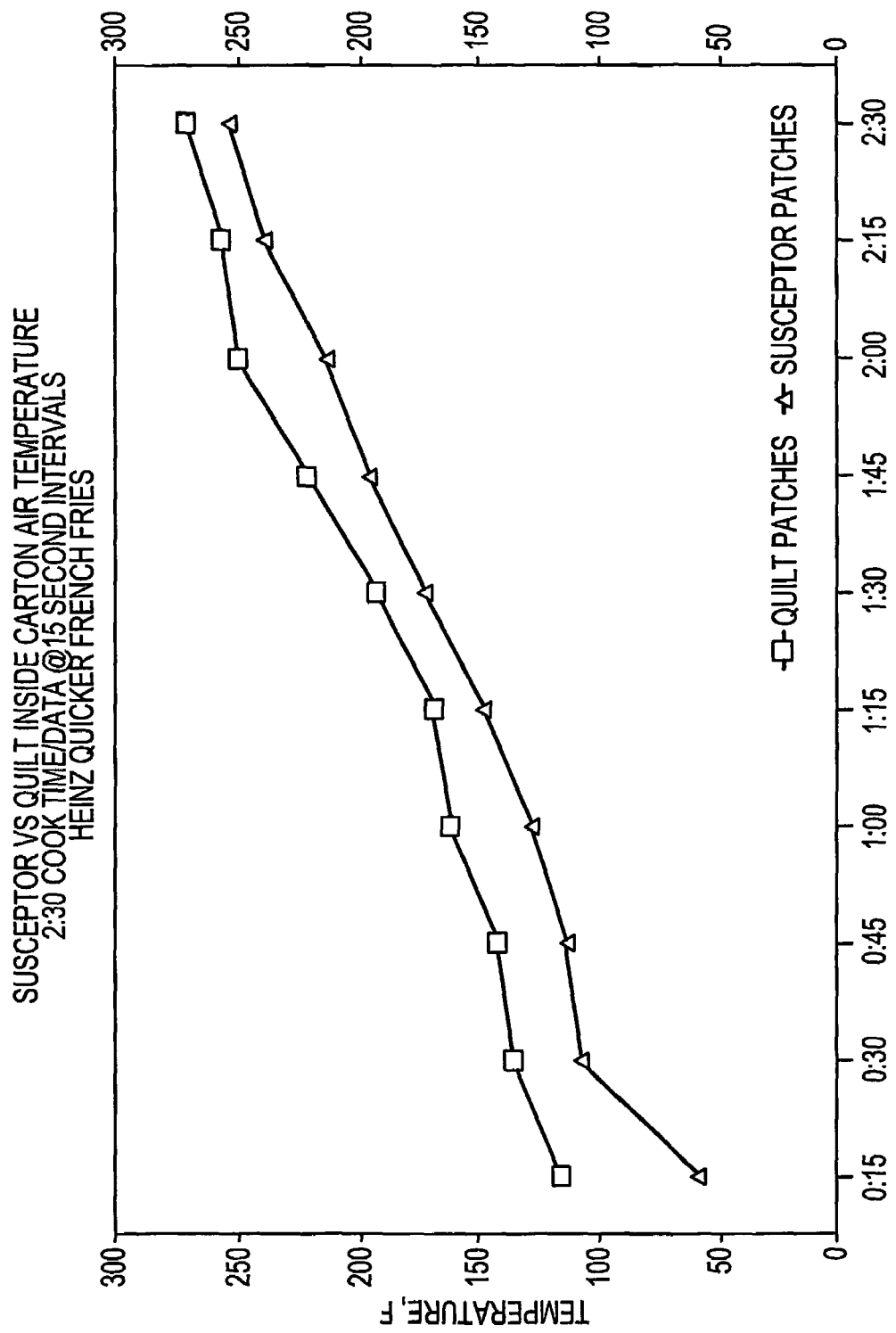

INSULATING MICROWAVE INTERACTIVE PACKAGING

CROSS REFERENCE TO RELATED APPLICATIONS

This application claims the benefit of priority of U.S. provisional patent application No. 60/355,149 filed 8 Feb. 2002, entitled "Vented and Insulated Microwavable Packaging for Improved Cooking and Enhanced Consumer Use," which is hereby incorporated by reference as though fully set forth herein.

BACKGROUND OF THE INVENTION

1) Field of the Invention

This invention relates generally to the field of microwave packaging for food products and more specifically to the insulation of microwave packaging materials, including microwave interactive packaging material.

2) Description of Related Art

Many combinations of materials of different character have been combined in microwave packaging to influence the cooking effect of the microwave energy on food products. These microwave packaging materials may be either microwave transparent, for example, paper, paperboard, or many plastics, or they may be microwave interactive, for example, metal foils or thin metal deposits. Microwave transparent materials generally provide, for example, food product support, packaging form, insulation, and vapor barrier functions in packaging. Microwave interactive materials generally provide, for example, enhanced surface heating, microwave shielding, enhanced microwave transmission, and energy distribution functions in packaging. Microwave packaging is generally created and configured for a particular food product or type of food product using materials chosen to best exploit the cooking ability of a microwave oven with respect to that food product.

For example, a microwave package design primarily for heating corn kernels to create popcorn is disclosed in U.S. Pat. No. 4,943,456 issued to Pollart et al. (the '456 patent). The '456 patent describes a package constructed of an inner bag of polyester and an outer bag of paper. A microwave heating element is printed on either the inner surface of the outer bag or the outer surface of the inner bag, such that the heating element resides between the two bags. The heater element may be a solid area or patterned, as in a grid. The outer surface of the inner bag and the inner surface of the outer bag are laminated together. When the area of the heater element is bonded to the opposing bag by fully laminating the bags together, the outer paper bag scorches or ignites during microwave heating. By laminating the inner and outer bags together in the area of the heater element using only a pattern of adhesive between the bags (e.g., a dotted or grid adhesive pattern) the outer paper bag does not scorch during cooking.

In another example of microwave packaging design disclosed in U.S. Pat. No. 5,338,921 issued to Maheux et al. (the '921 patent), an improvement was made to the use of metallized plastic film in surface heating, browning, and crisping of food products. It was found that uneven heating of the metallized film occurred when the film was completely laminated to a stiff substrate backing. The '921 patent describes sealing a sheet of the metallized film to the substrate only at the periphery of the sheet, and further ensuring that the major area of the sheet hangs loose from the substrate such that it traps a large air pocket between the sheet and the substrate. In this manner, convection currents in the air pocket are allowed to form and thus distribute the heat generated by the metallized film more evenly across the entire surface of the metallized film sheet.

While improvements to the use of susceptor technology (the "heater" and "metallized film" discussed in the '456 patent and '921 patent, respectively) have been made as discussed above, the microwave packaging designs may still not achieve optimal performance of the susceptors. For example, with respect to the popcorn bag of the '456 patent, the susceptor area is generally placed against the bottom surface of the microwave oven during cooking so the popcorn kernels are situated against the susceptor to receive the maximum possible heat transfer. In this configuration, the base of the microwave oven is also adjacent to the susceptor. Much of the heat generated by the susceptor is therefore transferred to the microwave oven surface (e.g., the glass turntable or floor) and not to the popcorn kernels. The microwave oven environment is actually a large heat sink, impacting the efficiency of the ability of the susceptor to heat the food. The cavity of air within the microwave oven is also constantly ventilated by a fan and creates a cooling effect while the microwave oven is in operation.

In the design disclosed in the '921 patent, the placement of the susceptor material is in the top panel of the packaging. In this case, the susceptor is generally separated from the food product to be cooked by a gap between the top of the food in the package and the top of the package where the susceptor is placed. Thus the ability of the susceptor to heat the food is diminished because the susceptor is not in contact with or very close to the surface of the food product. In fact, the air gap between the food and susceptor actually acts as an insulator and prevents the maximum possible heating of the food product by the susceptor from occurring. In some situations, even if the susceptor material is originally against the food product when initially packaged, the food may actually shrink or change shape during cooking, for example, if originally frozen, and the susceptor material loses contact with the food product, impacting the ability of the susceptor to brown and crisp the food product.

The information included in this Background section of the specification, including any references cited herein and any description or discussion thereof, is included for technical reference purposes only and is not to be regarded as essential subject matter upon which the claims of the present application depend for support, by which the scope of the invention is to be bound, or upon which this application depends for adequate disclosure of the invention.

SUMMARY OF THE INVENTION

The present invention enhances the cooking ability of microwave interactive materials in microwave packaging and provides additional consumer benefits through the addition of insulating materials to the configuration of microwave packaging. Particularly, by insulating around susceptor material and retaining heat generated by the susceptor, increased browning and crisping, as well as moisture retention, are achieved. Several unique new designs for microwave packaging materials involving the combination of microwave transparent and microwave interactive materials that achieve several new and beneficial results are disclosed. In one aspect of the invention, the disclosed microwave packaging provides greater surface heating for a food product and insulation from the effects of the heat sinks found in the microwave oven environment. In another aspect, insulation surrounding microwave interactive packaging provides consumer protection and convenience as added benefits.

An insulating microwave packaging material and a method of making the same is disclosed. The insulating microwave packaging material is formed by adhering a microwave interactive substrate that creates sensible heat to a second substrate in a pattern bond creating closed cells. Upon impingement of the insulating microwave packaging material by microwave energy in a microwave oven, moisture trapped in either the first microwave interactive substrate or the second substrate heats, expands, and escapes, creating pressure that expands the closed cells to form vapor pockets. The microwave interactive substrate bulges under the vapor pressure while the second substrate contracts to enhance the bulging effect on the cell and create the pocket.

In one particular embodiment the microwave interactive substrate may be formed by creating a metallized polyester film, i.e., a susceptor film (generally by depositing a thin layer of aluminum on a sheet of polyester). This metallized polyester film is then bonded to a paper substrate to create a susceptor. The susceptor is then bonded to a second polyester film, preferably biaxially-oriented, clear polyester, along bond lines arranged in a pattern to form closed cells. The closed cells are substantially vapor impermeable.

Simultaneously, the sensible heat generated by the susceptor heats and softens the polyester film of the susceptor, decreasing the resistance of the susceptor to the expansion of the moisture and the formation of the vapor pocket. Additionally, the second polyester film, which is not metallized, also heats because of its proximity to the susceptor. Because it is biaxially-oriented, the second polyester film contracts along its length and width, attempting to return to its original form before stretching. The second polyester layer remains substantially flat rather than lofting. Yielding to the pressure of the expanding water vapor, in each cell the softened susceptor layer bulges opposite the second polyester film layer forming pillow-like pockets on the susceptor side of the microwave packaging material. The contraction of the second polyester layer works in conjunction with the bulging of the susceptor to enhance the loft of the pillow-like side of the cells.

The loft obtained by the vapor expansion in the cells and the polyester film contraction is generally at least an order of magnitude greater than the original separation between the susceptor and the second sheet of polyester film, and in some cases has been observed to be 30 times more than the original thickness of the microwave packaging material. When a food product is situated on the pillow-like side of the insulating microwave packaging material, the vapor pockets insulate the food product from the microwave oven to reduce heat transfer between the food product and the microwave oven environment, e.g., the air in the oven cavity and the oven floor or turntable surface. The amount of loft may be varied by choosing paper with higher or lower moisture content or otherwise introducing and trapping moisture in the cells during the manufacturing process.

The pattern of bond lines forming the closed cells of the insulating microwave packaging material generally define an array of shapes. Such shapes may be, for example, circles, ovals, other curvilinear shapes, preferably symmetrical, triangles, squares, rectangles, hexagons, and other polygons, including right polygons and equilateral polygons. The shapes in the array are preferably nested with adjacent shapes in the array in a tile-like pattern. In an alternative embodiment, the shapes may be elongate and arranged in parallel with the long sides of each adjacent shape next to each other. The pattern of bond lines may be formed by the application of adhesive on the paper substrate side of the susceptor to bond the susceptor with the second polyester film. In one embodiment, the susceptor film may be selectively deactivated in the same pattern as the adhesive bond lines. By deactivating the susceptor film in these areas, the adhesive bond may be stronger because the adhesive is not directly subjected to the extreme heat generated by the susceptor film. In another embodiment, by selectively deactivating the susceptor film in coordination with the bond patterns, a consumer-friendly product is created as the bond pattern areas are cooler to the touch than other areas of the packaging material. Thereby the packaging material may be easily handled by the user after microwave heating.

In one embodiment of the invention, the insulating microwave packaging material is used within a carton. A first sheet of the insulating microwave packaging material is affixed to the top surface of the carton in a manner allowing the first sheet to contract in at least on of the X and Y directions upon microwave heating. Similarly, a second sheet of insulating microwave packaging material is affixed to the bottom surface in a manner allowing the second sheet to likewise contract in at least on of the X and Y directions upon exposure microwave energy. The sheets may be cut along their perimeters to form slits that augment the ability of the sheets to contract in the X and Y directions.

In one embodiment, a sheet of the insulating microwave packaging material is folded over and the two opposing edges brought into contact are bonded together, for example, with adhesive or by heat sealing the edges. The microwave packaging material thereby forms a sleeve for surrounding the food product. The susceptor layer generally forms the interior surface of the sleeve. When exposed to microwave energy, the cells expand inward toward the food product ensuring the susceptor contacts all the surfaces of the food product. At the same time, that portion of the microwave packaging material resting on the cooling platform in the microwave oven provides improved insulation from the floor or turntable of the microwave oven by the vapor in the cells.

In a another embodiment of the invention, two sheets of the insulating microwave packaging material are placed back to back and bonded together at several points, generally around the perimeters of the sheets. In this embodiment, the second clear polyester film sides of the sheets may be together, while the susceptor sides of the sheets face outward. By only bonding the sheets together at a few places, for example, on the corners if the sheets are square or rectangular, there is still freedom of movement for contraction of the second clear polyester film layers in the X-Y dimensions upon heating. In this embodiment, the sheets further deform on a macro scale to form opposing convex canopies with an air space in between, providing additional insulation from the microwave oven. Further, the combination of two sheets helps ensure the cell expansion of the top sheet, for example, when the food product to be heated is frozen. In such an instance, the susceptor of the bottom sheet helps heat the top sheet to ensure it reaches a high enough temperature early in the cooking process for the cells in the top sheet to expand.

In a similar embodiment, the bottom side of a pouch formed of the insulating microwave packaging material may be augmented by the addition of a sheet of the insulating microwave packaging material. In this configuration, the susceptor layer forms the interior walls of the pouch. The second clear polyester layer of the sheet is placed against the clear polyester layer on the bottom side of the pouch and adhered in locations to minimize any restriction of movement by the sheet in the X-Y dimensions. Alternatively, the pouch may be merely a susceptor pouch with a sheet of insulating microwave packaging material attached to the bottom side of the pouch. The interior of the pouch is lined with a susceptor film, and again the susceptor layer of the sheet is oriented toward the floor or turntable of the microwave oven. The insulating microwave packaging sheet enhances the cooking ability of the susceptor pouch by insulating it from the heat sink of the microwave oven floor or turntable.

In a further embodiment of the invention, the dual sheet configuration of the microwave packaging material described above is combined with any of several known baking substrates. In a preferred example, an aperture is formed in an abuse-tolerant microwave baking substrate and one or two sheets of the insulating microwave packaging material are arranged to cover the aperture. In this manner, the insulating microwave packaging material of the present invention provides increased insulation between a portion of the food product and the microwave oven surface and increased contact between the susceptor and the and that portion of the food product.

In yet another embodiment of the invention, a layer of an amorphous polyester is pattern bonded along bond lines creating closed cells to a paperboard substrate. A susceptor film is laminated to the opposite side of the paperboard substrate. Upon heating, the heated water vapor escapes from the paperboard creating pressure in the cells on the layer of amorphous polyester. The amorphous polyester expands and each cell forms a pillow-like bump on the surface on the paperboard. The bond lines may be designed to form cells of very small area to create a surface of very small bumps over the paperboard upon heating. This surface may be used to insulate the consumer from hot packaging when holding the food product in the package after cooking.

In a further embodiment, a microwave package combines a carton form and a pouch formed of microwave interactive material, for example a susceptor or the insulating microwave packaging material of the present invention. The carton form has a base with a central fold line, a first side wall hinged to the base along a first fold line, and a second side wall hinged to the base along a second fold line. The pouch is supported by the carton form and positioned between the base, the first side wall, and the second side wall. The carton form and the pouch may be alternately folded flat and erected to open the pouch. When the carton form is erected by opening the folded base into a V-form, the base may be inverted and the carton form is braced open by the base which is held open in tension between the first side wall and the second side wall. The first fold line and the second fold line may be convexly curved so that, upon inverting, the base of the carton form assumes a concavely curved form with the first side wall and the second side wall of the carton form bowed or convexly curved. The pouch may be affixed to the first side wall and the second side wall of the carton form, for example, by adhesive.

In another embodiment of the invention, a microwave cooking container is provided where the body of the container includes a microwave interactive material The body has a first end containing an aperture and a second end also containing an aperture. A food product is at least partially surrounded by the body. The first end provides a foundation for maintaining the container in an upright position when the first end is placed upon a surface. The first aperture in the first end is positioned to be exposed to a source of air in a cooking environment when the first end is placed upon the surface. A draft is created during a cooking cycle in a microwave oven wherein air is ported through the aperture in the first end and vented through the aperture in the second end.

Other features, utilities and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 9A is an isometric view of a closed pouch of insulating microwave interactive packaging material according to another embodiment of the present invention.

FIG. 21 is a chart depicting the differences in temperature during a heating cycle inside a package alternately lined with a regular susceptor material and the insulating susceptor material of the present invention.

DETAILED DESCRIPTION OF THE INVENTION

This invention enhances the ability of microwave interactive packaging to improve microwave cooked food quality, when that quality relates to surface browning (i.e., the Maillard reaction), crisp texture, and internal moistness, through the insulation of the microwave interactive packaging. Certain types of microwave interactive material, for example, susceptor material, utilizes microwave electromagnetic energy to generate package surface heat. The metallized, thin-film susceptor is a poor electrical conductor and generates heat like any resistance heater. The purpose of microwave susceptor packaging is to create surface heat to brown and crisp food product that it contacts during the microwave cooking process.

Through the addition of an insulating material surrounding the susceptor, more of the sensible heat generated by the susceptor is transferred to the surface of the food product rather than to the microwave oven environment. Without the insulating material, much of the heat generated by the susceptor is lost via conduction into the surrounding air and other conductive media, such as the microwave oven floor. When more of the sensible heat generated by the susceptor is directed to the food product, browning and crisping results are enhanced.

It is also important to retain moisture present in food when cooling in the microwave oven. Typical consumers complaints of "rubber microwave food" or edges hard as a rock are the result of moisture loss. The insulation works with the susceptor package to help retain more moisture and thus enhance food texture and flavor.

Examples of typical microwave packages with susceptors include a paper pouch lined with a susceptor film and a paperboard sleeve lined with a susceptor film. Insulating material for surrounding these microwave packages may be provided by many materials. Examples include cloth, paper towels, non-woven substrates, corrugated paper and paperboard, quilted paper and towels, heat resistant multi-layer films formed with air pockets (e.g., bubble wrap and the insulating microwave packaging material disclosed herein), glass fiber, air cell foams, air cell gels, air cell rubber, cook-in cartons designed to retain heat, and any other material that can surround the susceptor and create a heat barrier.

Some examples of typical food items that benefit from susceptor packaging (either paper or paperboard construction) are: raw dough or partially baked dough foods, for example, pizza, filled pastry sandwiches and "finger" foods, waffles, crusted pies (fruit or meat), egg rolls, calzones, tacos, and pastry puffs; and "fried" foods, for example, whole muscle and processed meats (e.g., fish and poultry) and other items like French fries, cheese, mushrooms, and vegetables.

Insulation of Microwave Packaging Materials

Figure 1A:
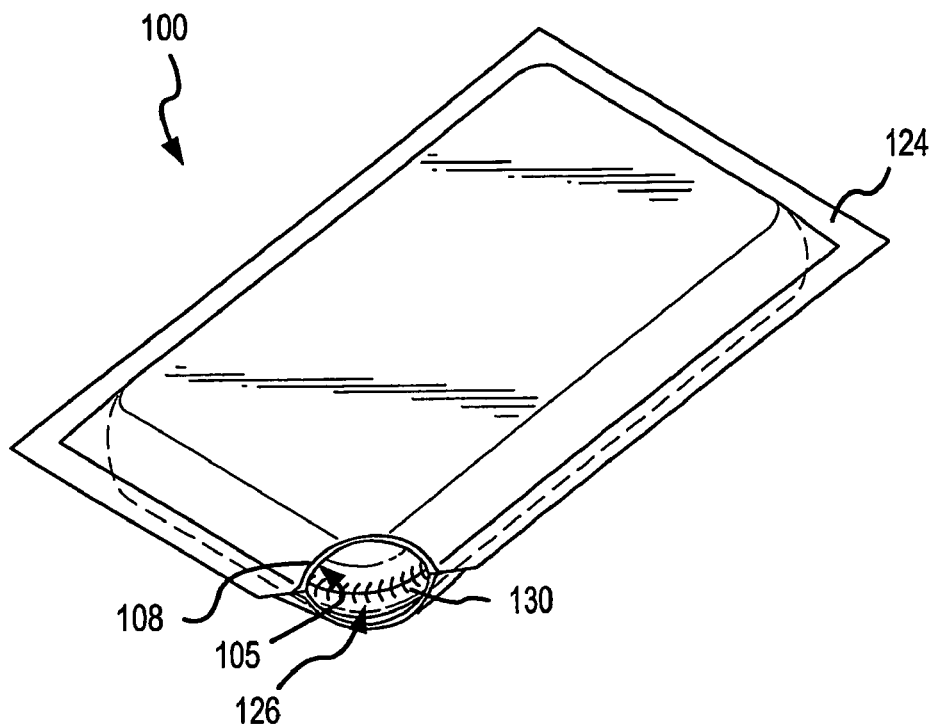
FIG. 1A is an isometric view of a food product packaged in a vented package of microwave interactive material.

As depicted in FIG. 1A, a food product 130, for example, a calzone, is placed within a microwave interactive pouch package 100 for cooking. The microwave interactive pouch package 100 may be a paper pouch 108 lined on the interior side with a susceptor film 105. In this configuration, the susceptor film 105 is placed adjacent to the food product 130 to promote browning and crisping of the pastry shell. The paper 108 provides a dimensionally stable substrate to support the susceptor film 105.

The microwave interactive package 100 may also be designed to hold moisture so the food product 130 does not dry out and harden, especially on the edges. In order to retain moisture, the edges 124 of the microwave interactive package 100 are sealed, for example, with a heat seal wherein the opposing sides of the interior of the pouch lined with susceptor film 105 are laminated around the edges 124. However, the food product 130 should not be cooked with the pouch 100 completely sealed because the pouch may inflate from water vapor released by the food product 130 during cooking, causing the susceptor film 105 to lose contact with the surface of the food product 130. To prevent such inflation, a small vent opening 126 may be cut in the pouch 100, for example, in a corner, to allow some small "controlled" venting to occur. However, some moisture retention may be desirable to prevent the food product 130 from drying out during the cooking process. Therefore, a balance must be struck to prevent excessive vapor venting.

Figure 1C:
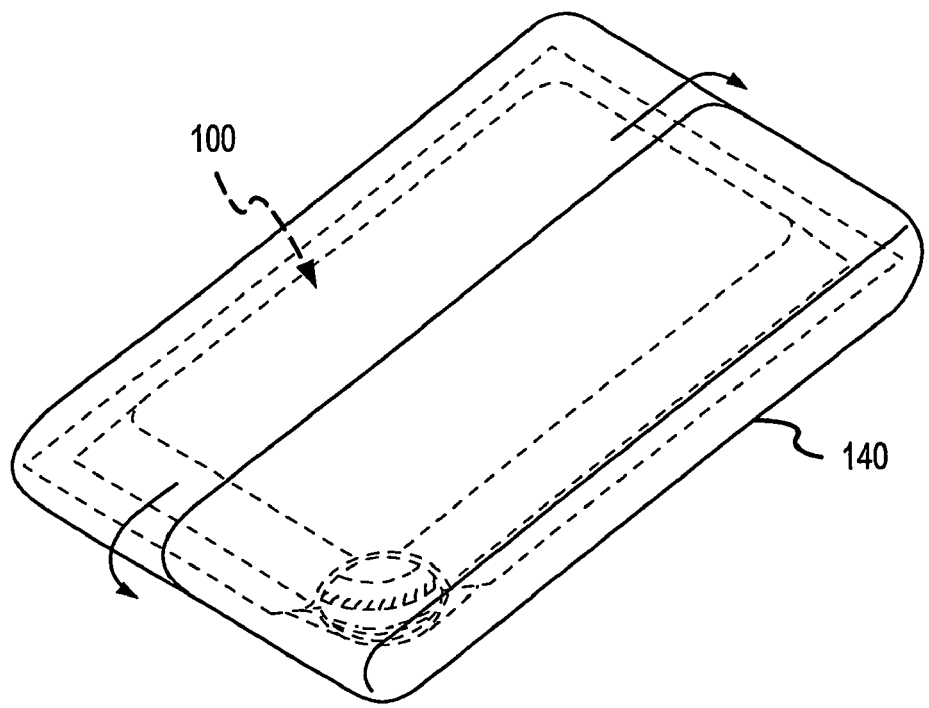
FIG. 1C is an isometric view of the vented package of FIG. 1A surrounded by an insulating material.
Figure 1B:
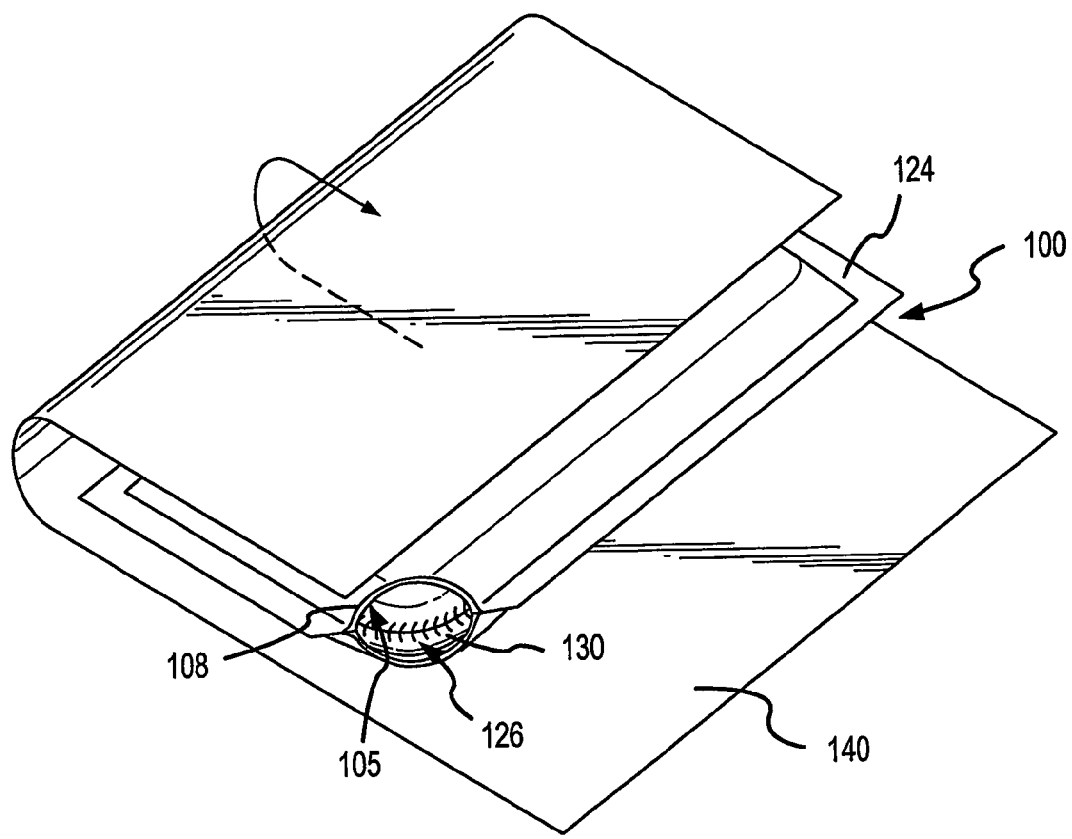
FIG. 1B is an isometric view of the vented package of FIG. 1A in the process of being surrounded by an insulating material.

Next, an insulating material 140 is placed around the microwave interactive pouch 100 by, for example, folding the insulating material 140 as indicated by the arrows shown in FIGS. 1B and 1C. The insulating material 140 may be as simple as a paper towel. The insulating material 140 is folded over and around all sides of the pouch 100, including over the vent opening 126, to surround the microwave interactive packaging 100. The insulating material 140 may completely surround the packaging 100, or it may be selectively placed on or around portions of the packaging 100 to achieve any particular desired insulating effect. The insulating material 140 may further be moistened, for example, by dampening with water, to prevent excessive moisture loss and extend the cooking time available for the susceptor to brown and crisp the surface of the food product.

Experimentation

Experiments were conducted to verify the enhanced cooking effects achieved by adding insulation to microwave interactive packaging during the microwave cooking process. In one experiment, two calzones were placed in paper cooking pouches lined with susceptor film, similar to the pouch depicted in FIG. 1A. The purpose of this experiment was to determine if browning and crisping of a calzone can be enhanced by utilizing insulation around the susceptor-lined cooking pouch during the microwave cooking process. Pouches were used for this test (instead of paperboard sleeves) because of the ability of a pouch to conform better to the irregular shape of the calzone product. The edges of the pouches were heat sealed and a vent opening was cut in a corner of each pouch. The first pouch was then wrapped in a paper towel, similar to the depictions in FIGS. 1B and 1C, to provide insulation around the cooking pouch. The second pouch was not insulated and was placed in the microwave oven following the package instructions to place the food product directly into the microwave oven on a plate.

Frozen calzones were cooked in the pouches for 2 minutes and 30 seconds. The calzones were then removed from the pouches and subjective measurements were recorded. The first calzone cooked in the pouch insulated by the paper towel resulted in a much crisper outer pastry surface and enhanced browning than the second calzone that was not insulated during cooking. The surface of the calzone cooked in the insulated pouch reflected light (i.e., was shiny) indicating a glazed crispness whereas the second calzone absorbed light indicating soft, soggy, porous surface. These results indicate browning and crisping are improved by using an insulating "wrap" over susceptor cooking packages.

Two pizzas were cooked in a microwave oven under similar circumstances. The first pizza was placed on a standard susceptor covered paper baking tray and was then wrapped in paper towels. The second pizza was also placed on a standard susceptor covered paper baking tray without the addition of insulating material. The crust on the bottom and edges of the first pizza cooked using insulation achieved greater browning and crisping than the second "control" pizza.

In a further experiment, a raw dough fruit pie was placed in a MicroFlex®Q (Graphic Packaging Corporation, Golden, Colo.) microwave cooking pouch that completely surrounded the pie crust. A MicroFlex®Q pouch is made of two paper-backed susceptor film sheets, wherein the edges of the sheets are sealed together to form a pouch. The susceptor film of one of the sheets is formed in a grid pattern, wherein the gridlines are devoid of metallization, in order to reduce browning effects of the susceptor film. The side of the pouch with the grid susceptor is usually placed on the top side of the pie to prevent an overdone top crust. The pouch with the pie was then placed in a plain paperboard pie tray for support. The tray and pie were then completely wrapped three times with a paper towel for insulation. The insulation wrapped pie was then placed in a microwave oven for cooking. The results of this experiment were very positive. The pie crust was crisp and golden after 16 minutes cooking time in a microwave oven.

Another series of experiments was performed cooking Tyson®—Southern Style Chicken Nuggets in a 700 watt microwave oven. In each test, four chicken nuggets were cooked in multiple sessions (four new nuggets were cooked in each session) of varying amounts of time in various packaging configurations for comparison of cooking results. For each cooking session, a number of variables were recorded. These variables included the cooking time of the cooking session; the starting weight of the four nuggets; the weight of the four nuggets after cooking for the indicated time; the calculated weight loss between the before and after cooking weights; the weight loss as a percentage of the original weight; and the internal temperature of the nuggets after cooking for the specified cooking time. These values are set forth in the tables below for each cooking session performed with each packaging configuration. In certain tests, a particular cooking time was repeated for a second session to ensure consistency in results. In addition, comparisons of subjective qualities of cooking results between the tests, for example, levels of browning, crisping, and moisture, were recorded and are set forth below.

Test 1—Control. In Test 1, the chicken nuggets were placed on a paper plate in the microwave oven and cooked without benefit of a susceptor package or insulating covering.

TEST 1

| Cook Time (minutes) | Starting Weight (oz) | Cooked Weight (oz) | Weight Loss (oz) | Percent Weight Loss | Internal Temperature (° F.) |
|---|---|---|---|---|---|
| 0.5 | 1.711 | 1.708 | 0.003 | 0.2% | 78–143 |
| 1.0 | 1.708 | 1.547 | 0.161 | 9.4% | 198–201 |
| 1.5 | 1.726 | 1.405 | 0.321 | 18.5% | 180–192 |
| 1.5 | 1.794 | 1.468 | 0.326 | 18.2% | 184–204 |
| 2.0 | 1.733 | 1.215 | 0.518 | 29.9% | 201–207 |

Test 2—MicroFlex®Q pouch with multiple venting. In Test 2 the chicken nuggets were placed in a pouch made of MicroFlex®Q material. Each side of the pouch was sealed, but each of the four corners of the pouch were cut off to provide vent openings.

TEST 2

| Cook Time (minutes) | Starting Weight (oz) | Cooked Weight (oz) | Weight Loss (oz) | Percent Weight Loss | Internal Temperature (° F.) |
|---|---|---|---|---|---|
| 0.5 | 1.673 | 1.668 | 0.005 | 0.3% | 60–154 |
| 1.0 | 1.724 | 1.610 | 0.114 | 6.6% | 188–198 |
| 1.5 | 1.953 | 1.604 | 0.349 | 17.9% | 182–188 |
| 1.5 | 1.760 | 1.450 | 0.310 | 17.6% | 186–196 |
| 2.0 | 1.749 | 1.254 | 0.494 | 28.2% | 201–203 |

When cooking the chicken nuggets within a susceptor-lined pouch with substantial venting, the internal temperature of the nuggets remained generally constant. However, the nuggets in the pouch lost less weight due to moisture loss during cooking, and therefore were more tender.

Test 3—MicroFlex®Q pouch with single vent. Test 3 was performed similar to Test 2, but only one of the four corners of the pouch was cut for a vent opening.

TEST 3

| Cook Time (minutes) | Starting Weight (oz) | Cooked Weight (oz) | Weight Loss (oz) | Percent Weight Loss | Internal Temperature (° F.) |
|---|---|---|---|---|---|
| 0.5 | 1.786 | 1.779 | 0.007 | 0.39% | 30–165 |
| 1.0 | 1.802 | 1.677 | 0.125 | 6.9% | 174–193 |
| 1.5 | 1.748 | 1.489 | 0.259 | 14.8% | 179–199 |
| 1.5 | 1.774 | 1.552 | 0.222 | 12.5% | 176–199 |

TEST 3-continued

| Cook Time (minutes) | Starting Weight (oz) | Cooked Weight (oz) | Weight Loss (oz) | Percent Weight Loss | Internal Temperature (° F.) |
|---|---|---|---|---|---|
| 2.0 | 2.064 | 1.578 | 0.486 | 23.5% | 178–200 |
| 2.0 | 1.771 | 1.337 | 0.434 | 24.5% | 150–202 |

When cooking the chicken nuggets in a susceptor-lined pouch with only a small amount of venting, the moisture loss, and therefore the weight loss, of the nuggets during cooking was less than in either Test 1 or Test 2. The chicken in this instance was even more moist and tender on the inside, while still achieving a brown and crisp surface.

Test 4—MicroFlex®Q pouch without venting. Test 4 used the same pouches as in Tests 2 and 3, but no vent openings were cut into the pouch.

TEST 4

| Cook Time (minutes) | Starting Weight (oz) | Cooked Weight (oz) | Weight Loss (oz) | Percent Weight Loss | Internal Temperature (° F.) |
|---|---|---|---|---|---|
| 0.5 | 1.746 | 1.743 | 0.003 | 0.2% | 23–107 |
| 1.0 | 1.771 | 1.721 | 0.050 | 2.8% | 163–192 |
| 1.5 | 1.771 | 1.539 | 0.232 | 13.1% | 180–202 |
| 1.5 | 1.727 | 1.508 | 0.219 | 12.7% | 187–201 |
| 2.0 | 1.782 | 1.268 | 0.514 | 28.8% | 168–204 |

Test 4 produced similar weight loss percentages to Test 3, but without the venting, the nuggets in Test 4 were not as brown and crisp on the surface.

Test 5—Insulated MicroFlex®Q pouch with single vent. In Test 5, one corner of the pouch was cut off for venting and the entire pouch was wrapped in three paper towel sheets for insulation and moisture retention.

TEST 5

| Cook Time (minutes) | Starting Weight (oz) | Cooked Weight (oz) | Weight Loss (oz) | Percent Weight Loss | Internal Temperature (° F.) |
|---|---|---|---|---|---|
| 0.5 | 1.770 | 1.759 | 0.011 | 0.6% | 25–104 |
| 1.0 | 1.763 | 1.666 | 0.097 | 5.50% | 138–193 |
| 1.5 | 1.778 | 1.492 | 0.286 | 16.1% | 175–196 |
| 2.0 | 1.762 | 1.334 | 0.428 | 24.3% | 186–201 |

The moisture loss in Test 5, as shown by the percentage weight loss, was similar to the losses in Test 3 wherein another single vent pouch was used. As such, the chicken meat remained moist and tender. However, because of the addition of the insulating paper towel, the chicken nuggets of Test 5 attained greater browning and crisping levels than the nuggets of the previous tests.

Additional tests were conducted that show moisture loss can be controlled even more by adding moisture to the insulating material before the cooking process. By adding moisture to the insulating material, the cooking time may be effectively extended because of reduced moisture loss in the food product and thereby even better surface browning and crisping may be attained.

Test 6—Moist insulation around MicroFlex®Q pouch with single vent. In Test 6, one corner of the pouch was cut off to provide a vent opening and the entire pouch was wrapped in three paper towel sheets moistened with water.

TEST 6

| Cook Time (minutes) | Starting Weight (oz) | Cooked Weight (oz) | Weight Loss (oz) | Percent Weight Loss | Internal Temperature (° F.) |
|---|---|---|---|---|---|
| 1.5 | 1.772 | 1.666 | 0.106 | 6.0% | 180–200 |
| 2.0 | 1.776 | 1.423 | 0.353 | 19.9% | 184–200 |
| 2.5 | 1.776 | 1.275 | 0.501 | 28.0% | 186–204 |

At 1.5 minutes, good crispness of the battered surface of the chicken nuggets was noted while the interior meat remained tender and moist. At 2 minutes cooking time, the interior meat of the chicken nuggets was still soft, as evidenced by the low percent weight loss at this cooking time as compared the percentage weight loss of nuggets in Tests 1–5 after the same cooking period. In Test 6, an extra half minute of cooking was possible before reaching a similar range of weight loss in the nuggets experienced at 2 minutes in the previous tests. This allowed additional time for the susceptor to brown and crisp the surface of the nuggets without drying out the meat.

Test 7—Moist insulation around MicroFlex®Q pouch without vent. In Test 7, the same cooking configuration as Test 6 was used, with the exception that no vent opening was provided in the pouch.

TEST 7

| Cook Time (minutes) | Starting Weight (oz) | Cooked Weight (oz) | Weight Loss (oz) | Percent Weight Loss | Internal Temperature (° F.) |
|---|---|---|---|---|---|
| 2.0 | 1.792 | 1.462 | 0.330 | 18.4% | 180–199 |
| 2.5 | 1.784 | 1.241 | 0.543 | 30.4% | 194–203 |

After 2 minutes of cooking, some areas of the chicken nuggets were crisp. All the nuggets appeared tender and moist on the inside. After 2.5 minutes of cooking, the pouch self-vented on one side, splitting at the seam to create a large opening (thus indicating the desirability for some level of venting). At the 2.5 minute mark, the chicken nuggets attained a good level of crispness, but were not as tender and moist as the nuggets of Test 6 wherein a small vent opening was provided in the pouch.

While the benefits of insulating a microwave interactive package have been demonstrated above experimentally, a practical method for providing these benefits to the consumer is desirable. In one embodiment, written instructions may be provided on the microwave interactive packaging for a food product directing the consumer to wrap the package in a paper towel, a cloth towel, or some similar insulating material before cooking the food product in a microwave oven. The instructions could additionally direct the consumer to moisten the paper towel or other insulating material with water before wrapping it around the microwave interactive packaging. This instruction could further direct the consumer to cut a vent opening in the microwave interactive packaging before surrounding the packaging with the insulating material.

Although providing instructions to the consumer may result in the addition of insulating material to the microwave interactive packaging in some instances, it is not infallible. Some consumers fail to read or follow the cooking instructions on the package. On other occasions, the consumer will not have a suitable insulating material readily available for use with the packaging. In such instances, the result of cooking the food product without the insulating material will be of lesser quality than if the directions for the addition of insulating material were followed, resulting in decreased consumer satisfaction with the product.

Self-Insulating Microwave Packaging Material

In general, a goal of product packaging is to provide the consumer with a product that is complete and easy to use. For many food products meant for microwave cooking, it is desirable that the food product can be cooked in the microwave oven in its original packaging to provide ease of use and time savings to the consumer. Product packaging should also not be bulky, but compact and uniform for ease of stacking and shipping. Low bulk packaging also reduces shipping and display costs because less space is required in trucks or other transport containers or for shelf display.

Figure 2A:
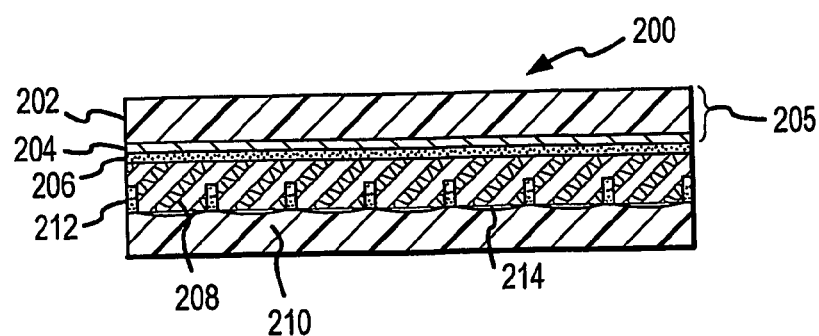
FIG. 2A is an exaggerated elevation, in cross-section, of an exemplary embodiment of the insulating microwave interactive packaging material of the present invention before the packaging is subjected to microwave energy in an operating microwave oven.
Figure 2B:
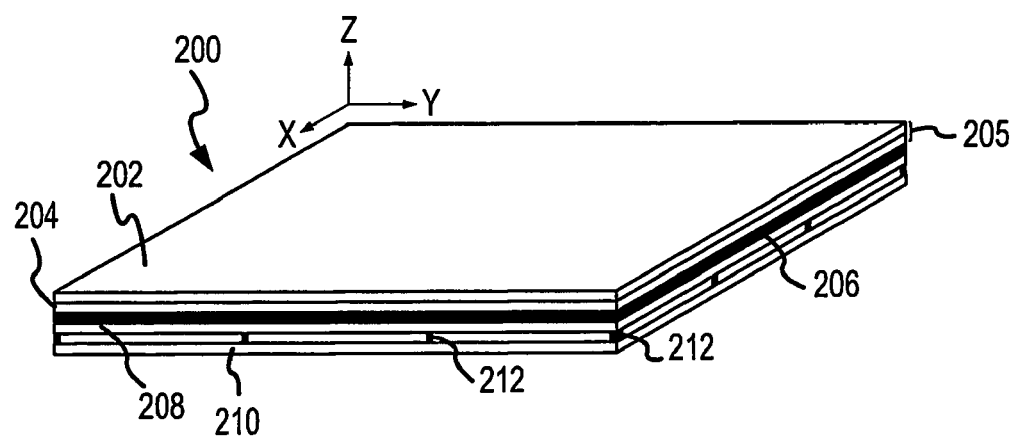
FIG. 2B is an isometric view, in cross-section, of the insulating microwave interactive packaging material of FIG. 2A before the packaging is subjected to microwave energy in an operating microwave oven.
Figure 2C:
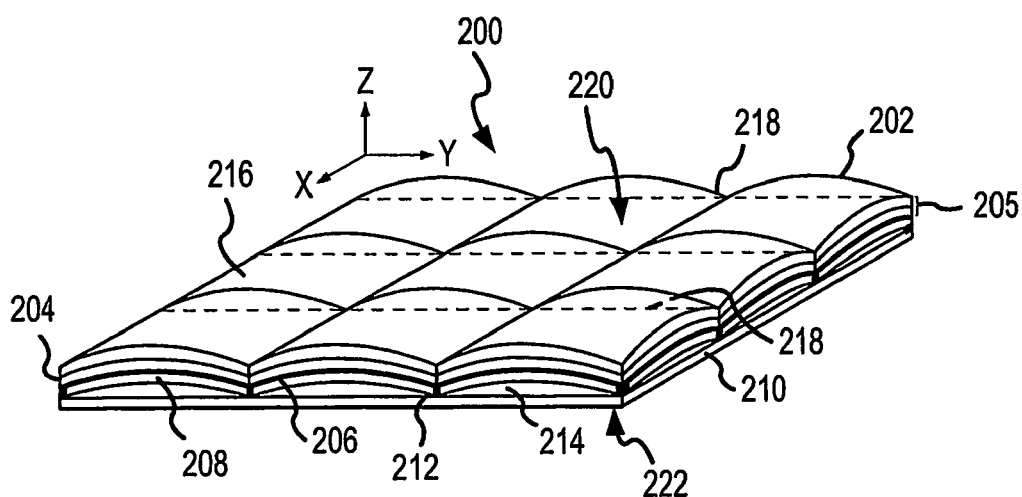
FIG. 2C is an isometric view, in cross-section, of the insulating microwave interactive packaging material of FIG. 2A after the packaging material is subjected to microwave energy in an operating microwave oven.
Figure 2D:
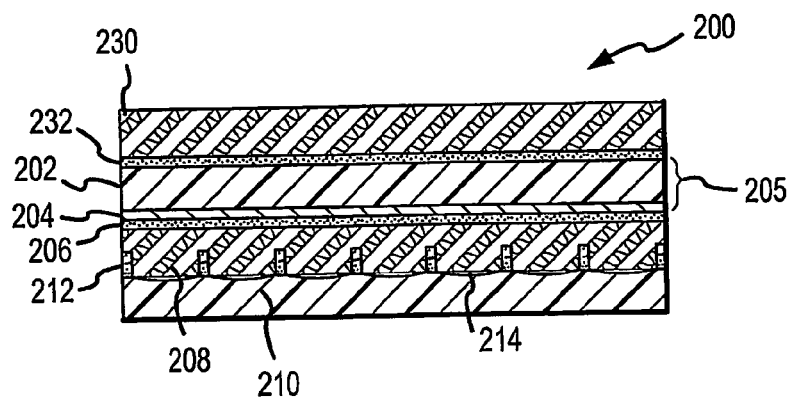
FIG. 2D is an exaggerated elevation, in cross-section, of an alternative embodiment of the insulating microwave interactive packaging material of the present invention before the packaging is subjected to microwave energy in an operating microwave oven.

An insulating microwave packaging material 200 according to the present invention for use in consumer food product packaging is depicted in FIGS. 2A, 2B and 2C. The microwave packaging material 200 is the combination of several different material layers. A susceptor film 205, which may be the product of the deposition of a thin layer of microwave interactive material 204 on a first plastic film 202, is bonded, for example, by lamination with an adhesive 206 to a dimensionally stable substrate 208. The dimensionally stable substrate 208 is then bonded to a second plastic film 210. In an alternative embodiment depicted in FIG. 2D, an additional substrate layer 230 may be adhered, for example with adhesive 232, to the first plastic film 202 opposite the microwave interactive material 204. This additional substrate layer 230 may be a layer of paper, which is provided to control the possible disintegration of the susceptor film 205 during heating. In certain circumstances, the susceptor film 205 may experience crazing under the extreme heat it generates and flakes of susceptor film 205 may peel away from the dimensionally stable substrate 208. The additional substrate 230 prevents any such flakes of the susceptor film 205 from falling into the food product.

The bond between the dimensionally stable substrate 208 and the second plastic film 210 is in the form of a pattern, for example, a pattern of adhesive 212, that creates a plurality of closed cells 214. Resistance to vapor migration results as the closed cells 214 are bounded by the first plastic film 202, the adhesive 206, the adhesive pattern 212, and the second plastic film layer 210, each of which are resistant to vapor migration. To maximize the sealing of the cells, it may be desirable to achieve an adhesive bond directly between the susceptor 205 and the second plastic film 210, for example, by choosing an adhesive for the adhesive pattern 212 that may penetrate the dimensionally stable substrate 208 and contact the first adhesive layer 206 on the susceptor film 205.

The microwave packaging material 200 presents as a substantially flat, multi-layered sheet as shown in FIG. 2B. Such a flat configuration is desirable for use in packaging because it adds little bulk to the finished package. Upon heating in a microwave oven, with a minor constraints applied periodically about the perimeter of the sheet, several changes occur in the insulating microwave packaging 200 that provide several novel benefits. FIG. 2C depicts, in cross-section, the microwave packaging material 200 of FIGS. 2A and 2B subjected to microwave energy in a microwave oven. As the susceptor film 205 heats upon impingement by microwave energy, water vapor and other gases normally held in the paper substrate 208, and any air trapped in the thin space between the second plastic film 210 and the paper substrate 208 in the closed cells 214, expand due to the heat generated. The expansion of water vapor and air in the closed cells 214 applies pressure on the susceptor film 205 and the paper substrate 208 on one side, and the second plastic film 210 on the other side of the closed cells 214. However, each side of the microwave packaging material 200 forming the closed cells 214 reacts simultaneously to the heating and vapor expansion in a unique way. The cells 214 expand to form a quilted top surface 220 of pillows 216 separated by channels 218 in the susceptor film 205 and paper substrate 208 lamination, which lofts above a bottom surface 222 formed by the second plastic film 210. Thus, an originally compact packaging material is transformed into a bulk insulating material, without any further requirements for consumer preparation of the food product package before cooking. This effect occurs within 1 to 10 seconds in an energized microwave oven.

Several benefits of the pillows 216 formed by expansion of the closed cells 214 in the microwave packaging material 200 are observed. First, the water vapor and air pockets in the closed cells 214 provide significant insulation between the food product in the microwave packaging material 200 and the interior surfaces of the microwave oven. The base of a microwave oven, for example, the glass tray found in most microwave ovens, acts as a large heat sink, absorbing much of the heat generated by the susceptor film 205 or within the food product itself. The vapor pockets in the pillows 216 formed by the present invention may be used to insulate the food product and susceptor film 205 from the microwave oven surfaces and the vented air in the microwave oven cavity, thereby increasing the amount of heat that stays within or is transferred to the food product. Second, the formation of the pillows 216 creates an ability for the microwave packaging material to more closely conform to the food product, placing the susceptor film 205 in closer contact with the food product. This close contact enhances the ability of the susceptor film 205 to brown and crisp the surfaces of the food product by conduction heating in addition to some convection heating of the food product. Several examples of these benefits with regard to particular food products are described herein below.

In an exemplary process for manufacturing the unique insulating microwave packaging material 200, a biaxially-oriented polyester substrate, for example, 48-gauge polyester film web, is covered with a microwave interactive material 204, for example, aluminum, to create a structure that heats upon impingement by microwave energy. However, any suitable lossy substance that will convert microwave radiation into heat energy in a microwave oven can be used as the microwave interactive material 204. Such substances fall primarily into four groups: conductors, semiconductors, ferromagnetic materials, and dielectic materials. Preferred microwave interactive materials used in the present invention to form microwave interactive layer 204 are compositions containing metals or other materials such as aluminum, iron, nickel, copper, silver, carbon, stainless steel, nichrome, magnetite, zinc, tin, iron, tungsten and titanium. These materials may be used in a powder, flake or fine particle form.

Such a microwave interactive material layer when combined with a dimensionally stable substrate 208, for example, paper, is commonly known as a "susceptor." The polyester-aluminum combination alone is referred to herein as a "susceptor film." Other types of biaxially-oriented, plastic film 202 may also be substituted for the polyester film. When aluminum is used to create the microwave interactive layer of a susceptor film 205, it may be applied to the polyester substrate, for example, by sputter or vacuum deposition processes, to a thickness of between 50 Å and 2,000 Å. Exemplary embodiments of susceptors that may be used in the context of this invention include MicroFlex®Q, MicroRite® (Graphic Packaging Corporation, Golden, Colo.), and the susceptors described in U.S. Pat. Nos. 4,641,005; 4,825,025; 6,133,560; and 6,414,290.

In one embodiment of the invention, the areas of the microwave interactive material layer 204 directly corresponding to the adhesive pattern 212 to be applied may be inactivated. U.S. Pat. Nos. 4,865,921; 4,883,936; and RE34,683, each of which is hereby incorporated herein in its entirety, describe various processes for selective and patterned inactivation of microwave interactive materials. Inactivating the microwave interactive material layer 204 opposite the adhesive pattern 212, provides several benefits. The adhesive pattern 212 is more likely to maintain a strong bond between the dimensionally stable substrate 208 and the second plastic film 210 because the extreme heat generated by the microwave interactive material layer 204 is not acting directly on the adhesive and potentially weakening its constitution. A stronger adhesive bond results in a better vapor barrier forming the cells 214 and better pillowing effects upon heating. Greater options for possible adhesives are also available because the temperature requirements for maintaining adherence are reduced. Further, because the microwave interactive material layer 204 is removed from the perimeters of the cells 214, upon the contraction of the second plastic film layer 210 and the formation of the pillows 218, ribs that are cool to the touch of a user may be formed opposite the channels 218. These cool to the touch patterned surfaces allow a user to comfortably hold the food product in the packaging while the food product and the packaging are still quite hot from the microwave cooking process. This embodiment is described in greater detail herein with respect to FIGS. 11A–13D.

Conventional printing techniques such as rotogravure, flexography, silk screening, and lithography may be used to treat the selected area of the microwave interactive layer 204 with an inactivating chemical. In general, a wide variety of chemicals may be used to reduce or eliminate the heat-generating capability of microwave interactive layer 204. It has been found that aqueous solutions of chelating agents, solutions of $Zr^{+4}$, amines and hydroxyamines, dilute acids, and bases and solutions of metal salts are useful in reducing or eliminating the microwave interactive properties of microwave interactive layer 204. Examples of chelating agents are ethylenediaminetetracetic acid (EDTA), diethylenetriaminepentacetic acid (DTPA) and hydroxyethylenediaminetriacetic acid (HOEDTA). Solutions of $Zr^{+4}$ useful in the present invention may include ammonium zirconium carbonate, sodium zirconium lactate, ammonium zirconium lactate, and zirconium tartrate. Examples of amines and hydroxyamines useful in the present invention include ethanolamines, choline and salts thereof Acids useful in the present invention include acetic, formic and other organic acids as well as dilute mineral acids such as hydrochloric acid, hydrofluoric acid and mixtures thereof Examples of dilute bases useful in the present invention include potassium hydroxide, sodium hydroxide, lithium hydroxide, sodium and potassium carbonates, and sodium and potassium phosphates. Solutions of salts such as ferric chloride, sodium citrate, sodium tartrate, ferric sulphate, ferrous chloride, ferrous ammonium sulphate, ammonium fluoride, sodium fluoride, zinc chloride, zinc oxide and zinc fluoride are examples of salt solutions useful in the present invention.

Sodium hydroxide is the preferred material used to treat microwave interactive layer 204 in accordance with the present invention, particularly when aluminum metal is the microwave interactive material making up the microwave interactive layer 204. The pH of solutions of sodium hydroxide used to inactivate portions of the microwave interactive layer 204 preferably ranges from about 7.5 to about 13 and is more preferably maintained in the range of about 8.5 to about 11. For a commercial process, the sodium hydroxide solution used to treat an aluminum microwave interactive layer is at room temperature although the temperature may be higher or lower than normal room temperature.

It is generally also advantageous to add a small amount of surfactant to solutions of an inactivating chemical used to treat the microwave interactive layer to improve the wetting characteristics of the chemical and the subsequent reaction of the chemical with the microwave interactive layer. Examples of surfactants which may be used include CER-FAK 1400™ produced by E. F. Houghton, KATAMUL-1G™ produced by Scher Chemicals, Inc., IGEPAL-C0630™ produced by GAF Corporation and TRITON X-100™ produced by Rohm & Haas. A surfactant preferred for use in conjunction with sodium hydroxide is TRITON X-100™.

The mechanism by which chemicals modify treated portions of the microwave interactivate layer without removing the layer is not known for every possible combination of chemical and microwave interactive material. It is believed, however, that aluminum is inactivated by a variety of chemicals which oxidize aluminum metal. It is possible, however that different chemicals will inactivate the microwave interactive layer by different mechanisms. Coordination, chelation, oxidation/reduction, and/or formation of salts of the microwave interactive material may contribute to or cause inactivation of aluminum and other suitable lossy materials.

The completed susceptor film 205 layer is next coated with an adhesive 206, for example, a wet-bond adhesive, preferably on the aluminum deposition layer, rather than the side with the exposed polyester, for creating a laminate with at least one other substrate layer. Bonding the additional substrate to the aluminum deposition allows the polyester to act as a protective layer over the microwave interactive aluminum 204, rather than exposing the aluminum side in the finished product. This lamination step adheres the susceptor film 205 to a dimensionally-stable, packaging substrate 208, for example, paper, paperboard, or a plastic substrate. If the chosen substrate is paper or paperboard, a wet bond adhesive is preferably used; if the substrate is a plastic, a dry bond adhesive is preferred. Typical types of paper substrates that may be used with this invention range between 10 lb and 100 lb paper, for example, 25 lb paper. Typical ranges for paperboard substrates that may be used with the present invention include 8-point to 50-point paperboard.

Similarly, plastic substrates of between 0.5 mils and 100 mils thickness are also applicable. Appropriate plastic substrates are polymers that respond in a similar manner to the paper substrates. Particularly, the plastic substrate should be easily pliable to distort and move with the susceptor film 205 as it heats and bulges. To maintain the desired dimensional stability, a plastic substrate should have a higher softening point than the plastic used to create the susceptor film 205. For example, when used to support a susceptor film 205 with an aluminum deposition as the microwave interactive layer 204, the plastic substrate should be able to withstand temperatures in the range of 350° F. to 425° F. without melting, burning, or otherwise disintegrating.

As used herein, "dimensionally-stable" when describing a substrate 208 refers to the interface of the substrate 208 and the susceptor film 205. Dimensionally-stable indicates a substrate 208 that will not soften, melt, or flow when subjected to the heat generated by the microwave interactive material 204. However, "dimensionally stable" does not mean that a substrate 208 is not malleable or may not be deformed from an original shape or configuration. The purpose of a dimensionally stable substrate 208 is to prevent the susceptor film 205 from disintegrating (e.g., by the melting of the plastic film 202) upon heating.

A second lamination step completes the manufacturing process. A further layer of adhesive 212 is applied to the substrate 208 in a pattern. A second layer of polyester film 210 is then adhered to the substrate 208. The adhesive pattern 212 renders a nested array of closed cells, wherein the perimeters of adjacent cells are shared borders. The adhesive 212 may be chosen to penetrate the paper substrate 208 and contact the first adhesive layer 206, thereby creating cells 214 bounded by the adhesive pattern 212, the first adhesive layer 206 and the adjacent susceptor film 205, and the second polyester film 210. The cells 214 thus created, which each encapsulates a portion of the paper substrate 208, are substantially vapor-impermeable and air-tight, thereby holding in the expanding water vapor and air during heating. The air trapped in each cell 214 is generally minimal as most of the air is evacuated when the second polyester film 210 is pressed against the paper substrate 208 in the lamination process. The amount of moisture trapped in the paper substrate 208 and the cells 214 will influence the amount of cell expansion upon heating. If merely the paper substrate 208 were one of the boundaries of the cells 214, much of the water vapor and air would escape through the porous bulk of the paper substrate 208, and the formation of pillows 216 in the microwave packaging material 200 would be much less pronounced.

As indicated above, upon impingement by microwave energy in a microwave oven, the microwave packaging material 200 undergoes a transformation. As the microwave interactive layer 204 heats due to the microwave energy, the first plastic film 202 supporting the microwave interactive layer 204 becomes extremely hot, between 350° F. and 425° F. At such a high temperature, the first plastic film 202 softens and would flow were it not supported by the substrate 208. At the same time, air trapped between the substrate 208 and the second plastic film 210 in the cells 214 formed by the adhesive pattern 212, and water vapor retained in the substrate 208, for example, if the substrate 208 is paper, expand due to the heat generated by the microwave interactive layer 204 and the excitation of the water vapor by the microwave energy. This vapor expansion creates pressure in the closed cells 214, and the susceptor side of the cells 214 bulges outward under the pressure. Because the plastic film 202 is softened by the heat, it is able to stretch and distort with the substrate 208 under pressure.

Also simultaneously, the second plastic film 210 is heated, but not to the same degree as the first plastic film 202 because the substrate 208 and the expanding air and water vapor insulate the second plastic layer 210 from the intense heat of the microwave interactive layer 204. Although softened by the heat, the second plastic layer 210 is not hot enough to flow and it either remains stable or, as in some embodiments described herein, actually contracts in surface area as a result of the biaxial orientation, wherein the polymer chains attempt to contract to their original state. The pressure of the expanding air and water vapor, therefore, presses upon the softened first plastic layer 202 and the paper substrate 208, which expand over each cell 214 area to form water vapor pockets and air creating the pillows 216 on the top surface 220 of the microwave packaging material as shown in FIG. 2C. Defining each pillow 216 are channels 218 where the patterned adhesive 212 holds the susceptor film 205, the substrate 208, and the second plastic film 210 together.

The second layer of polyester film 210 is preferably biaxially-oriented polyester as is the first layer of polyester film 202. Biaxial orientation means the polyester film has been stretched in both the X and Y directions during its manufacture resulting in uniformly aligned polymer chains of molecules in the polyester film. The alignment of polymer chains creates additional strength in the polyester sheet, even as it is stretched thinner. This increased strength is important to the creation of the susceptor film 205, as the first polyester film 202 is better able to support the deposition of the aluminum microwave interactive layer 204. The increased strength of both the first and second polyester films 202, 210 also makes them easy to work with during the manufacture of the microwave packaging material 200.

The alignment of the polymer chains further increases the resistance of the polyester films 202, 210 to heat. The first polyester film 202 is subjected to very high temperatures when the microwave interactive layer 204 heats upon impingement by microwave energy. The biaxial orientation of the polyester film 202 helps maintain the integrity of the susceptor film 205 by raising the heat distortion temperature of the polyester film 202. When the heat distortion temperature is reached, the biaxially-oriented polyester film 202 attempts to contract in the X-Y direction as the polymer chains attempt to return to their original form. However, because it is adhered to the dimensionally-stable paper substrate 208, the polyester film 202 is unable to contract. The polyester film 202 does soften, however, allowing it and the paper substrate 208 to yield and pillow-up under the pressure of the expanding water vapor and air. Once formed into the pillow shape, the paper substrate 208 is resistant to returning to its original flat form.

The heat resistant properties of the biaxial orientation of the second polyester film 210 result in a different effect for the second polyester film 210. The second polyester film 210 is separated from the microwave interactive film 204 by the paper substrate 208, which also provides insulation from the heat generated by the susceptor film 205. Therefore, the second polyester film 210 does not heat to the same degree as the first polyester film 202. Further, as the air and water vapor in each cell 214 expand, the second polyester film 210 is further insulated from the heat generated. The heat transferred to the second polyester layer 210 is not as great as the heat transferred to the first polyester film 202. However, the heat transferred to the second polyester film 210 is enough to cause the polymer chains to contract in both the X and Y directions, regressing toward the form of the polyester film 210 before it was stretched to produce the biaxial orientation. This contraction creates a taught bottom surface 222 of the microwave packaging material 200, which is more resistant to the pressure of the expanding water vapor, and enhances the pillowing effect on the top surface 220 of the microwave packaging material in the Z direction.

The combination of the X-Y contraction of the second polyester film 210 on the bottom surface 222 of the packaging material 200, the expansion of the air and water vapor in the cells 214, and the softening of the first layer of polyester film 202 together creates the quilted top surface 220 of pillows 216 in the microwave packaging material 200, resulting in the unique attributes of the invention as depicted in FIG. 2C. It should be noted that in actual practice, the amount and variation of pillowing, or Z-direction expansion may vary greatly. Such expansion will be dependent upon the exact material properties of the microwave packaging material 200, the manufacturing process, the moisture content of the substrates, and packaging construction constraints that my restrict X-Y direction contraction. The amount of Z-direction expansion also greatly depends upon particular microwave oven conditions and various food load factors, for example, size, weight, and temperature. All of these factors combine to create a load factor that may not always be exceeded by the expansion factor of the microwave packaging material to achieve the maximum benefit of the invention.

Figure 3A:
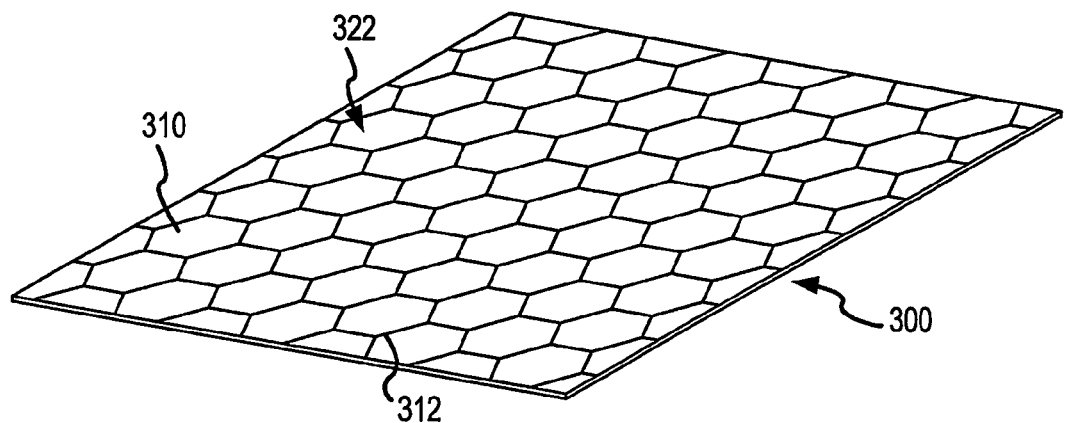
FIG. 3A is an isometric view of the bottom of a sheet of insulating microwave interactive packaging material with a hexagonal adhesive pattern according to a second embodiment of the present invention before the packaging is subjected to microwave energy in an operating microwave oven.
Figure 3B:
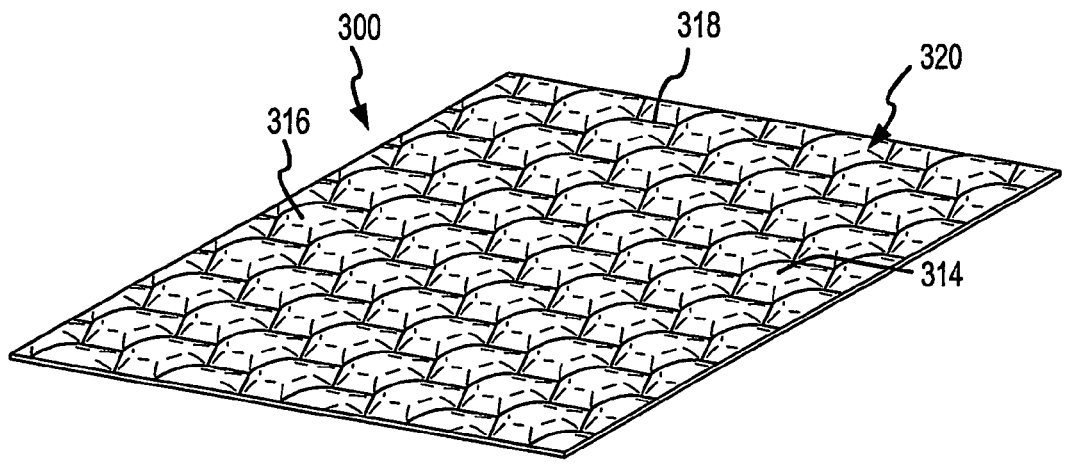
FIG. 3B is an isometric view of the top of the sheet of insulating microwave interactive packaging material with the hexagonal adhesive pattern of FIG. 3A after the packaging is subjected to microwave energy in an operating microwave oven.
Figure 4A:
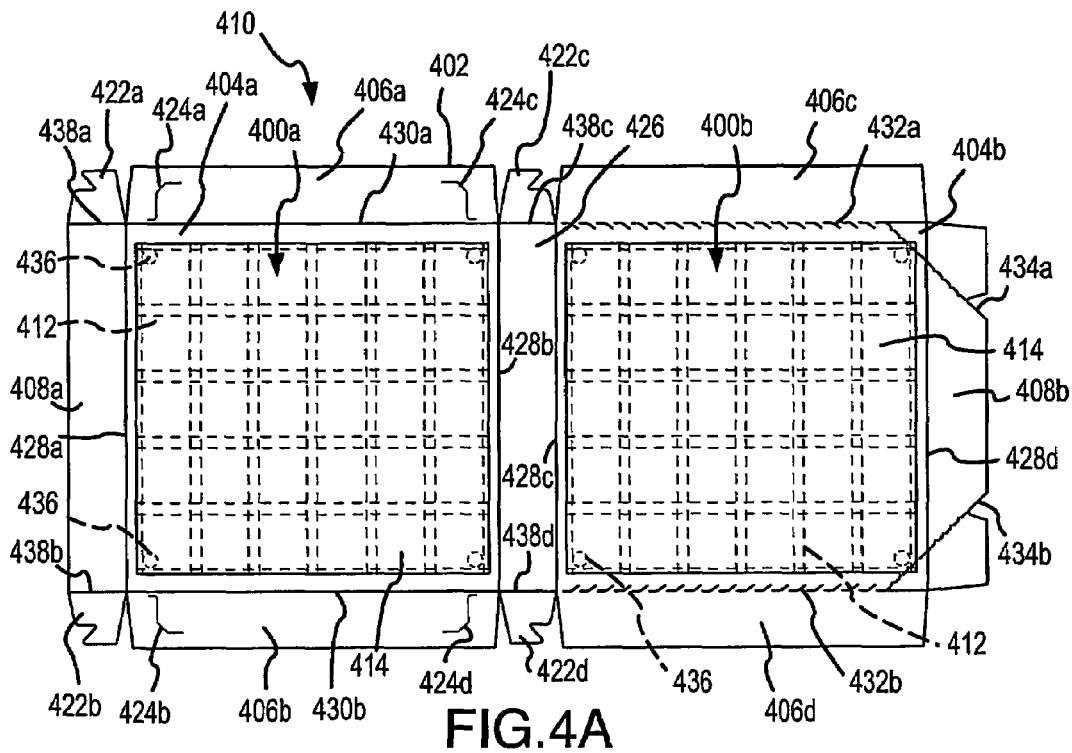
FIG. 4A is a plan view of an unassembled carton employing sheets of insulating microwave interactive packaging material according the present invention on the top and bottom interior surfaces of the carton.
Figure 4B:
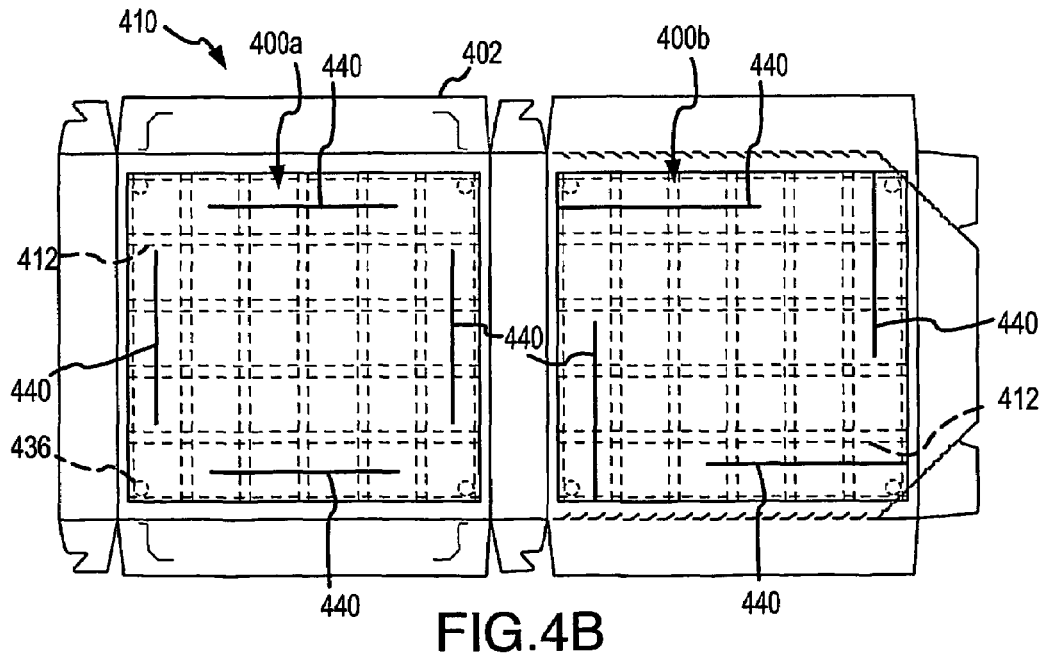
FIG. 4B is a plan view of the unassembled carton of FIG. 4A further showing slits cut in the sheets about the perimeter to augment contraction of the sheets in the X and Y dimensions during microwave heating.
Figure 4C:
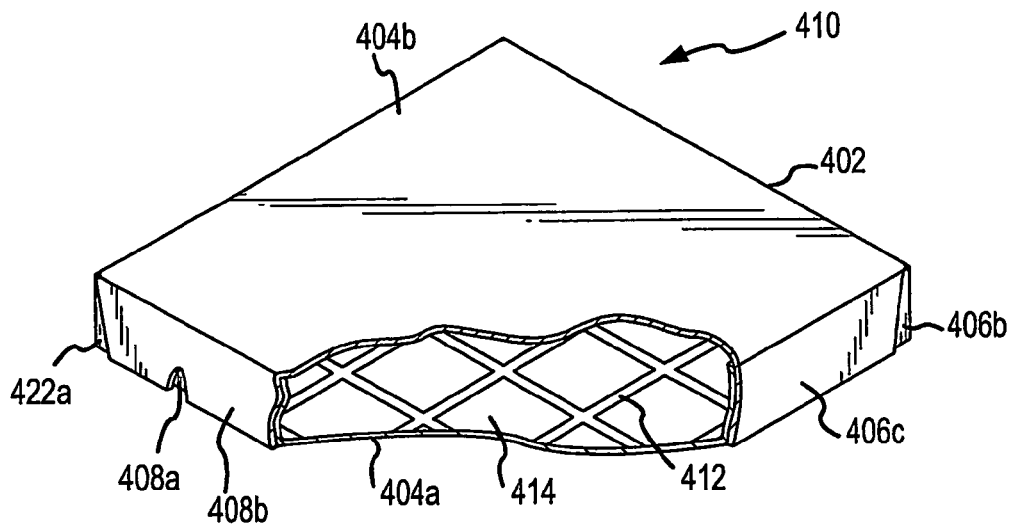
FIG. 4C is an isometric view of the carton of FIG. 4A assembled with a cutaway portion showing the sheet of insulating microwave interactive packaging material on the bottom interior surface of the carton.
Figure 4D:
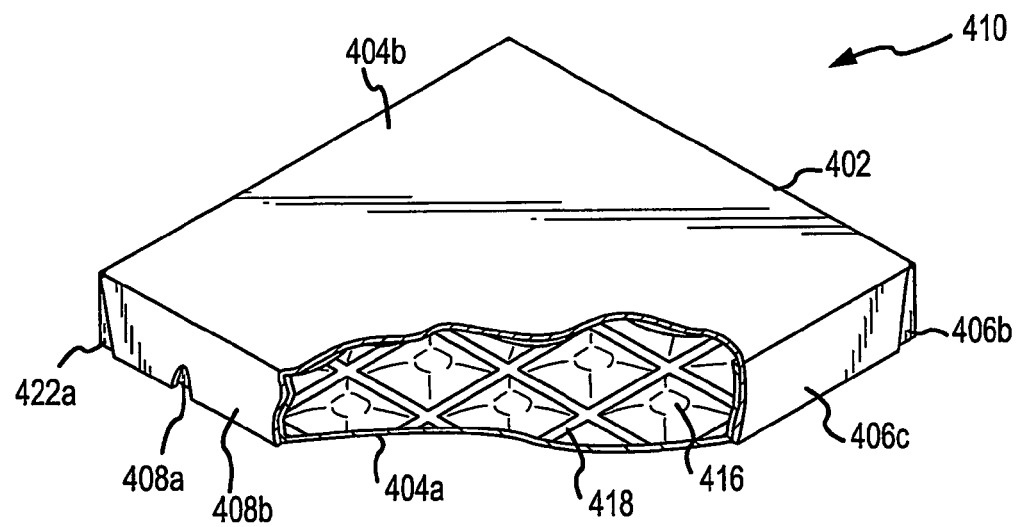
FIG. 4D is an isometric view of the carton of FIG. 4C with a cutaway portion showing the sheet of insulating microwave interactive packaging material on the both the top and bottom interior surfaces of the carton after microwave heating.

FIGS. 3A and 3B show an exemplary embodiment of many possible adhesive patterns 312 for creating the cells 314 within the packaging material 300. A hexagonal adhesive pattern 312, as shown in FIGS. 3A and 3B, is an excellent basic polygonal pattern to select due to its ability to nest perfectly with adjacent hexagons and its high degree of cylindrical symmetry. Other shapes for use as adhesive patterns 312, for example, circles, ovals, and other curvilinear shapes, preferably symmetrical curvilinear shapes, for example, multi-lobed flower shapes, triangles, squares, rectangles (a shown in FIGS. 2A and 2B), and other polygonal shapes, preferably right polygons, and even more preferably equilateral polygons, are within the scope of the present invention. As used herein the term "symmetrical curvilinear shape" means a closed curvilinear shape that can be divided in half such that the two halves are symmetrical about an axis dividing them. As used herein, the term "right polygon" means a polygon that can be divided in half such that the two halves are symmetrical about an axis dividing them. Equilateral polygons would therefore be a subset of right polygons.

These adhesive patterns 312 are preferably configured in arrays such that they are similarly capable of tiling or nesting as depicted in FIG. 3A by the adhesive pattern 312 showing through the second plastic film 310 on the bottom surface 322 of the packaging material 300. When heated by microwave energy, the top surface 320 of the microwave packaging material 300 expands and forms the pillows 316 and channels 318. In addition, the arrays of adhesive patterns 312 need not be repetitive of a single shape, but instead can be combinations of various shapes, preferably capable of nesting or tiling together to share common perimeters. For example, an array of shapes for an adhesive pattern 312 might be an array of nested hexagons and polygons, as in the patchwork of a soccer ball.

FIGS. 4A, 4B, 4C, and 4D depict an exemplary embodiment of a microwave food package 410 that employs two sheets 400a, 400b of the insulating microwave packaging material of the present invention. The microwave food package 410 may be a paperboard carton 402, shown as a blank in FIGS. 4A and 4B and shown assembled in FIGS. 4C and 4D. The carton 402 may be formed of a bottom panel 404a, a top panel 404b, side panels 406a, 406b, 406c, 406d, a bottom flap 408a, a top flap 408b, corner tabs 422a, 422b, 422c, 422d, and a back panel 426. A bottom tray of the carton 402 for holding a food item to be cooked is formed out of the bottom panel 404a, the bottom flap 408a, the back panel 426, and the side panels 406a, 406b. The side panels 406a and 406b are folded upward along score lines 430a and 430b, respectively. Similarly, the bottom flap 408a is folded upward along score line 428a and the back panel is folded upward along score line 428b. The bottom flap 408a is secured to the side panels 406a and 406b by folding tabs 422a and 422b along score lines 438a and 438b, respectively, and then inserting tabs 422a and 422b into slots 424a and 424*b*, respectively. Similarly, the back panel 426 is secured to the side panels 406*a* and 406*b* by folding tabs 422*c* and 422*d* along score lines 438*c* and 438*d*, respectively, and then inserting tabs 422*c* and 422*d* into slots 424*c* and 424*d*, respectively.

A lid for the carton is formed out of the top panel 404*b*, the side panels 406*c*, 406*d*, and the top flap 408*b*. The top panel 404*b* is folded along score line 428*c* to rest on the side panels 406*a* and 406*b* and the bottom flap 408*a* The side panels 406*c* and 406*d* are folded downward along perforation lines 432*a* and 432*b*, respectively, to rest flat against side panels 406*a* and 406*b*, respectively. Similarly, the top flap 408*b* may be folded downward along score line 428*d* to rest flat against bottom flap 408*a*. The top flap 408*b* and the side panels 406*c* and 406*d* may be secured to bottom flap 408*a* and side panels 406*a* and 406*b*, respectively, for example, with adhesive in order to secure the lid to the tray and hold the food item inside until the carton 402 is opened by the user after cooking. The carton 402 may be easily opened by the user by pulling upward on the top flap 408*b*. The top flap 408*b* and the top panel 404*b* will rip open along perforation lines 432*a* and 432*b* allowing the user easy access to the food item while maintaining the integrity of the tray to hold the food item. Cutouts 434*a* and 434*b* may be formed in top flap 408*b* to aid in the initial tearing along perforation lines 432*a* and 432*b*, respectively.

In this embodiment, the cells 414 of the sheets 400*a*, 400*b* are formed as squares by the adhesive pattern 412. The sheets 400*a*, 400*b* may be affixed to the bottom panel 404*a* and top panel 404*b* of the carton 402 with adhesive tacks 436. The adhesive tacks 436 may be placed at the corners of the sheets 400*a*, 400*b* to allow for some movement of the sheets 400*a*, 400*b* as the polyester layer of the insulating microwave packaging material shrinks during heating. Alternatively, centered slits 440*a* or off-centered slits 440*b* be may be cut in the sheets 400*a*, 400 in close proximity to the perimeters between the adhesive tacks 436 to allow for even greater movement of the sheets 400*a*, 400*b* as the polyester layer of the insulating microwave packaging material shrinks during heating. The location and arrangement of slits 440*a* and 440*b* and adhesive tacks 436 are exemplary and many other slit patterns and glue patterns may be used to allow for Z-directional expansion and X-Y directional contraction of sheets 400*a* and 400*b*. The adhesive used for the tacks 436 may also be heat sensitive and release as the sheets 400*a*, 400*b* heat under the excitation of microwave energy. By releasing, the sheets 400*a*, 400*b* are able to contract as necessary during heating and allow the cells 414 to expand to form the pillows 416. The sheets remain generally in place as they are constrained by the side panels 406*a* and 406*b*, the bottom flap 408*a*, and the back panel 426, as well as the food item resting on the bottom sheet 400*a*.

The formation of the pillows 416 by the sheets 400*a*, 400*b* of the insulating microwave packaging material of the carton 402 provides several advantages over cartons using flat susceptor sheets or coatings on the interior panels of such cartons. The susceptor material pillows 416 to become closer in proximity to the food item, especially to the top surface of the food item as the sheet 402*b* on the top panel forms pillows 416. This provides for increased surface heating, browning, and crisping of the top of the food item. Additionally, the air and water vapor in the pillows 416 provides added insulation, trapping heat in the carton 402 and enhancing the cooking result of the food item. In one experiment, a carton with quilted susceptor sheets of the type shown in FIGS. 4C and 4D was used to cook French fries in a microwave oven. As a control, a carton with regular susceptor covered panels was used to cook a like amount of French fries for the same period of time. As shown in the graph depicted in FIG. 21, the air temperature inside the carton 402 during comparable 2.5 minute cooking periods maintained a trend of between 15° F. and 50° F. higher than the carton with regular susceptor panels due to the insulating properties of the insulating microwave packaging material of the present invention.

Figure 5:
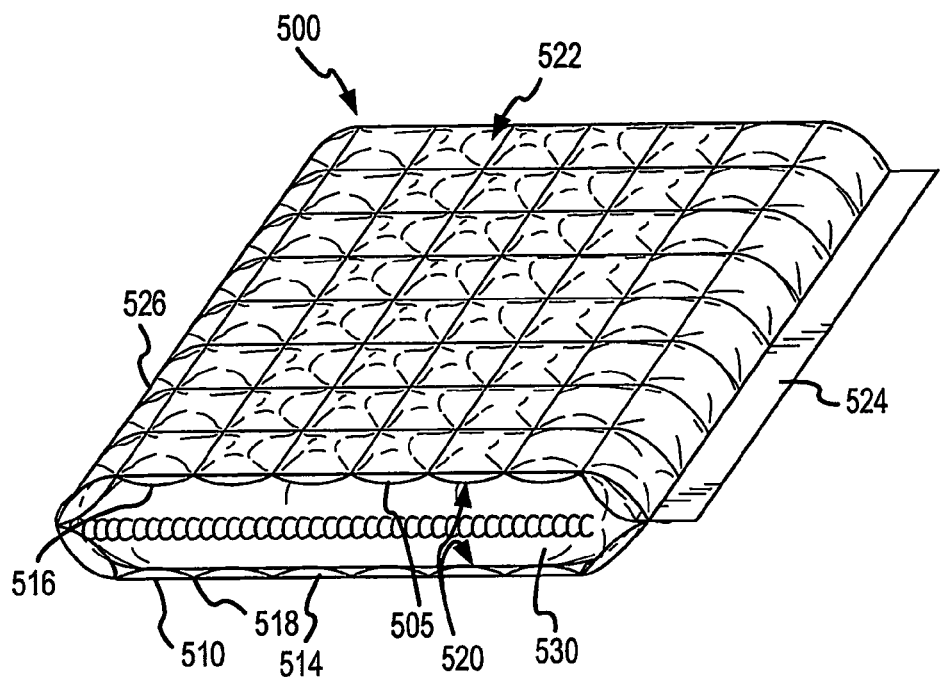
FIG. 5 is an isometric view of an envelope of insulating microwave interactive packaging material surrounding a food product according to a third embodiment of the present invention after the packaging is subjected to microwave energy in an operating microwave oven.

Several advantages of the invention are also achieved by the embodiment depicted in FIG. 5. In this embodiment a sheet of microwave packaging material 500 according to the present invention is folded over on itself with the top surface 520 facing inward and the bottom surface 522 composed of the second plastic film 510 facing outward. The two edges of the sheet of microwave packaging material 500 opposing the fold line 526 are fastened together, for example, via heat sealing or adhesive, to form a sealed edge 524. The sheet of packaging material 500 is thereby transformed into an envelope or sleeve into which a food product 530, for example, a fruit pie snack, may be placed.

In the prior art a food product may rest on the base of a microwave package incorporating susceptor material, for example, a cooking sleeve, but the food product may not touch or be in close proximity with the sides or top of the package. While the bottom of the food product may become brown and crisp because of the contact between the packaging and the food product, the sides and top of the food product will have less browning and crisping because of lack of contact with the susceptor material. By using the present invention, as the susceptor film 505 heats, the microwave packaging material 500 expands to form the pillows 516 on the top surface 520, which bring the susceptor film 505 in close proximity to or contact with the food product 530 on all sides, providing the desired cooking effect on all sides of the food product 530. The channels 518 between the pillows 516 in the quilted top surface 520 provide the added benefit of venting water vapor released from the food product 530 during cooking, which further enhances the surface browning and crisping effects of the susceptor film 505. The vapor filled cells 514 further insulate the food product 530 from the microwave oven and ensure the heat generated remains in the food product 530 rather than transferring to the oven environment.

In other situations, the size and shape of a food product may vary and/or shrink during cooking and pull away from a susceptor positioned adjacent the food product. With the present invention, the insulating microwave packaging material 500 may fill the void created by the shrinking food product with the expansion of the pillows 516 on the top surface 520, maintaining the susceptor film 505 in constant contact with or close proximity to most surfaces of the food product 530. Some food products, for example, bread dough, have the opposite tendency while cooking and actually rise or expand. The microwave packaging material 500 is also beneficial for use with such rising food products 530. The microwave packaging material 500 initially expands to meet the food product 530 before the food product 530 has risen. As the food product 530 rises, the microwave packaging material 500 has some give to yield to the rising food product 530 as the pressure within the cells 514 from the heated water vapor is not so high as to fully resist such external pressure. In practice, the vapor expansion in each of the plurality of closed cells 514 and the simultaneous contraction of the second plastic layer 510 increases the thickness of the packaging material 500 by at least an order of magnitude. Experiments with the various embodiments discussed herein have resulted in expansion of the thickness of the packaging material 500 by up to 30 times, providing for a snug fit around food products 530.

As mentioned above, a novel benefit of the microwave packaging material 200 of the present invention, as in FIGS. 2A–C, is its ability to insulate against heat transfer from the food product or the microwave packaging material 200 itself to the microwave oven environment during cooking. In normal microwave oven operation, the vented air in the oven cavity and the glass tray, or other cooking platform, act as large heat sinks, absorbing much of the heat generated by either the microwave heating of the food product or the microwave interactive materials, for example, susceptor materials, thereby lessening the ability of the microwave packaging material to augment the heating and browning of the food product. With the present invention, during cooking, the vapor and gases from the paper substrate 208 expand into the closed cells 214, as shown in FIG. 2C. These vapor pockets formed in the closed cells 214 transform the microwave packaging material 200 into an insulator that reduces heat transfer between the microwave packaging material 200 and the microwave oven environment. These insulation qualities result in improved performance of the heating properties of the susceptor film 205.

Figure 6:
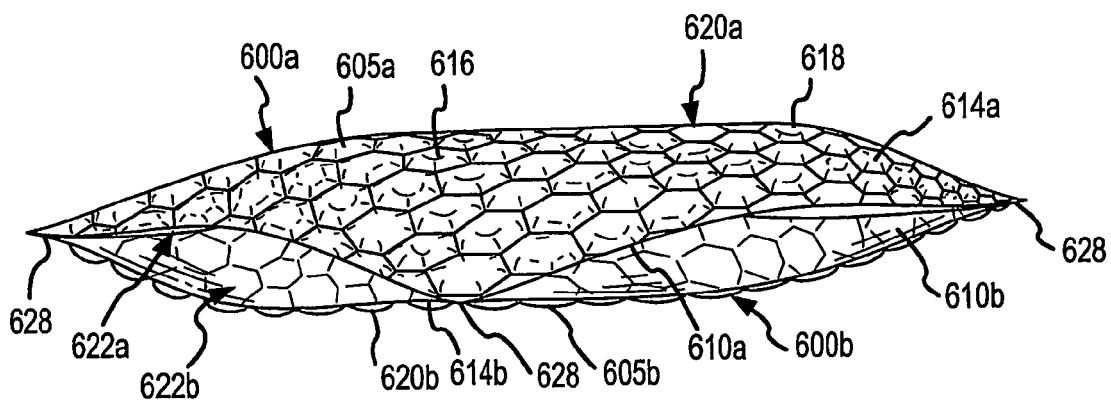
FIG. 6 is an elevation of two sheets of insulating microwave interactive packaging material fastened together at points along the perimeter of the sheets according to a fourth embodiment of the present invention after the packaging is subjected to microwave energy in an operating microwave oven.

In an exemplary embodiment shown in FIG. 6, the insulating properties of the present invention are enhanced over the embodiment depicted in FIGS. 2B and 2C. In FIG. 6, a first sheet 600a and a second sheet 600b of the microwave packaging material are placed bottom side 622a to bottom side 622b, the second plastic film 610a of the first sheet 600a facing the second plastic film 610b of the second sheet 600b. The sheets 600a, 600b may be tacked together, for example, by adhesive or heat seal, at several points 628 spaced apart from each other along the perimeters of sheets 600a, 600b. For example, if the sheets 600a, 600b are square, the corners of the sheets 600a, 600b may be tacked together; if the sheets are round, several points spaced apart along the perimeter of the sheets may be chosen and the sheets tacked together at those points.

Also, oftentimes a frozen food product placed upon a microwave oven surface will cool the microwave oven surface before the microwave oven is energized, increasing the amount of heat transfer to the microwave oven surface once the cooking process begins. In the embodiment of FIG. 6, as one of the two sheets of microwave packaging material, e.g., 600b, is in contact with the microwave oven surface, the susceptor film 605b heats the microwave oven surface while the susceptor film 605a of the opposite sheet 600a heats the food product, further reducing the ability of the microwave oven surface to act as a heat sink. Further, in the case of a frozen or cold food product, the bottom sheet 600b of the dual sheet embodiment creates enough heat energy immediately to cause the vapor expansion in the cells 614a, 614b of both sheets of the microwave packaging material 600a, 600b soon after the microwave oven is energized. If there were only one sheet of microwave packaging material, for example 600a, the frozen food product would significantly increase the time required to heat the water vapor and air and achieve expansion of the cells 614a because the surface temperature of the susceptor film 605a will not rise until the surface temperature of the food product accordingly rises.

The opposing sheets of packaging material 600a, 600b are only attached at points 628 at their perimeters on the corners to allow for movement of the sheets 600a, 600b in the X and Y directions. When the back-to-back sheets 600a, 600b are exposed to microwave energy in a microwave oven, the cells 614a, 614b expand in the Z direction, and the second plastic film layers 610a, 610b contract in both the X and Y directions as a result of the biaxial orientation of the plastic film 610a, 610b as discussed above. Therefore, some freedom of movement in the X-Y directions is desirable in order to achieve favorable expansion results. It may be desirable, however, to provide some external structure to the microwave packaging material 600a, 600b, such as attachment points on the perimeters, to augment uniform shrinkage in both the X and Y directions and minimize distortion or wrinkling of the microwave packaging material 600a, 600b in any particular direction. For example, in experimentation with cells of about 1 in$^2$ in area, the elevation achieved by individual cells after microwave heating was between 0.375 in and 0.5 in from a starting thickness of the insulating microwave packaging material of less than 0.03125 in.

In addition to the expansion of individual cells 614a, 614b, the opposing sheets 600a, 600b also deform on a macro scale from their original flat, paper-like form. The first sheet 600a deforms into a convex canopy with respect to a plane dividing the first and second sheets 600a, 600b. Similarly, the second sheet 600b deforms into a convex canopy with respect to the plane dividing the first and second sheets 600a, 600b. As a result of the convex deformations of the sheets, an air space is created between the sheets 600a, 600b providing greater than double the insulation of a single sheet, isolating the food product from the potential heat sink of the microwave oven surface.

Figure 7A:
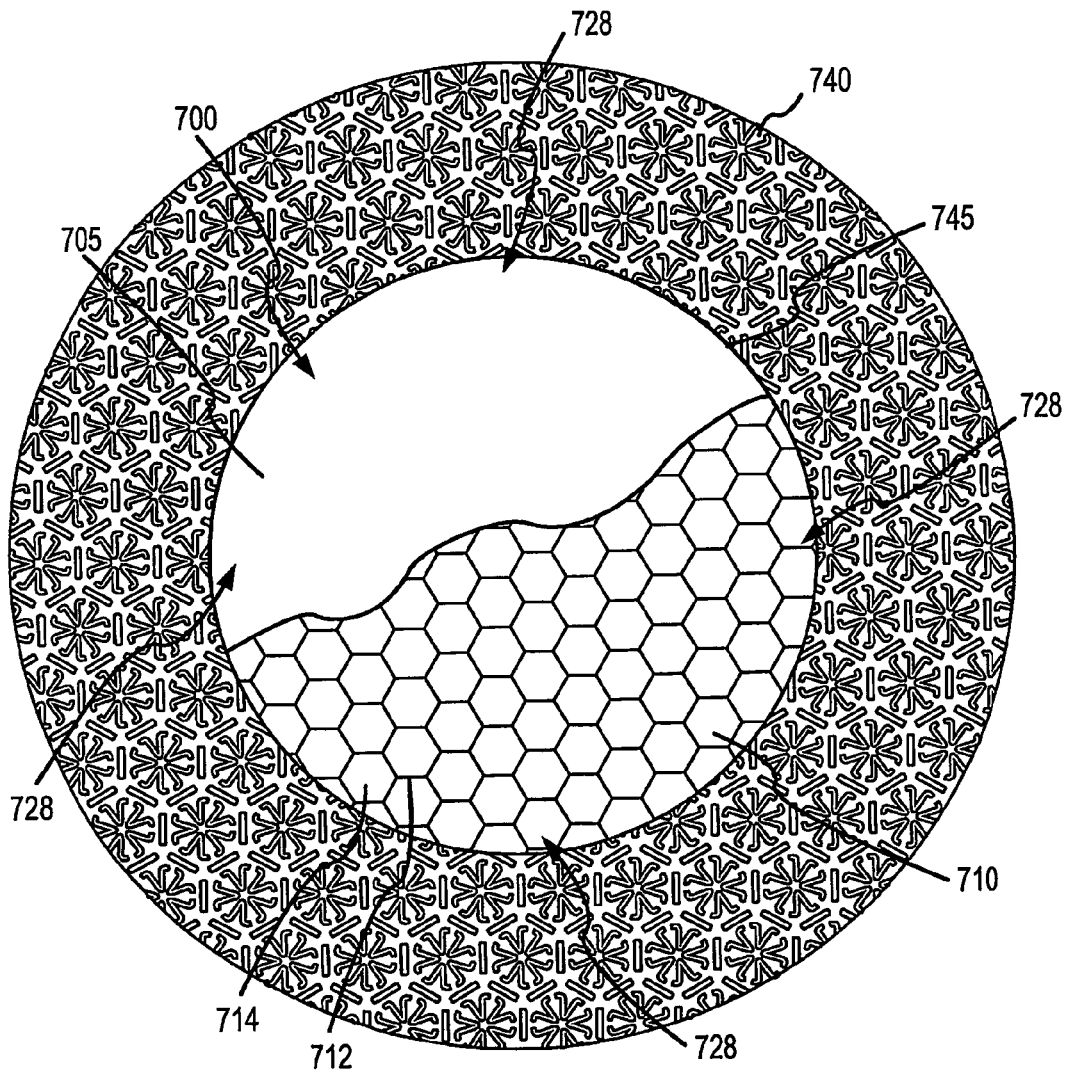
FIG. 7A is a top plan view, in partial cross-section, of two sheets of insulating microwave interactive packaging material fastened together within an aperture in a baking disk with a hexagonal adhesive pattern according to a fifth embodiment of the present invention. The susceptor film and paper substrate of the upper sheet are partially cut away to reveal the adhesive pattern. The lower sheet is not visible.

A particular packaging configuration using the principles of the embodiment of FIG. 6 is shown in FIG. 7A. A pizza baking disk 740 made of an abuse-tolerant microwave packaging material of the type described in U.S. Pat. No. 6,204,492 B1 issued 20 Mar. 2001 to Zeng et al., which is hereby incorporated by reference as though fully set forth herein, is modified to incorporate the insulating microwave packaging material 700 of the present invention. It is a phenomenon of frozen pizza preparation and packaging that the perimeter of the pizza freezes before its center. As the perimeter freezes, the dough contracts and decreases slightly in circumference. This causes the as yet unfrozen center of the pizza, resting on a flat surface, to bulge upward, creating a pocket between the center of the frozen pizza and any surface it later rests upon. This causes great difficulty in achieving a desirable cooking outcome for a frozen pizza, even when using a baking disk 740 with susceptor material because the center of the pizza is not in contact with the susceptor to be crisped. Therefore, the centers of frozen pizzas often turn out soggy and undercooked.

By combining the present invention with a prior art abuse-tolerant baking disk 740, this cooking limitation is overcome. An aperture 745 may be made in the center of the abuse-tolerant baking disk 740, within which a circular piece of the dual sheet embodiment (as described with reference to FIG. 6 herein) of the packaging material 700 is placed. In one exemplary configuration, the sheets of packaging material 700 may be attached to each other, for example, at areas 728, allowing the perimeter edges of the sheets of packaging material 700 to sandwich a small width of the perimeter of the abuse-tolerant baking disk 740 defining the aperture 745 between each sheet, thus holding the packaging material 700 within the aperture 745 in the abuse-tolerant baking disk 740. In a second exemplary embodiment, each sheet of the packaging material 700 may be fastened, for example with a heat sensitive adhesive, to respective opposing sides of the baking disk 740 along portions of the aperture 745. In this manner, the packaging material 700 and the abuse-tolerant baking disk 740 are held together during the packaging process. However, when subjected to the heat generated by the susceptor film layers 705 of the packaging material 700, the heat sensitive adhesive may break down allowing the second plastic film 710 of the packaging material 700 the necessary range of X-Y dimensional movement to optimize the expansion effect in the cells.

When heated by the impingement of microwave energy, the microwave packaging material 700 expands, insulating the pizza from the heat sink of the microwave oven surface and pushing the susceptor material into close contact with the raised center of the frozen pizza, thereby providing increased heating, browning, and crisping to the center of the pizza. The benefit of the dual sheet embodiment of the microwave packaging material 700 in creating immediate expansion of the cells when used with a frozen food product as described previously is readily apparent in the frozen pizza situation. The susceptor film 705 against the microwave oven surface also heats that surface, thereby additionally counteracting its effects as a heat sink and allowing heat generated by the susceptor film 705 against the pizza center to transfer only to the pizza.

Figure 7B:
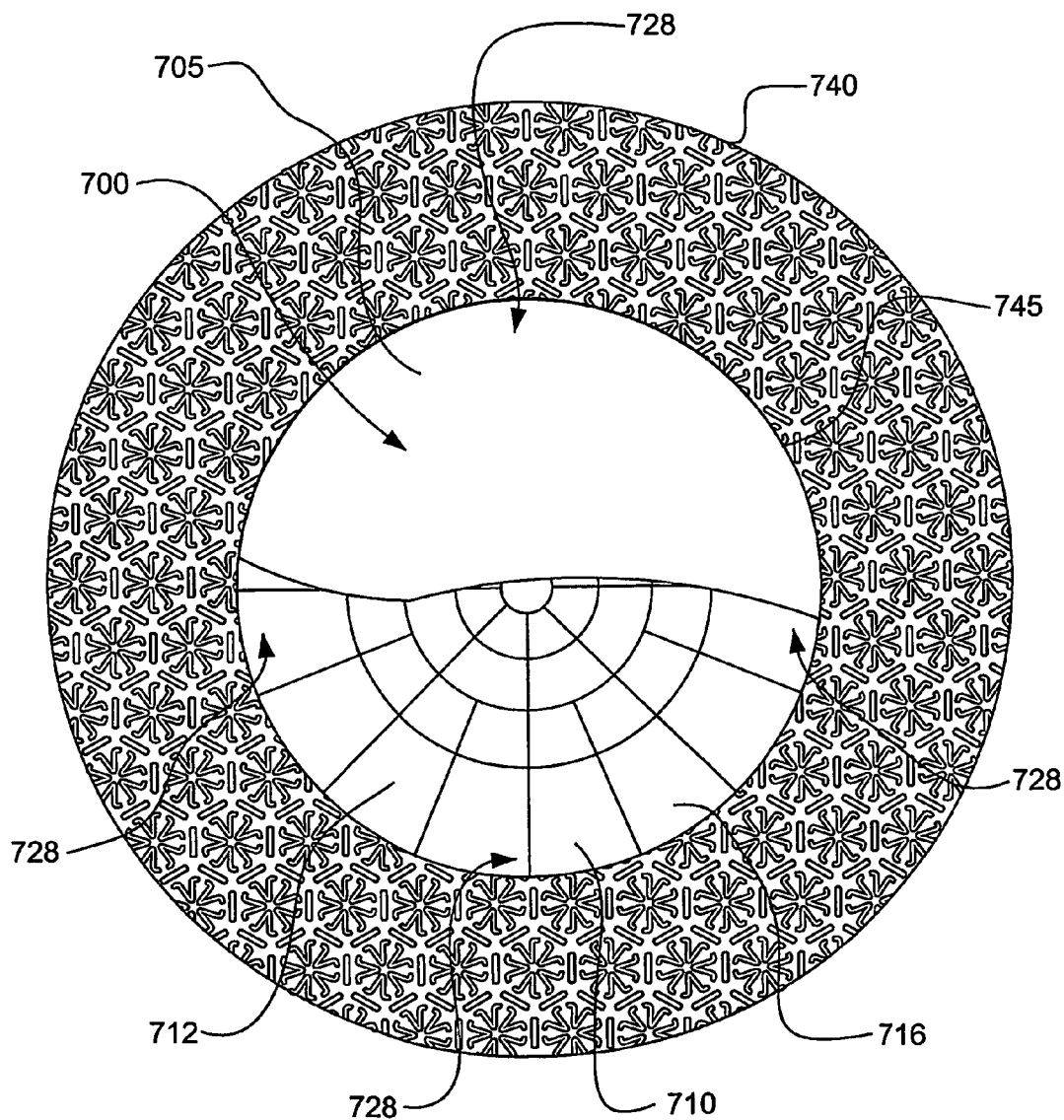
FIG. 7B is a top plan view, in partial cross-section, of two sheets of insulating microwave interactive packaging material fastened together within an aperture in a baking disk with an adhesive pattern defining partial sectors of a circle according to a sixth embodiment of the present invention. The susceptor film and paper substrate of the upper sheet are partially cut away to reveal the adhesive pattern. The lower sheet is not visible.

In an alternative embodiment depicted in FIG. 7B, the cell areas 716 of the insulating new package material 700 are defined by an adhesive pattern 712 subdividing partial sectors of a circle (rather than the hexagonal pattern in FIG. 6) to capitalize on the circular configuration of the microwave packaging material 700 within the aperture 745 in the abuse-tolerant baking disk 740. Each sheet of the microwave packaging material 700 is fastened as previously described to either the opposing sheet or the abuse-tolerant baking disk 740 at various areas 728, with the susceptor film 705 sides facing outward, to aid in maintaining the perimeter shape of the microwave packaging material 700 during heating, while allowing for X-Y dimensional contraction of the second plastic film 710.

Figure 8:
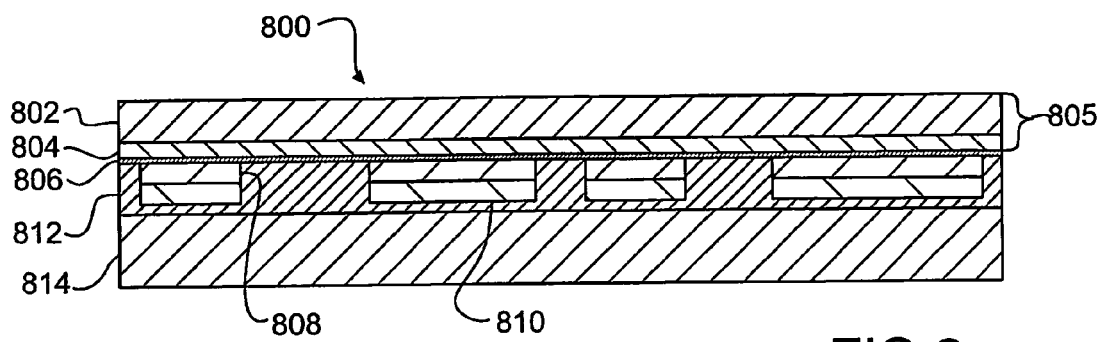
FIG. 8 is an exaggerated elevation, in cross-section, of abuse-tolerant microwave packaging used in conjunction with the embodiments of FIGS. 7A and 7B.

A cross-section of abuse-tolerant microwave packaging material 800 used for the baking disks of FIGS. 7A and 7B is shown in FIG. 8. The abuse-tolerant packaging material 800 of this exemplary embodiment is formed of a polyester substrate 802 covered by a thin deposition of aluminum 804 to create a susceptor film 805. When laminated in combination with a dimensionally stable substrate (e.g., paperboard) as is the ultimate result of the microwave packaging material 800, the polyester substrate 802 and aluminum layer 804 function as a susceptor. The aluminum layer 804 is covered with a dry bond adhesive layer 806. An aluminum foil layer 808 is adhered to the susceptor film 805 via the dry bond adhesive layer 806. Then a patterned ink resist coat 810 is printed on the foil layer 808, and the exposed foil layer 808 is etched away in a caustic bath. The resultant patterned foil layer 808 remaining after the etching process, shown in FIGS. 6 and 7, is covered by the patterned ink resist coat 810. The patterned foil layer 808 and ink resist coat 810 are covered by a second adhesive layer 812. For the sake of discussion, in this embodiment the adhesive layer 812 is a wet bond adhesive. The adhesive layer 812 further covers the etched areas between the patterned foil elements 808 and adheres in these areas to the dry bond adhesive layer 806. The final component of this exemplary embodiment is a dimensionally stable paperboard substrate 814 that is adhered to the previous layers by the second adhesive layer 812. Thus, the various layers are laminated together to form microwave packaging material 800.

The abuse-tolerant microwave packaging material 800 forming the pizza baking disk redistributes incident microwave energy by increasing the reflection of microwave energy while maintaining high microwave energy absorption. A repeated pattern of metallic foil segments 808 can shield microwave energy almost as effectively as a continuous bulk foil material while still absorbing and focusing microwave energy on an adjacent food surface. The metallic segments 808 can be made of foil or high optical density evaporated materials deposited on a substrate 802. High optical density materials include evaporated metallic films that have an optical density greater than one (optical density being derived from the negative logarithm of the ratio of transmitted light to incident light). High optical density materials generally have a shiny appearance, whereas thinner metallic materials, such as susceptor films 805 have a flat, opaque appearance. Preferably, the metallic segments 808 are foil segments.

The metallic segments 808 may form segmented outlines of various shapes. Such shapes may be, for example, circles, ovals, and other curvilinear shapes, preferably symmetrical curvilinear shapes, for example, multi-lobed flower shapes, triangles, squares, rectangles, and other polygonal shapes, preferably right polygons, and even more preferably equilateral polygons, are within the scope of patterns of the abuse-tolerant packaging material 800. The hexagon is an excellent basic polygon to select due to its ability to nest perfectly along with its high degree of cylindrical symmetry. The shapes formed by the microwave reflective segments 808 are preferably configured in arrays such that they are similarly capable of tiling or nesting. In addition, the arrays of shapes need not be repetitive of a single shape, but instead can be combinations of various shapes, preferably capable of nesting or tiling together with small gaps between the metallic segments 808. For example, an array of shapes might be an array of nested hexagons and polygons, as in the patchwork of a soccer ball.

The segmented foil 808 (or high optical density material) structure prevents large induced currents from building at the edges of the abuse-tolerant packaging material 800 or around tears or cuts in the abuse-tolerant packaging material 800, thus diminishing the occurrences of arcing, charring, or fires caused by large induced currents and voltages. The abuse-tolerant design includes a repeated pattern of small metallic segments 808, wherein each segment acts as a heating element when under the influence of microwave energy. In the absence of a dielectric load (i.e., food), this energy generates only a small induced current in each element and hence a very low electric field strength close to its surface.

Preferably, the power reflection of the abuse-tolerant packaging material 800 is increased by combining the abuse-tolerant packaging material 800 with the susceptor film layer 805. In this configuration, a high surface-heating environment is created through the additional excitement of the susceptor film 805 due to the composite action of food contacting the small metallic segments 808. When the food contacts the metallic segments 808 of the abuse-tolerant packaging material 800, the quasi-resonant characteristic of perimeters defined by the metallic segments 808 can stimulate stronger and more uniform cooking. Unlike a full sheet of plain susceptor film 805, the present invention can stimulate uniform heating between the edge and center portion of a sheet of the abuse-tolerant metallic segments 808 combined with a susceptor film 805 to achieve a more uniform heating effect.

The average width and perimeter of the pattern of metallic segments 808 will determine the effective heating strength of the pattern and the degree of abuse-tolerance of the pattern. However, the power transmittance directly toward the food load through the abuse-tolerant metallic segments 808 is dramatically decreased, which leads to a quasi-shielding functionality. In the absence of food contacting the abuse-tolerant packaging material 800, the array effect of the small metallic segments 808 still maintains a generally transparent characteristic with respect to microwave power energy. Thus, the chances of arcing or burning when the material is unloaded or improperly loaded are diminished.

Preferably, each of the metallic segments 808 has an area less than 5 mm$^2$ and the gap between each of the small metallic segments 808 is larger than 1 mm. Metallic segments 808 of such size and arrangement reduce the threat of arcing that exists under no-load conditions in average microwave ovens. When, for example, food, a glass tray, or a layer of plain susceptor film 805 contacts the metallic segments 808, the capacitance between adjacent metallic segments 808 will be raised as each of these substances has a dielectric constant much larger than a typical substrate on which the small metal segments 808 are located. Of these materials, food has the highest dielectric constant (often by an order of magnitude). This creates a continuity effect of connected metallic segments 808, which then work as a low Q-factor resonate loop, power transmission line, or power reflection sheet with the same function of many designs that would otherwise be unable to withstand abuse conditions. On the other hand, the pattern is detuned from the resonant characteristic in the absence of food. This selectively tuned effect substantially equalizes the heating capability over a fairly large packaging material surface including areas with and without food.

The perimeter of each set of metallic segments 808 is preferably a predetermined fraction of the effective wavelength of microwaves in an operating microwave oven. The predetermined fraction is selected based on the properties of the food to be cooked, including the dielectric constant of the food and the amount of bulk heating desired for the intended food. For example, a perimeter of a set of metallic segments 808 can be selected to be equal to predetermined fractions or multiples of the effective microwave wavelength for a particular food product. Furthermore, a resonant fraction or multiple of the microwave wavelength is selected when the abuse-tolerant microwave packaging material 800 is to be used to cook a food requiring strong heating, and a smaller, high-density, nested perimeter of a quasi-resonant, fractional wavelength is selected when the abuse-tolerant microwave packaging material 800 is used to cook food requiring less heating, but more shielding. Therefore, the benefit of concentric but slightly dissimilar perimeters is to provide good overall cooking performance across a greater range of food properties (e.g., from frozen to thawed food products).

Figure 9B:
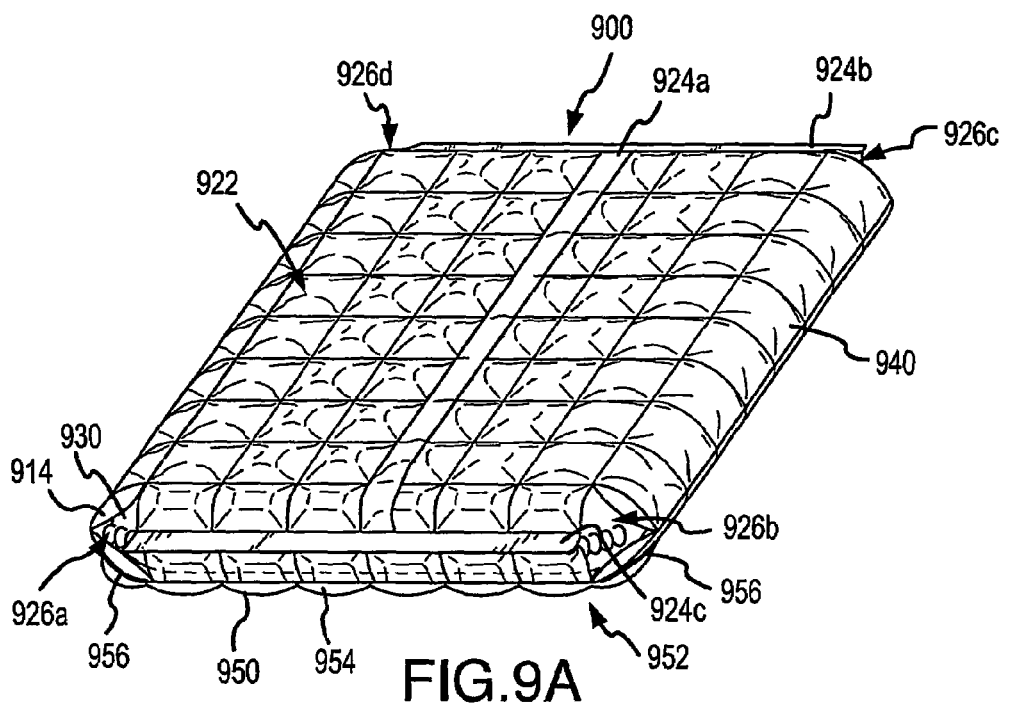
FIG. 9B is a top plan view of the closed pouch of FIG. 9A.
Figure 9B:
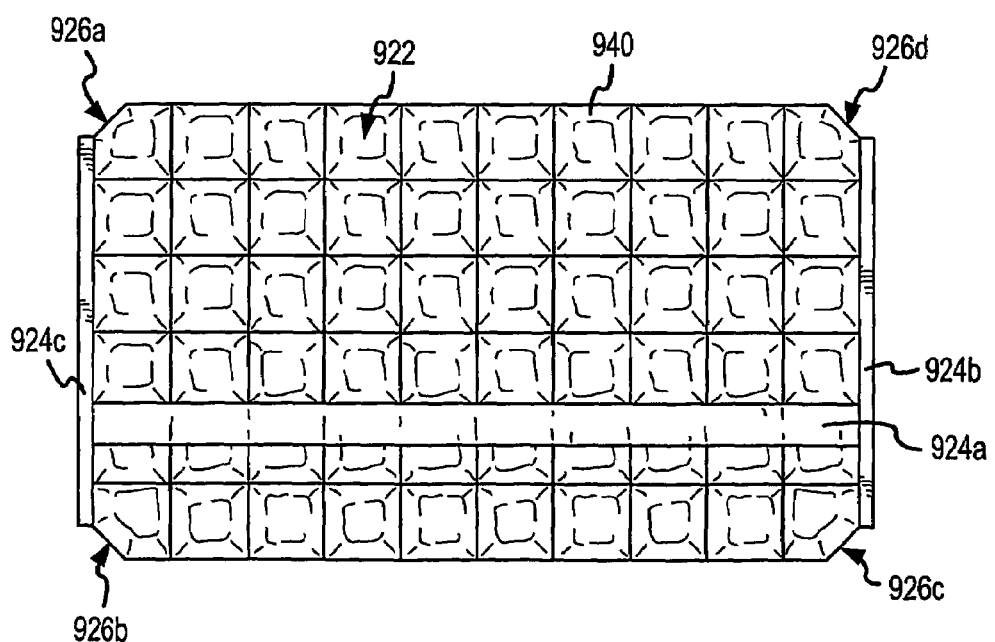
Figure 9C:
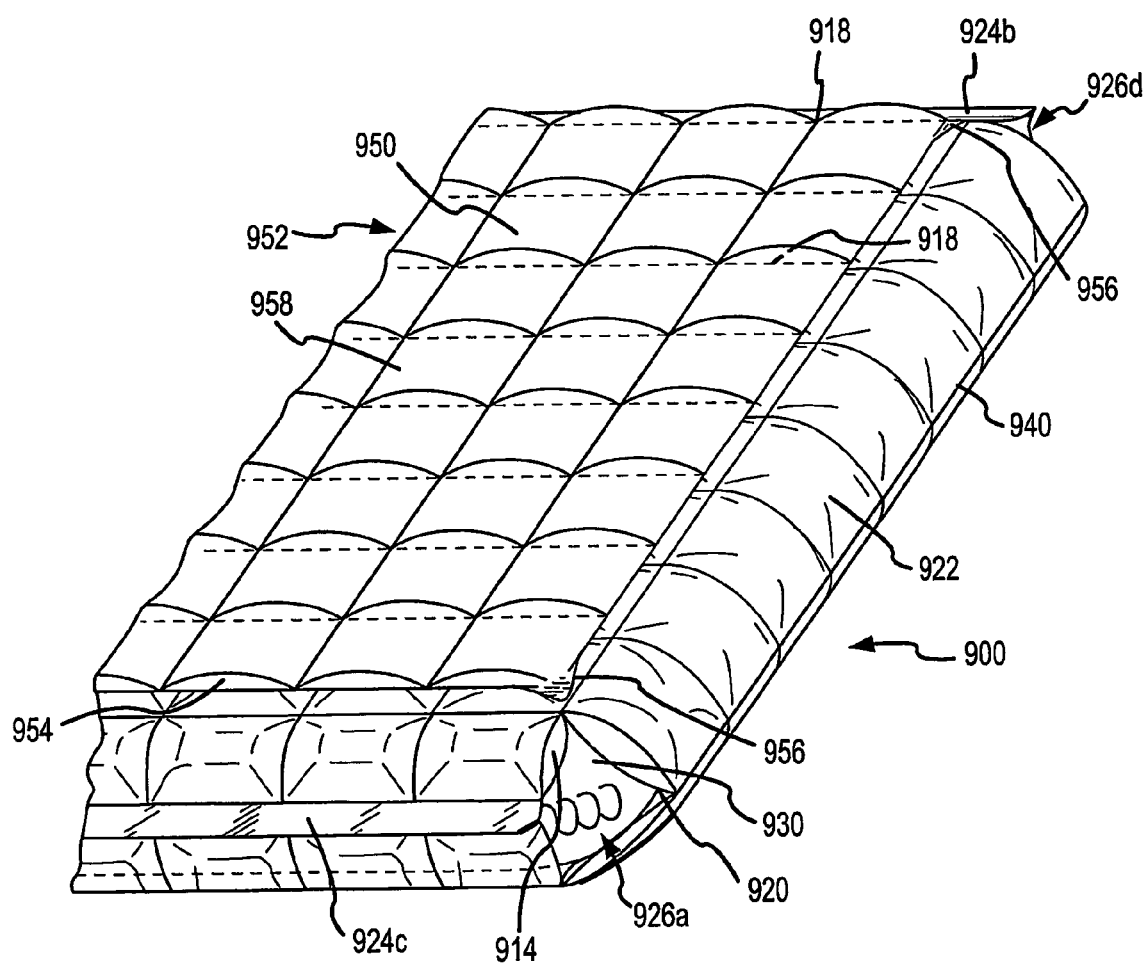
FIG. 9C is a partial isometric view of the closed pouch of FIG. 9A flipped top to bottom.

The embodiment depicted in FIGS. 9A, 9B, and 9C is a combination of the structures of the embodiments of FIGS. 4 and 5. It has been found that when the insulating microwave packaging material is made in the form of a bag or pouch, the cells generally expand more uniformly. In this embodiment a sealed pouch 900 is formed by bringing two opposing edges of a first sheet of insulating microwave packaging material 940 together with the top surface 920 (FIG. 9C) composed of the susceptor layer facing inward and the bottom surface 922 composed of the second plastic film facing outward. The two opposing edges of the first sheet of packaging material 940 are fastened together, for example, via heat sealing or adhesive, to form a sealed edge 924a. The first sheet of packaging material 940 is thereby transformed into an envelope or sleeve into which a food product 930 may be placed. Alternatively, the first sheet 940 could be wrapped around the food product 930 with the food product 930 in situ. Next, the opposing edges of the first sheet 940 at each open end of the sleeve are also fastened together, again for example, via heat sealing or adhesive, to form sealed edges 924b and 924c, respectively, forming a completely sealed pouch 900. The corners of the sealed pouch 900 are then cut off to provide vent holes 926a, 926b, 926c, and 926d that allow steam from the food product 930 to escape.

During the manufacture of the pouch 900, a second sheet of insulating microwave packaging material 950 is attached to the bottom side 952 of the pouch 900, i.e., the side of the pouch 900 that will rest on the floor or turntable of a microwave oven during cooking. The second plastic film side of the second sheet 950 faces the second plastic film side of the first sheet 940. The second sheet 950 may be tacked to the first sheet 940, for example, by adhesive or heat seal, at several points 956 spaced apart from each other along the perimeter of the second sheet 950. For example, if the second sheet 950 is square or rectangular, the corners of the second sheet 950 may be tacked to the outer surface of the first sheet 940. The second sheet of packaging material 950 is only attached at points 956 at the corners to allow for movement of the second sheet 950 in the X and Y directions.

In this embodiment, as the susceptor film in the first sheet 940 heats, the pouch 900 expands to form the pillows on the top surface 920, which bring the susceptor film in close proximity to or contact with the food product 930 on all sides, providing the desired cooking effect on all sides of the food product 930. The channels between the pillows in the quilted top surface 920 provide the added benefit of venting water vapor released from the food product 930 to the vent holes 926a, 926b, 926c, 926d during cooking, which further enhances the surface browning and crisping effects of the susceptor film. The vapor filled cells of the first sheet 940 also further insulate the food product 930 from the microwave oven environment and ensure the heat generated remains in the food product 930 rather than transferring to the oven environment.

As discussed above, a frozen food product placed upon a microwave oven surface will cool the microwave oven surface before the microwave oven is energized, increasing the amount of heat transfer to the microwave oven surface once the cooking process begins. In the embodiments of FIGS. 9A, 9B, and 9C, similar to the embodiment of FIG. 5, the second sheet 950 of microwave packaging material intercedes between the first sheet 940 and the microwave oven floor to insulate the bottom side 952 of the pouch 900 from the microwave oven floor. The susceptor film of the second sheet 950 heats the microwave oven surface and forms pockets of water vapor in its cells 954 creating a pillowed surface 958 that insulates the first sheet 940 of the pouch 900 from the floor of the microwave oven. This allows the heat of the susceptor film of the first sheet 940 to be concentrated on the food product 930, counteracting the ability of the microwave oven floor to act as a heat sink. Further, in the case of a frozen or cold food product, the second sheet 950 creates enough heat energy immediately to cause vapor expansion in the cells 914 of the first sheet 940 of the microwave packaging material soon after the microwave oven is energized. If the second sheet 950 of microwave packaging material were not present, the frozen food product would significantly increase the time required to heat the water vapor and air and achieve expansion of the cells 914 in the first sheet 940 because the surface temperature of the susceptor film of the first sheet 940 on the bottom side 952 of the pouch 900 will not rise until the surface temperature of the food product accordingly rises.

Alternatively, the sealed pouch may be formed of a sheet of a regular susceptor material, for example, MicroFlex®Q, that does not expand like the first sheet 940 to provide insulation. In this example, the second sheet of insulating microwave packaging material 950 described above is still attached to the bottom side of the pouch. In this manner, the second sheet 950 will still expand to insulate the pouch of susceptor material from the microwave oven floor and improve the cooking performance of the susceptor material against the food product 930.

Cool-to-the-Touch Microwave Packaging Materials

Figure 10A:
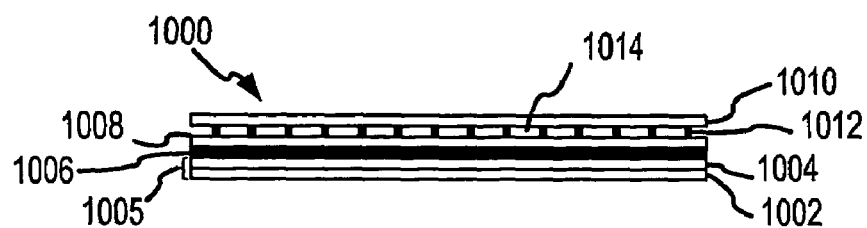
FIG. 10A is an exaggerated elevation, in cross-section, of another embodiment of the insulating microwave interactive packaging material of the present invention before the packaging material is subjected to microwave energy in an operating microwave oven.

In a further embodiment of the invention, the quilting effect is created in a layer of polyester film separated from the susceptor film. Not only is the microwave packaging insulated from the vented air of the microwave oven, the quilted layer also protects a consumer from the residual heat of the susceptor film after cooking. As shown in FIG. 10A, an insulating microwave packaging material 1000 is composed of several substrate layers. The top layer is a first plastic film 1010, preferably an amorphous polyester film, that is adhered to a dimensionally stable substrate, in this instance paperboard 1008. The plastic film 1010 is bonded in a patterned manner, wherein bond lines of adhesive 1012 form an array of very small closed cells 1014 between the plastic film 1010 and the paperboard 1008. In this embodiment, the area of the cells 1014 may be on the order of 0.625 in$^2$ and 0.125 in$^2$. The opposite side of the paperboard 1008 is adhered to a susceptor film 1005 by a layer of adhesive 1006. The susceptor film 1005, as in previous embodiments, may be a second plastic film 1002, for example, polyester, coated with a thin layer of metal 1004, for example, aluminum.

Figure 10B:
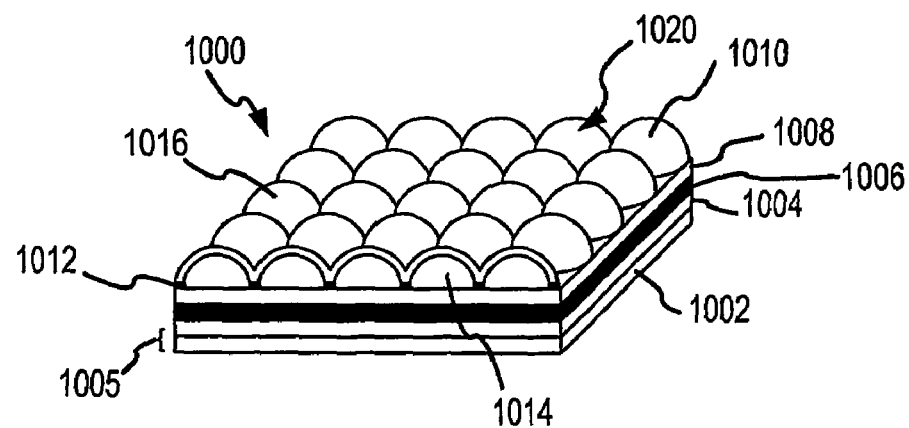
FIG. 10B is an isometric view, in cross-section, of the embodiment of FIG. 10A after the packaging material is subjected to microwave energy in an operating microwave oven.

Upon impingement by microwave energy, the insulating microwave packaging material 1000 undergoes a transformation as shown in FIG. 10B. As the susceptor film 1005 heats, some of the heat is transferred through the paperboard 1008 to the first plastic film, which softens. Simultaneously, moisture trapped in the paperboard 1008 heats and expands as gaseous water vapor into the cells 1014. Unlike the biaxially-oriented polyester of the previous embodiments, the first plastic film 1010, of amorphous polyester or other plastic with similar characteristics in this embodiment, does not contract when heated and instead puffs out under the pressure of the expanding water vapor as it softens to form tiny pillows 1016 across the top surface 1020 of the insulating microwave packaging material 1000.

Although the paperboard 1008 is thicker, and thereby more insulating than the paper layers of previous embodiments, the amorphous polyester film 1010 has a lower heat distortion temperature than the biaxially-oriented polyester of the previous embodiments. Therefore, the amorphous polyester film 1010 will soften and yield to the pressure of expanding water vapor at a lower temperature. Thus, the quilting effect in the first plastic film 1010 is achieved at a lower surface temperature of the top surface 1020 than in previous embodiments because the necessary heat transfer through the paperboard 1008 is reduced.

Figure 10C:
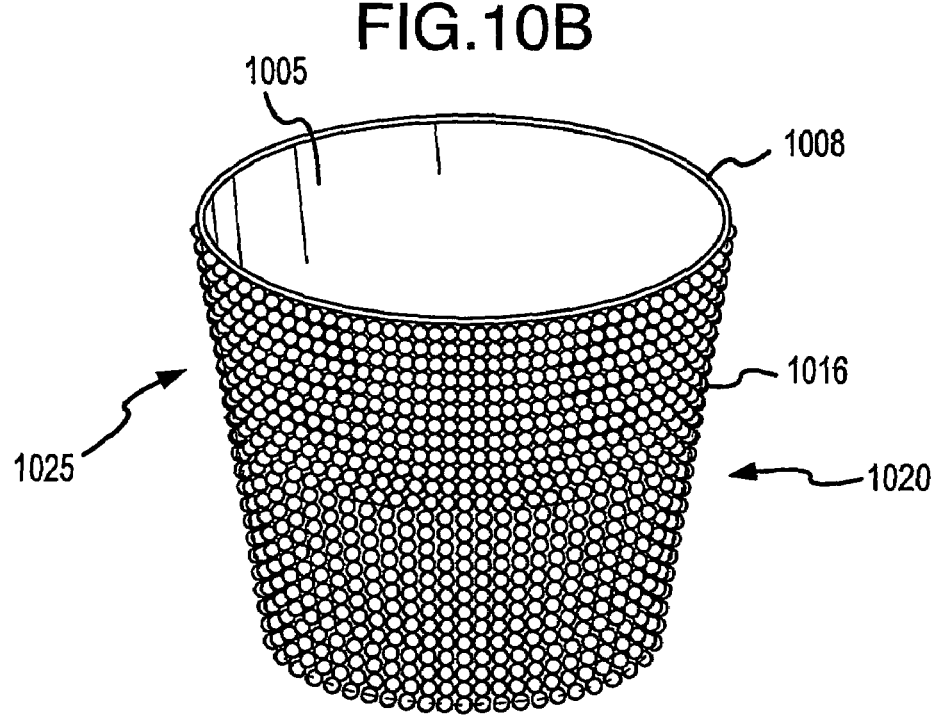
FIG. 10C is an isometric view of a further embodiment of the insulating microwave interactive packaging material of the present invention after the packaging material is subjected to microwave energy in an operating microwave oven, wherein the packaging material of FIG. 10A is formed into a container.

The combination of quilting and lower surface temperature may provide several consumer benefits. As depicted in FIG. 10C, a microwave cooking container 1025 is constructed of the insulating microwave packaging material 1000 of FIG. 10A. The susceptor film 1005 lines the interior of the container 1025 to contact the food to be cooked within. The structure of the container 1025 is provided by the sturdy paperboard 1008 layer. FIG. 10C depicts the container 1025 after exposure to microwave energy. The exterior surface 1020 of the container 1025 is covered by an array of pillowed cells 1016. Not only do the pillowed cells 1016 provide insulation for the container 1025 from the microwave cooking environment during cooking, the pillows 1016 further provide insulation against heat transfer from the susceptor film 1005 to the consumer upon contacting the container 1025 to remove it from the microwave oven or otherwise hold the container 1025 during consumption of a food product contained therein.

Figure 11A:
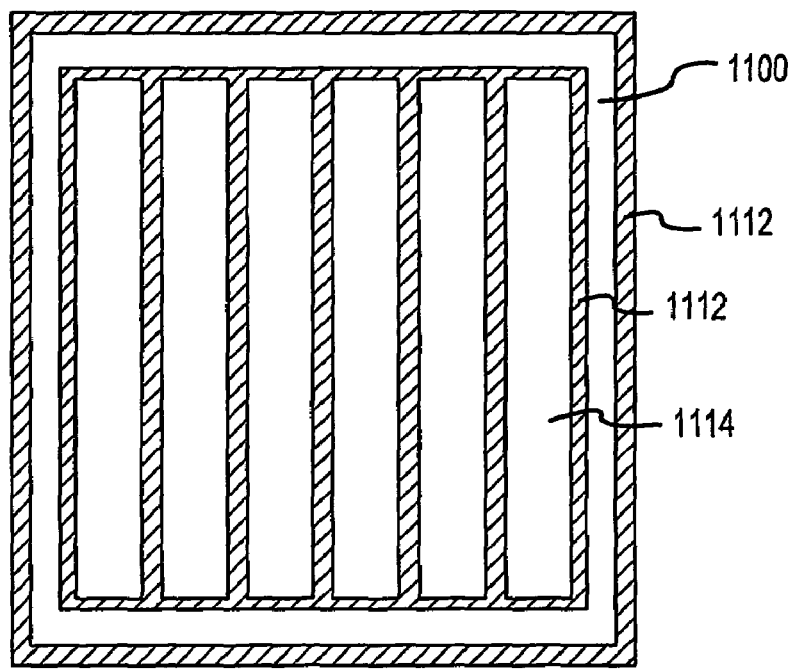
FIG. 11A is a plan view of a sheet of insulating microwave interactive material according to the present invention with elongate cells and indicating the adhesive bond line pattern.
Figure 11B:
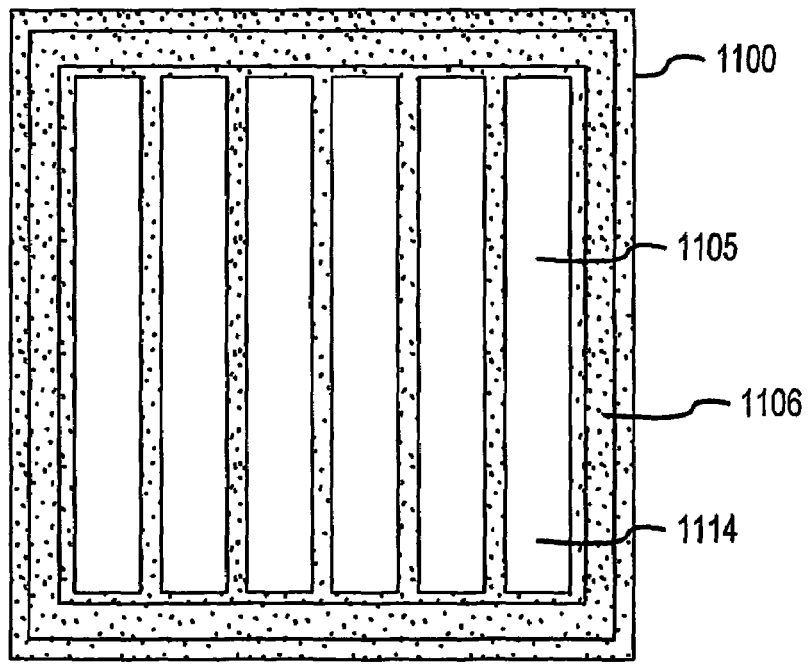
FIG. 11B is plan view of a sheet of insulating microwave interactive material according to the present invention with elongate cells and indicating areas where the microwave interactive material is inactivated.

A further embodiment of the invention that provides insulation against heat transfer to the consumer, shown in FIGS. 11A and 11B, uses the technology described above to make portions of the susceptor inactive. FIG. 11A depicts a sheet 1100 of insulating microwave interactive material according to the present invention. The desired adhesive pattern 1112 is shown outlining the perimeter of the sheet 1100 and outlining the cells 1114 as well. In this embodiment, each of the cells 1114 is an elongated rectangle that, when heated, will form a tube-like pouch. FIG. 11B indicates the inactive areas 1106 of the sheet 1100 that will not heat upon impingement by microwave energy. However, the cells 1114 still include a microwave energy interactive layer 1105 in order to heat the surface of a food item and expand the cells 1114 into a pillow form.

Figure 12A:
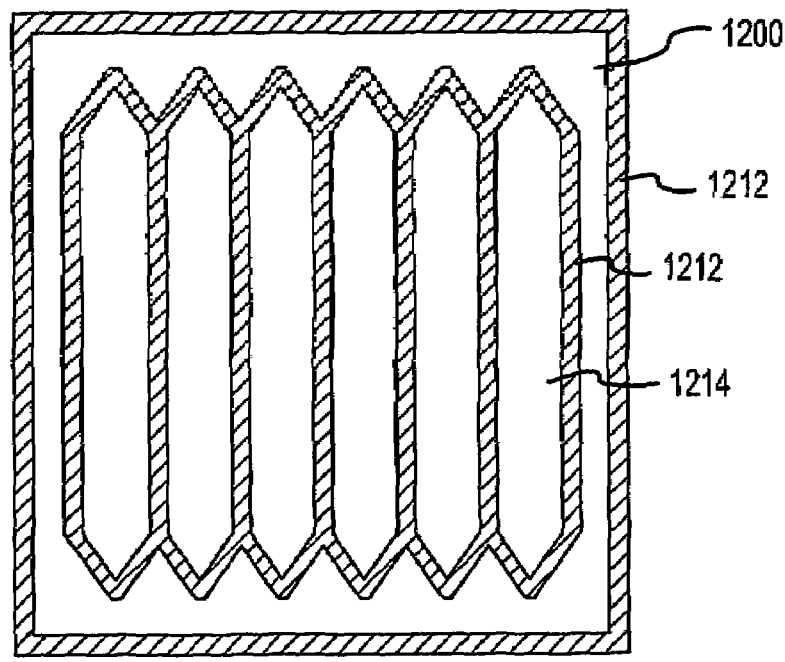
FIG. 12A is a plan view of a sheet of insulating microwave interactive material according to the present invention with elongate cells and indicating the adhesive bond line pattern.
Figure 12B:
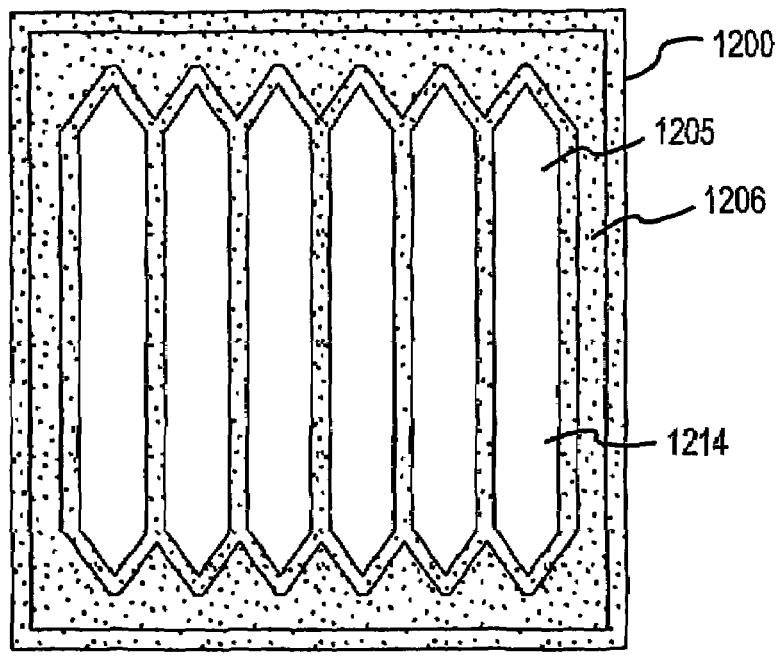
FIG. 12B is a plan view of a sheet of insulating microwave interactive material according to the present invention with elongate cells and indicating areas where the microwave interactive material is inactivated.

FIGS. 12A and 12B show a sheet 1200 of insulating microwave interactive material with an alternate cell 1214 design. In this design, the cells 1214 are elongate diamond shapes. The pointed ends of each cell 1214 allow the pouch structure formed upon heating to contract around the food item more uniformly relative to the purely box ended cells 1114 of FIGS. 11A and 11B. The adhesive pattern 1212 is again shown in FIG. 12A outlining the perimeter of the sheet 1200 and outlining the cells 1214. Likewise, FIG. 12B indicates the inactive areas 1206 of the sheet 1200 that will not heat upon impingement by microwave energy. Again, the cells 1214 still include a microwave energy interactive layer 1205 in order to heat the surface of a food item and expand the cells 1214 into a pillow form.

Because the sheets 1100, 1200 of insulating microwave interactive material are inactive along the adhesive patterns 1112, 1212 outlining the cells 1114, 1214, the areas of the adhesive patterns will not heat during microwave cooking. This effect provides an opportunity to design microwave packaging products with exterior surfaces cool to the touch for a consumer. One example of such a packaging design is shown in FIGS. 13A–13D.

Figure 13A:
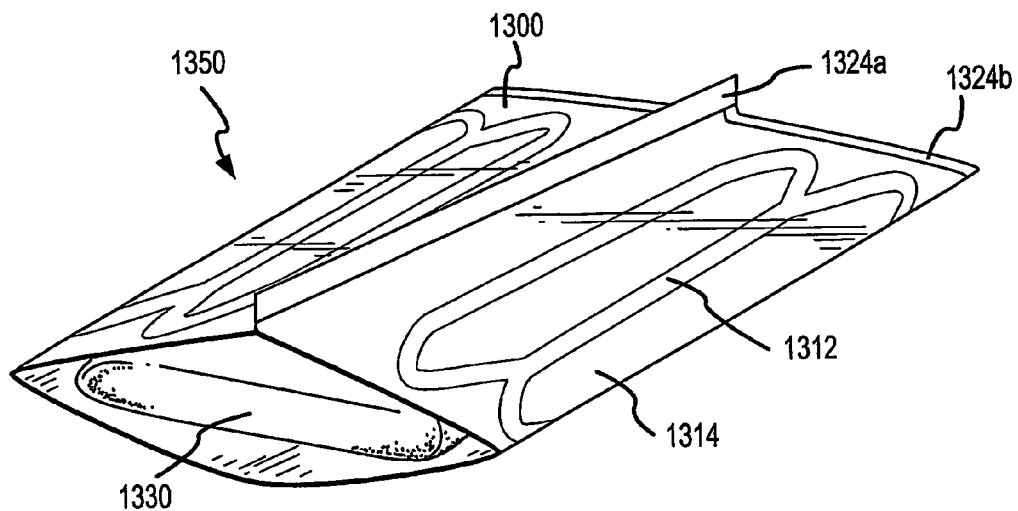
FIG. 13A is an isometric view of a cooking pouch constructed of a sheet of insulating microwave interactive material of FIGS. 12A and 12B.

FIG. 13A depicts a cooking pouch 1350 formed by folding a sheet 1300 of insulating microwave interactive material as shown in FIGS. 12A and 12B to bring two opposite ends together. The opposing ends may be sealed as a seam 1324a to form a sleeve. One of the open ends of the sleeve is then further sealed forming a seam 1324b to close the end of the sleeve and form a pocket with an opening along the opposing side. The edge seams 1324a and 1324b may be adhered together with adhesive or heat sealed as previously described herein. When the cooking pouch 1350 is receives incident microwave energy in a microwave oven, the suceptor areas 1305 forming part of the walls of the cells 1314 heat and cause the air and water vapor in the cells 1314 to expand and form elongate insulating elongate pillows 1316 within the cooking pouch 1350 as shown in FIGS. 13B and 13D.

Figure 13B:
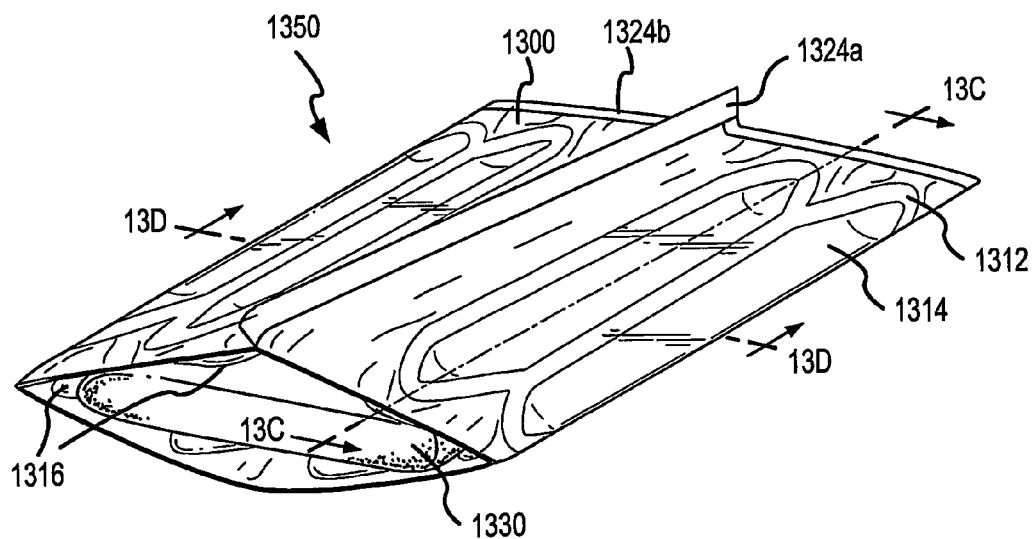
FIG. 13B depicts the cooking pouch of FIG. 13A after microwave heating.
Figure 13C:
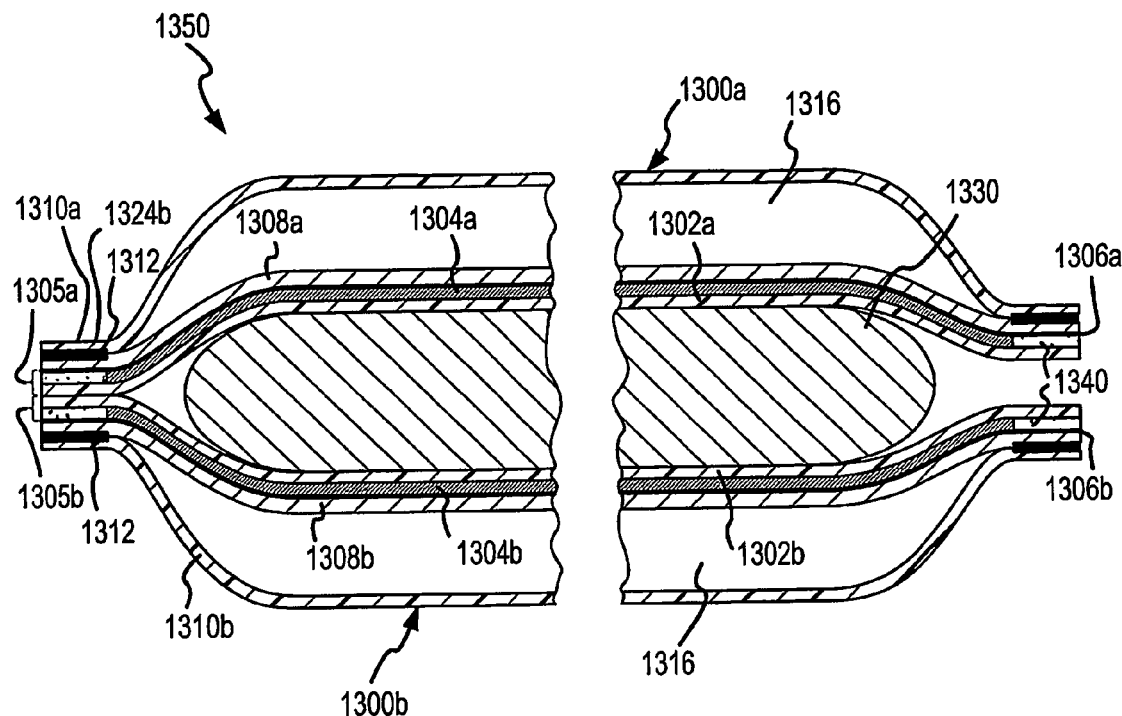
FIG. 13C depicts the cooking pouch of FIG. 13B in cross section as indicated in FIG. 13B. The cross section is exaggerated to detail the various layers of the insulating microwave interactive material.

FIG. 13C shows in exaggerated detail the how the elongate pillows 1316 are formed upon the heating of the cells 1314 by the active portion of the susceptor 1305 of the packaging material 1300. Although in actuality the sheet of packaging material 1300 is a single sheet wrapping over and under the food item 1330, for convenience of reference the portions positioned on top of the food item 1330 are denoted with an "a" and the like portions positioned on the bottom of the food item 1330 are denoted with a "b." Therefore, sheet 1300a on top of the food item 1330 is mirrored by sheet 1300b below the food item. The outer layers of sheets 1300a and 1300b are composed of a plastic film layer 1310a, 1310b that upon heating becomes separated from the remaining layers of the sheets 1300a, 1300b by the expansion of air and water vapor. The edges of the plastic film layers 1310a, 1310b are adhered to the edges of respective dimensionally stable paper substrate layers 1308a, 1308b by adhesive patterns 1312. The sides of the paper layers 1308a, 1308b opposite the plastic film layers 1310a, 1310b are adhered to susceptor film layers 1305a, 1305b by respective comprehensive layers of adhesive 1306a, 1306b. The susceptor film layers 1305a, 1305b are as before composed of a layer of plastic film 1302a, 1302b coated with a thin, microwave interactive layer of aluminum 1304a, 1304b. In this embodiment, portions 1340 of the aluminum layers 1304a, 1304b have been inactivated from heating by microwave energy to provide cool-to-touch areas and to aid in maintaining the edge seal 1324b.

Figure 13D:
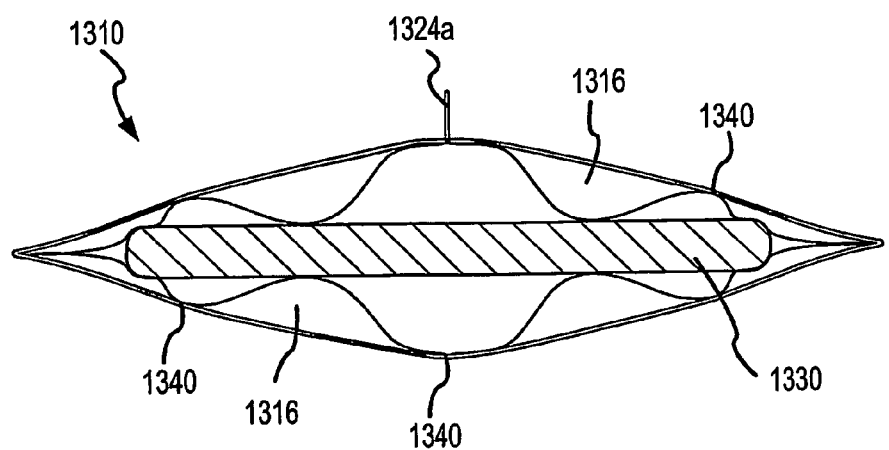
FIG. 13D depicts the cooking pouch of FIG. 13B in cross section as indicated in FIG. 13B.

On the exterior surface of the cooking pouch 1350, raised ribs 1340 are formed, as shown in FIGS. 13B and 13D, in the same pattern as the adhesive pattern 1312 due to the pillowing of the susceptor layer and the contraction of the outer plastic film layer forming the insulating microwave interactive material sheet 1300. These raised ribs 1340 are cool to the touch because they conform to the inactive areas 1306 of the susceptor and therefore were not substantially heated during the cooking process. In this manner a microwave cooking package is created that may be grasped and held by a user immediately after microwave heating without burning the user's hands.

Figure 14A:
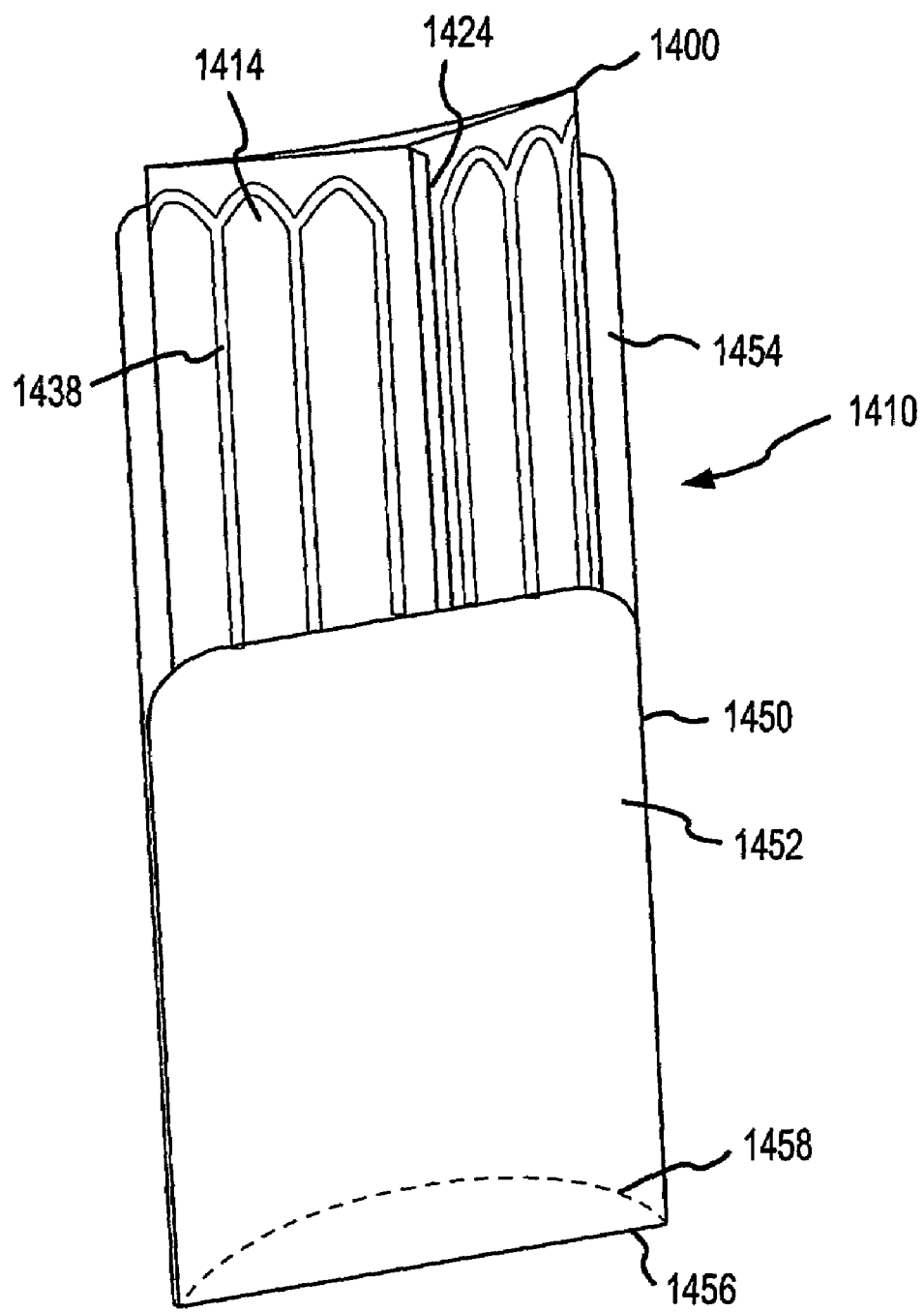
FIG. 14A is an isometric view of a collapsible cooking package in its collapsed position holding the cooking pouch of FIG. 13A without a food product.
Figure 14B:
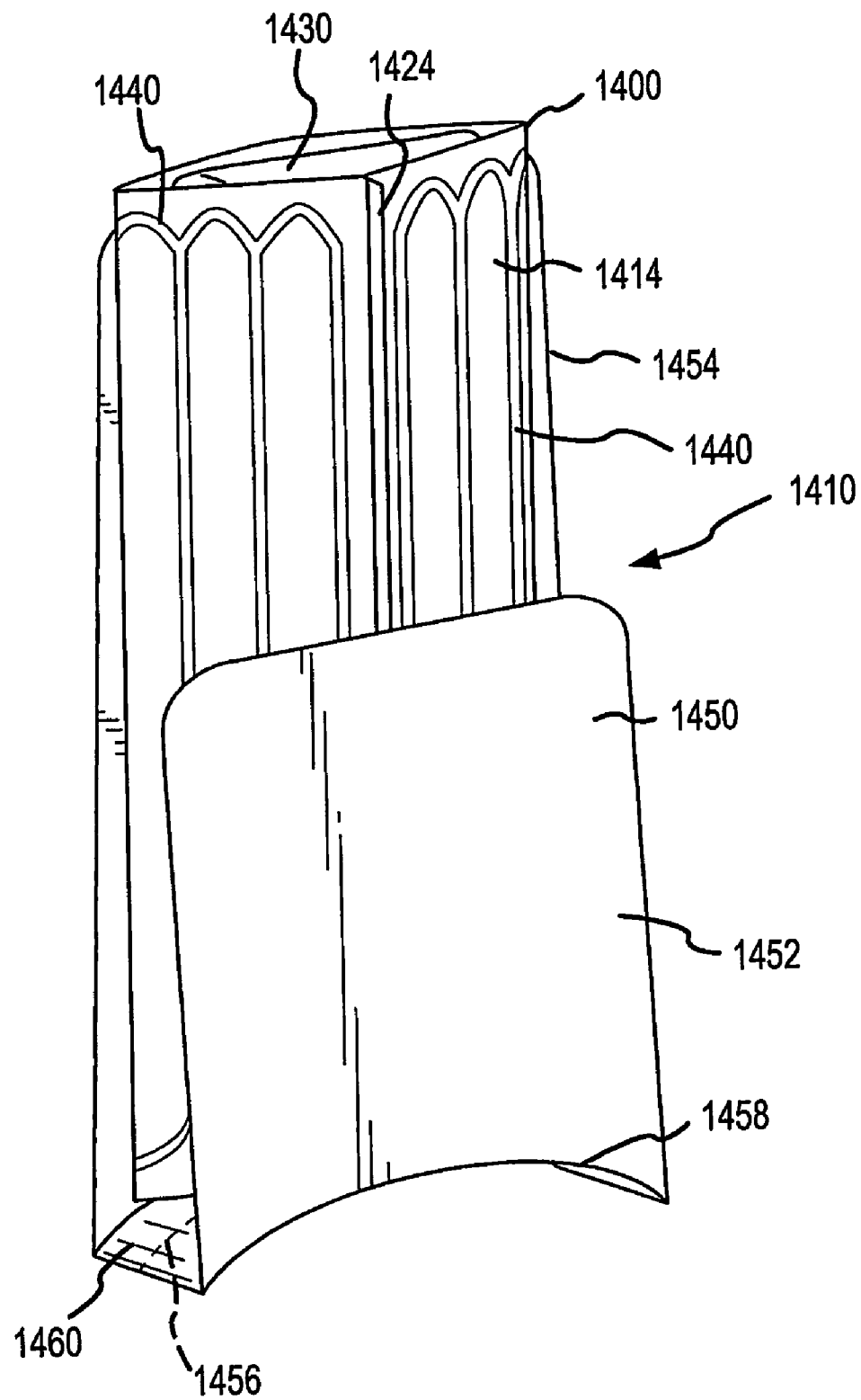
FIG. 14B is an isometric view of the collapsible cooking package of FIG. 14A in its functional position holding the cooking pouch of FIG. 13A filled with a food product.

One embodiment of the invention may include the use of the insulating microwave packaging material of the present invention in conjunction with commercially available fast food packaging designs. FIGS. 14A and 14B depict one such potential package combination 1410. As in the prior commercial designs (developed by Rapid Action Packaging, United Kingdom; further described in U.S. Pat. Nos. 5,921, 681; 6,016,950; 6,335,042; and 6,431,365), a folding carton blank 1450 with a front panel 1452 and aback panel 1454 is combined with a flexible pouch 1400 to form the package 1410. Opposing panels of the pouch 1400 are adhered to both the front panel 1452 and the back panel 1454 of the folding carton blank 1450. The folding carton blank 1450 folds in half along score line 1456 or perforation and further features an arcuate score 1458 or perforation on each of the front panel 1452 and the back panel 1454. The bottom score line fold 1456 allows the carton blank 1450 to fold flat for easy shipping and storage before filling with a food item 1430. The arcuate score lines 1458 provide a snap-open design with an arcuate bottom panel 1460. When the user moves the front panel 1452 apart from the back panel 1454, the carton 1450 snaps open the flexible pouch 1400 in a bowl-like configuration to receive a food item 1430. After the food item 1430 is placed in the carton 1450, the open end of the flexible pouch 1400 may be sealed or merely folded over and tucked to close the carton 1450 around the food item 1430 securely.

The flexible pouch 1400 may be constructed of the insulating microwave packaging material of the present invention, or alternately other non-insulating susceptor materials, for example, MicroFlex®Q or MicroRite®. Such susceptor materials are preferably heat sealable so that the edges 1424 may be sealed together to form the pouch 1400. The panel edges of the pouch 1400 may alternatively be held together with adhesive. (In the prior art design, the flexible pouch is composed of polyethylene coated paper or clear polymer film, which is heat sealable.) Patterned microwave active and passive areas may be etched into the susceptor material using the techniques previously described herein. The active areas in the location of the cells 1414 provide the lofting effect to the cells 1414. The passive areas provide for stronger pouch seals 1424 and help in the formation of surfaces, for example, raised ribs 1440, as finger holds, which are cool to the touch.

One useful examples for such a combination package 1410 is for a master pack, including multiple carton 1450 and pouch 1400 combinations according to this invention, and a package of finger style food items, e.g., French fries. The consumer may open the master pack and select an individual package 1410 formed according to this invention, pop open the bottom of the carton 1460, thereby opening the pouch 1400, fill the pouch 1400 with a serving of food, fold over the pouch opening and place the package in the microwave oven. After heating the consumer may reach into the microwave oven and grab the package by hand. The microwave inactive portions 1440 of the pouch 1400 and the carton 1450 itself are cool-to-the-touch. In this manner, the user may, unfold the pouch 1400 immediately to form the bowl-like shape and consume the food item 1430. Further, the design carton blank 1450 with the arcuate bottom panel 1460 separates the pouch 1400 completely from heat sink contact with the microwave oven floor, resulting in superior cooking performance of the microwave active pouch 1400.

The package 1410 of this invention can also be executed as a consumer retail package. A food processor would form a microwave active pouch 1400 from roll stock, attach the pouch 1400 to the paperboard carton blank 1450 with glue, fill the pouch 1400, and heat seal the pouch 1400 closed. The pouch 1400 and carton blank 1450 may be printed with graphics, which promote the product and instruct the consumer in the use of the package 1410. The package 1410 may be sized, for example, to fit in a cup holder facilitating eat-on-the-go convenience store sales. The package 1410 could be distributed either with the carton bottom 1460 erected open or folded flat. If folded flat, the consumer would be instructed to pop the carton bottom open 1460 and place the package 1410 with the food item 1430 in a microwave oven for heating. After removing the package 1410 from the microwave oven, the pouch seal is peeled opened at a cool-to-the-touch finger hold area 1440, which is microwave inactive.

Either cold glue or cold glue in combination with hot melt may be used to attach the microwave active pouch 1400 to the carton blank 1450. Hot melts bond quickly compared to cold glues, and thus increase package fabrication speeds. However, hot melts may react at the temperatures reached by the susceptor pouch 1400, allowing the pouch to detach from the carton blank 1450 and fall to the oven floor defeating the package design function. Cold glues on the other hand may be selected to resist temperatures above those reached by the microwave susceptor pouch 1400, avoiding this problem. Alternatively, the hot melt could be placed in corresponding position relative to a microwave susceptor inactive area 1440, also circumventing this problem.

Figure 15A:
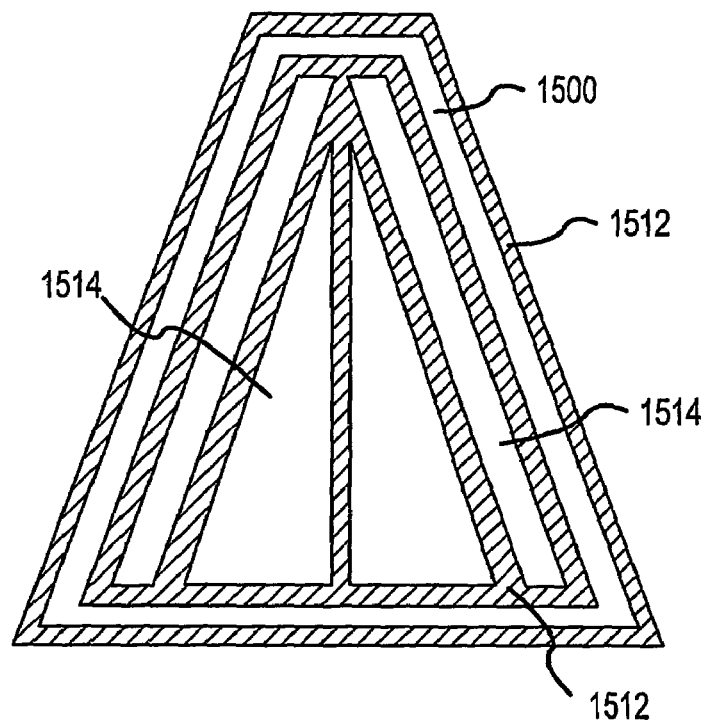
FIG. 15A is a plan view of a sheet of insulating microwave interactive material according to the present invention with triangular elongate cells and indicating the adhesive bond line pattern.
Figure 15B:
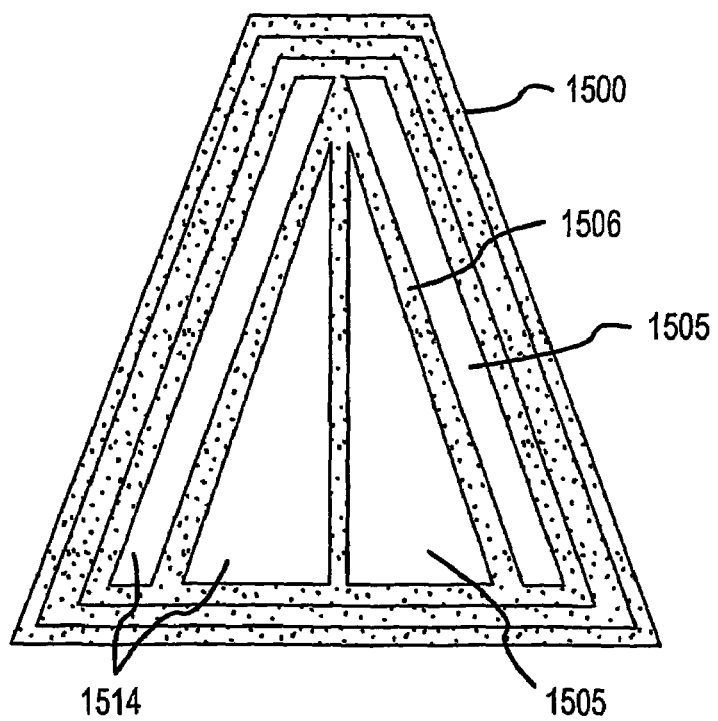
FIG. 15B is a plan view of a sheet of insulating microwave interactive material according to the present invention with triangular elongate cells and indicating areas where the microwave interactive material is inactivated.

Pouches constructed of two sheets of insulating microwave interactive material as used in several of the previous embodiments may take on various forms and shapes. One example depicted in FIGS. 15A–15D is a pouch formed as a right trapezoid designed to hold a triangular-shaped food item 1530, for example, a slice of pizza FIG. 15A depicts a sheet 1500 of insulating microwave interactive material according to the present invention. The desired adhesive pattern 1512 is shown outlining the perimeter of the sheet 1500 and outlining the cells 1514 as well. In this embodiment, each of the cells 1514 is a triangle that, when heated, will form an insulating pouch 1516 (see FIG. 15D). FIG. 15B indicates the inactive areas 1506 of the sheet 1500 that will not heat upon impingement by microwave energy. However, the cells 1514 still include a microwave energy interactive layer 1505 in order to heat the surface of a food item and expand the cells 1514 into a pillow form.

Figure 15C:
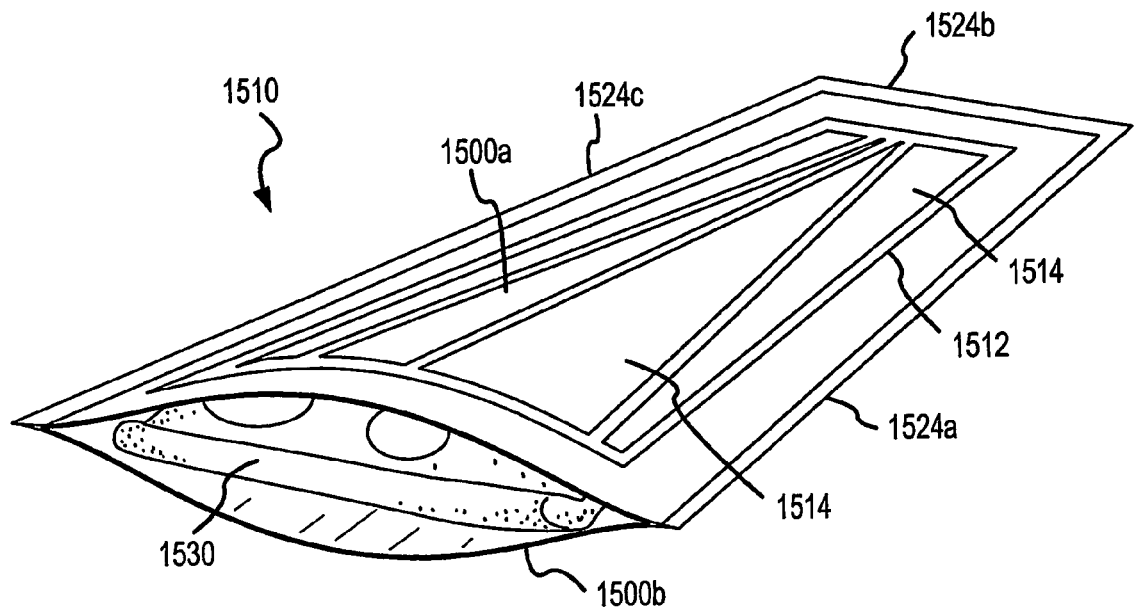
FIG. 15C is an isometric view of a cooking pouch formed of two sheets of the insulating microwave interactive material of FIGS. 15a and 15B.
Figure 15D:
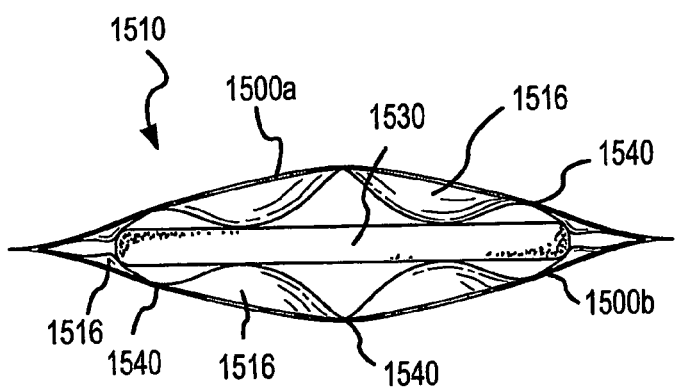
FIG. 15D is an elevation view of the open end of the cooking pouch of FIG. 15C.

FIG. 15C depicts a cooking pouch 1510 formed by adhering two sheets 1500a, 1500b of insulating microwave interactive material together around three perimeter edges 1524a, 1524b, 1524c to form a pocket with an opening at the wider parallel side. The edges 1524a, 1524b, 1524c may be adhered with adhesive or heat sealed as previously described herein. When the cooking pouch 1510 receives incident microwave energy in a microwave oven, the suceptor areas 1505 forming part of the walls of the cells 1514 heat and cause the air and water vapor in the cells 1514 to expand and form elongate insulating pillows 1516 within the cooking pouch 1510 as shown in FIG. 15D. On the exterior surface of the cooking pouch 1510, raised ribs 1540 are formed in the same pattern as the adhesive pattern 1512 due to the pillowing of the susceptor layer and the contraction of the outer plastic film layer forming the insulating microwave interactive material sheets 1500a, 1500b. These raised ribs 1540 are cool to the touch because they conform to the inactive areas 1506 of the susceptor and therefore were not substantially heated during the cooking process.

Figure 16:
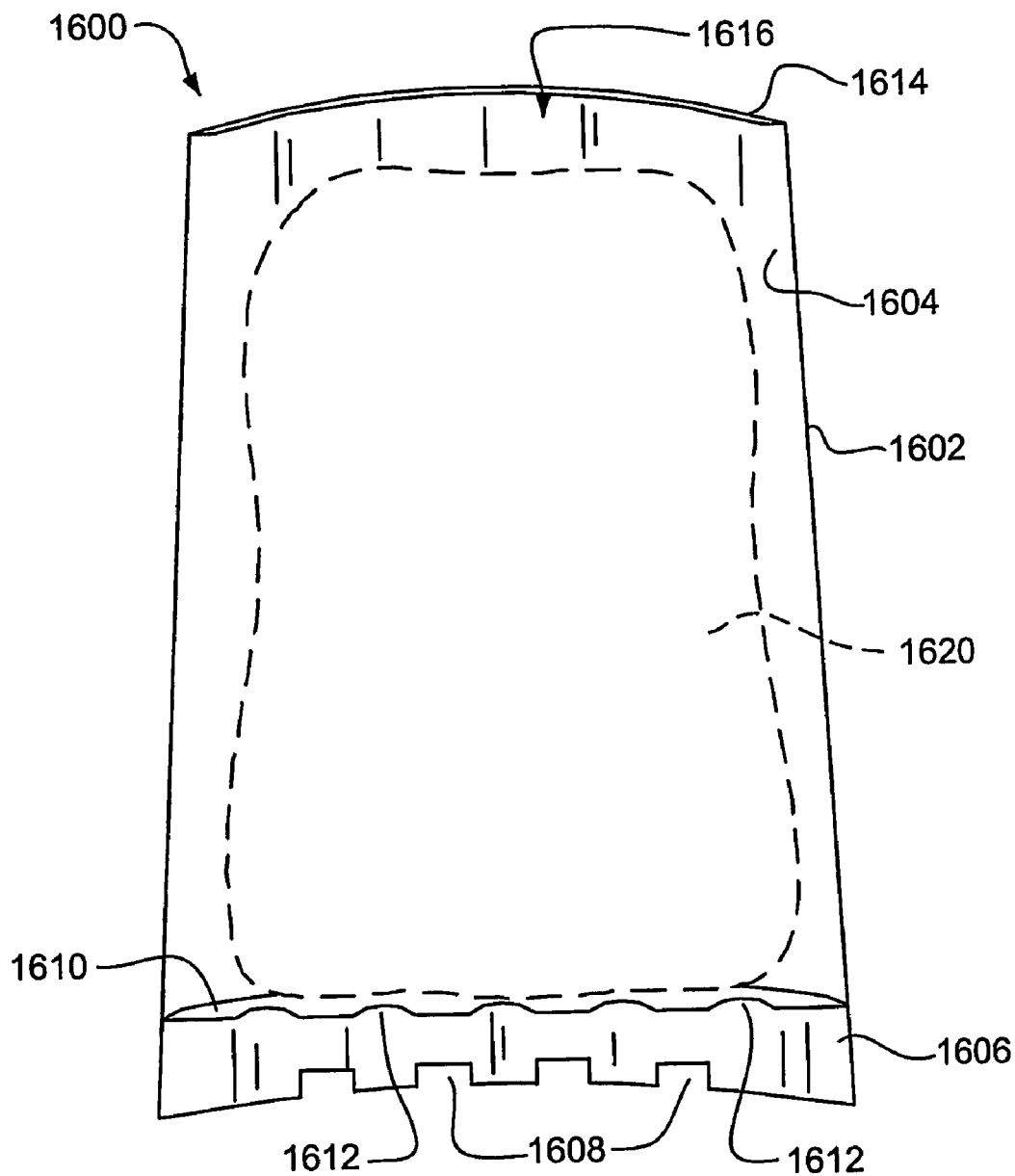
FIG. 16 is an isometric view, in cross-section, of a microwavable package according to the present invention designed to promote airflow through the package.

Another embodiment of the invention for providing low heat transfer packaging surfaces oriented toward the consumer is depicted in FIG. 16. A microwavable package 1600 is provided in the form of a modified microwave cooking sleeve. A microwave cooking sleeve is generally a paperboard sleeve that surrounds a food product. A microwave interactive layer, for example, susceptor film (e.g., MicroFlex®Q or MicroRite®) or the quilted susceptor of the present invention, is generally laminated or otherwise attached to the interior wall of the paperboard sleeve. The susceptor film is used to brown and crisp the exterior of the food product placed within the microwave cooking sleeve.

The microwavable package 1600 of FIG. 16 is actually formed more like a pocket than a sleeve. A paperboard outer wall 1602 lined on the interior surface with a susceptor film 1604 surrounds the food product 1620. The microwavable package is further constructed to form a base 1606, which may be used to stand the microwavable package 1600 upright for display, storage, cooking, and resting during eating. The base 1606 may merely be an extension of the paperboard outer wall 1602. Concealed within the paperboard outer wall 1602 and situated above the base 1606 is a floor 1610 that supports the food product 1620 when the microwavable package 1600 is placed upright on the base 1606. The floor 1610 keeps the food product 1620 spaced apart from a surface upon which the base 1606 of the microwavable package 1600 may rest. The floor 1610 may be a paperboard panel adhered to the interior surface of the paperboard outer wall 1602, similar to the construction of certain paper cups.

Provided within the base 1606 at one or more locations are vent windows 1608. These base vent windows 1608 may be cutouts along the bottom edge of the base 1606 as depicted in FIG. 16, or they may be apertures fully surrounded by the surface area of the base 1606. Further, within the floor 1610 are one or more floor vent holes 1612, provided to cooperate with the base vent windows 1608 to allow air flow into the area of the microwavable package 1600 housing the food product 1620.

The microwavable package 1600 is open at the top like a chimney 1616 to allow water vapor released by the food product 1620 during cooking to escape the constraints of the microwavable package 1600. The reduction of water vapor in the microwavable package 1600 increases the browning and crisping effect of the susceptor film 1604 on the food product, as otherwise the water vapor would counteract the drying effect of the susceptor film 1604. The top edge or rim of the paperboard outer wall 1602 may be folded, either outward or inward (as shown in FIG. 16), to form a lip 1614 surrounding the chimney opening 1616. This lip 1614 may be used as a support for a package seal that protects the food product 1620 before consumer use and that may be easily removed by the consumer before cooking and eating the food product 1620. A simple paper or plastic sheet adhered to the lip 1614 and pulled off by the consumer may suffice.

As the heated water vapor rises and exhausts through the chimney opening 1616, a draft is created in conjunction with the floor vent holes 1612 and the base vent windows 1608 whereby relatively drier outside air is drawn through the microwavable package 1600 and across the food product 1620. The overall exterior shape of the microwavable package 1600 may taper from bottom to top to enhance the chimney effect. The drafting air flow helps with the removal of water vapor as the unsaturated dry air is able to absorb additional water vapor. This increases the crisping and browning effect of the susceptor film 1604 on the food product 1620. The drafting air further provides some convection within the microwavable package 1600, thereby distributing the heat within the package and providing a more uniform cooking result.

Figure 17:
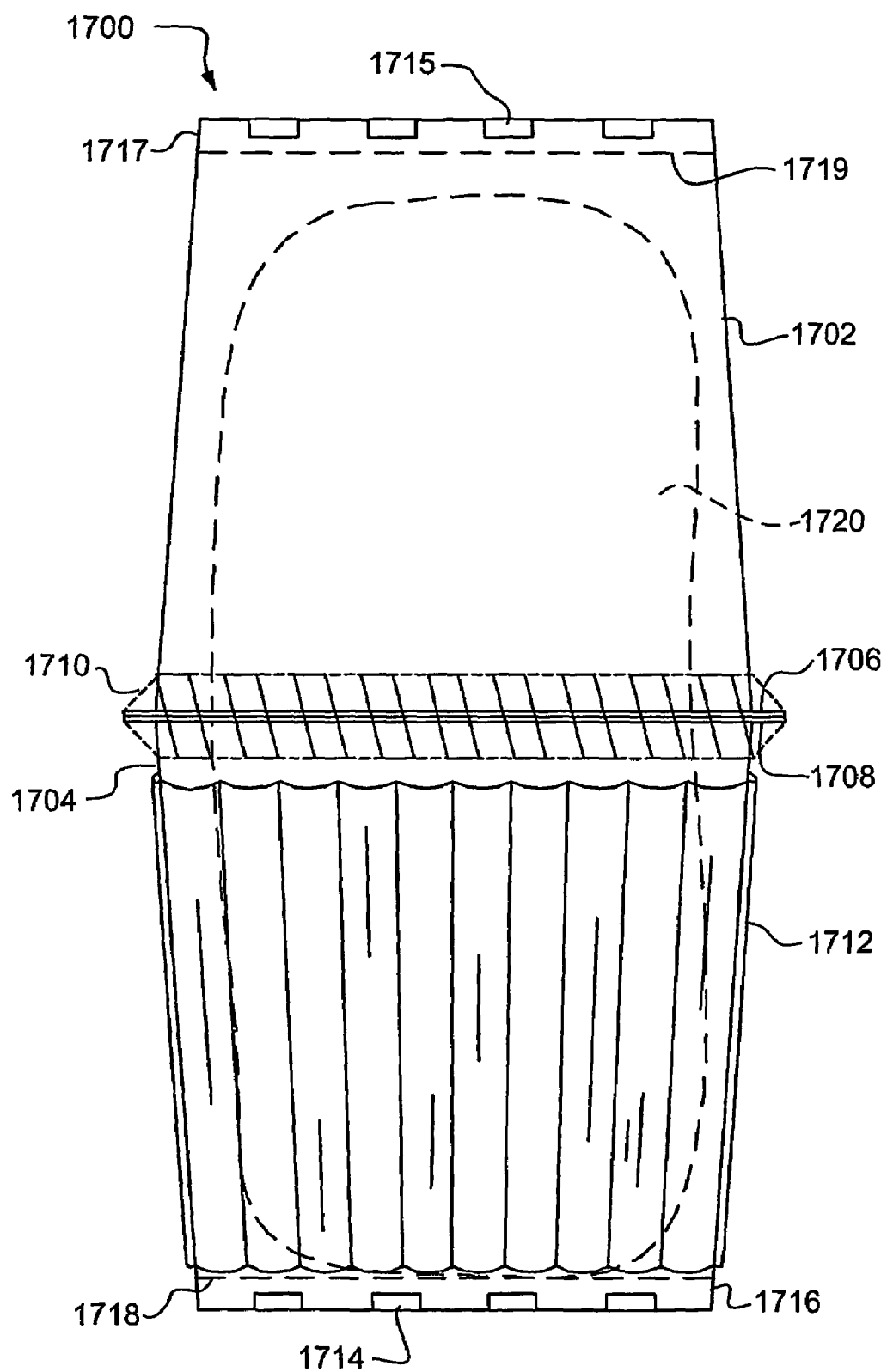
FIG. 17 is an elevation view of a microwavable package according to the present invention designed for ease of handling by a consumer.

Another embodiment of a microwavable package 1700 is depicted in FIG. 17. In this embodiment, a top cup 1702 is inverted and placed upon a bottom cup 1704 such that the major openings of each cup 1702, 1704 are adjacent to each other. Together the top cup 1702 and the bottom cup 1704 form a canister that encapsulates a food product 1720. The top cup 1702 may be provided with a first lip 1706 along the rim defining the major opening of the top cup 1702, and the bottom cup 1704 may be provided with a second lip 1708 along the rim defining the major opening of the bottom cup 1704. The lips 1706, 1708 are preferably folded outwardly, away from the outer surface of the cups 1702, 1704, thereby allowing the top cup 1702 to nest or stack within the bottom cup 1704 (or vice versa) for ease of storage and reduced shipping bulk before the cups 1702, 1704 are formed as a canister to surround a food product 1720. Use of the cup shape also provides convenience to the consumer, for example, for holding the microwavable package 1700 while eating the food product 1720, standing the microwavable package 1700 upright for storage or during cooking, or eating on-the-go, as the microwavable package 1700 will easily rest in an automobile cup holder.

Each of the top cup 1702 and bottom cup 1704 may be constructed of paperboard and lined on its interior surface with a susceptor, as in the embodiment shown in FIG. 16. Further, the bottom cup 1704 may include vent windows 1714 in its base 1716, and similarly vent holes (not shown in FIG. 17, but substantially the same as the vent holes 1612 in FIG. 16) in the floor 1718 of the cup. The top cup 1702 maybe made exactly the same as the bottom cup 1704 with vent windows 1715 in the base 1717 and vent holes (not shown) in its inverted floor 1719. The vent holes in the top cup 1702 may perform the same function as the chimney opening 1616 in the microwavable package 1600 of FIG. 16 by allowing the water vapor generated during cooking to exhaust and creating an air flow draw in conjunction with the vent windows 1714 and vent holes of the bottom cup 1704. The vent windows of the top cup 1702 are nonfunctional in this instance. However, by this symmetric design, the top cup 1702 can be substituted for the bottom cup 1704 during assembly of the canister arrangement, making the manufacture of only one form of a cup necessary. Further, the floor 1719 of the top cup 1702 (and similarly the floor 1718 of the bottom cup 1704) may be made to be easily removable by the consumer to create a large, chimney-like opening in the top cup 1702 as in the embodiment of FIG. 16.

The top cup 1702 may be sealed to the bottom cup 1704 by adhering the lips 1706, 1708 of the cups together. As an alternative example, plastic shrink-wrap tear-tape 1710 may be used to hold the top cup 1702 and bottom cup 1704 together at the interface between the lips 1706, 1708. The use of tear-tape 1710 further provides tamper evidence to the consumer to assure the safety of the food product 1720. With the use of tear-tape 1710, the consumer may quickly open the microwavable package 1700 by pulling the tear-tape 1710 and lifting the top cup 1702 off the bottom cup 1704, revealing the food product contained with Alternately, plastic shrink-wrap may cover the entire microwavable package 1700, for example, for freezer protection. A tear-strip 1710 may be placed in a portion of the shrink wrap to facilitate opening of the microwavable package 1700. The shrink-wrap may also be printed with graphics and other product information to minimize the cost of manufacture of the microwavable package 1700. The consumer may further proceed to eat the food product while holding the bottom cup 1704 in hand. In this manner, the microwavable package 1700 becomes a convenient, portable, on-the-go, serving utensil.

To aid in the ability of the bottom cup 1704 to be used as a serving utensil, a corrugated paper sleeve 1712, or other insulating surface may be placed on the outer surface of the bottom cup 1704 to insulate the consumer's hand from the extreme heat of the susceptor film transferred through the paperboard wall of the bottom cup 1704. Other materials may be used to provide the desired consumer insulation on the outer surface of the bottom cup 1704. These materials may include, for example, a cavitated film coating; a high density polyethylene coating, a polyvinyl-chloride shrink-wrap sleeve; and the polypropylene substrate configuration that creates the quilted, air-cell surface as shown and described herein with respect to FIG. 10C.

Figure 18:
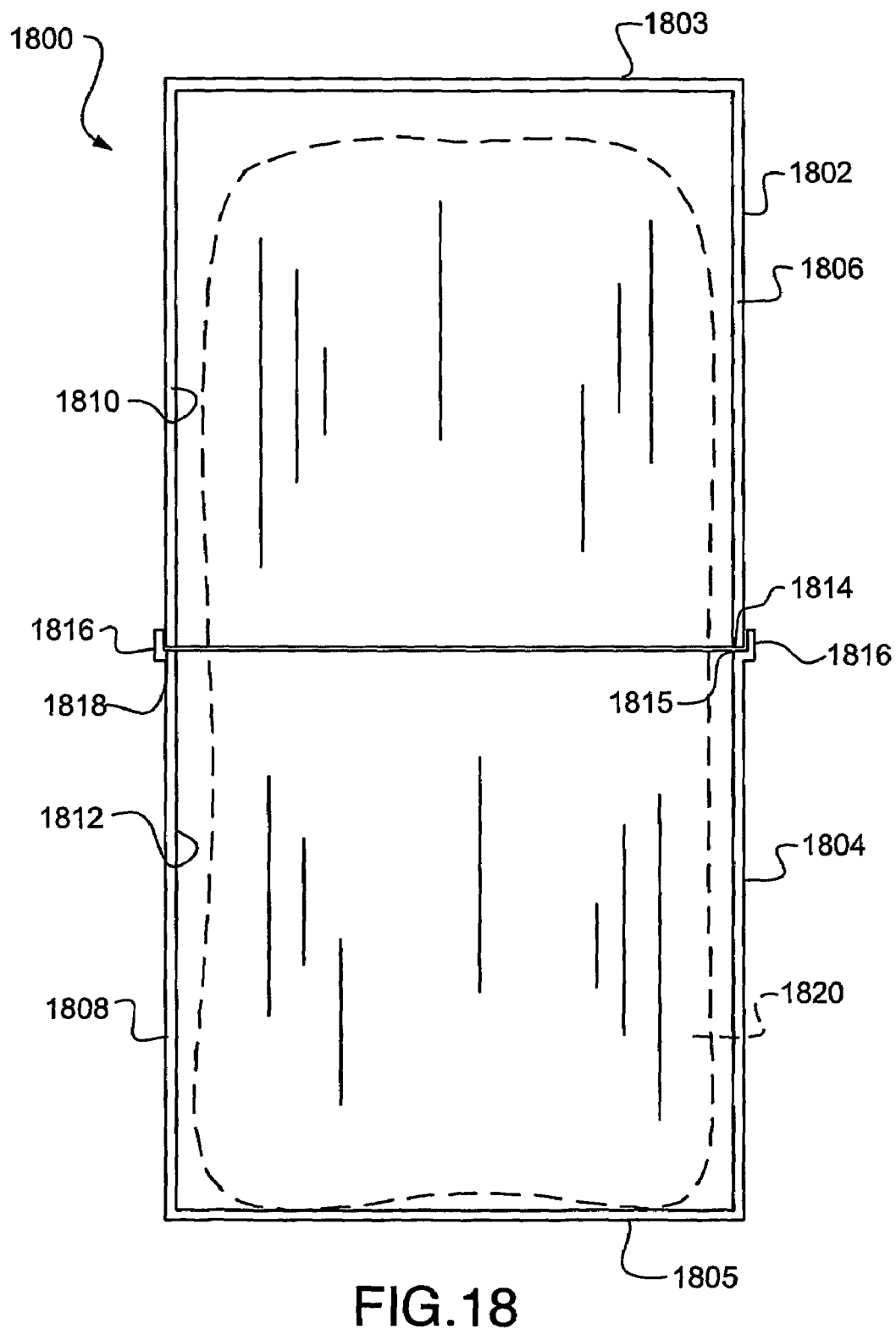
FIG. 18 is an elevation view, in cross-section, of a microwavable package according to the present invention design for ease of handling by a consumer.

Another embodiment of a microwavable package 1800 according to the present invention is depicted in FIG. 18. The microwavable package 1800 is of a similar configuration to the microwavable package 1700 of FIG. 17. The microwavable package 1800 consists of a top cup 1802 inverted and placed upon a bottom cup 1804 such that the major openings of each cup 1802, 1804 are adjacent to each other. Together the top cup 1802 and the bottom cup 1804 form a canister that encapsulates a food product 1820. The outer wall 1806 of the top cup 1802 and the outer wall 1808 of the bottom cup 1804 may each be constructed of paperboard and lined on each respective interior surface with a susceptor 1810, 1812. Further, the bottom cup 1804 may include vent windows in its base and vent holes in a floor (not shown), similar to the corresponding structures depicted in and described with respect to FIGS. 16 and 17. The top cup 1802 may also include some type of venting aperture in its inverted floor 1803 as described with respect to FIG. 17, or the floor panel 1803 may be designed to be easily removed by the consumer for cooking, as described with respect to FIG. 16.

The top cup 1802 has a rim 1814 defining the major opening of the top cup 1802. The bottom cup 1804 maybe formed with a flange 1816 along its rim 1815 defining the major opening of the bottom cup 1804. The flange 1816 may be formed in the rim 1815 of the bottom cup 1804 by compression of the paperboard forming the bottom cup 1804, for example, in a mold or a clamping device. The flange 1816 may extend beyond the outer surface of the bottom cup 1804 to form a shelf 1818 along the rim 1815. The major opening in the top cup 1802 defined by the rim 1814 and the major opening in the bottom cup 1804 defined by the rim 1815 may be symmetrical in dimension such that the rim 1814 of the top cup 1802 rests upon the shelf 1818. The flange 1816 of the bottom cup 1804 extends above the shelf 1818 and covers a portion of the exterior surface of the top cup 1802 along its rim 1814. In this manner, the top cup 1802 nests within the flange 1816 of the bottom cup 1804 to form a canister. As with the second embodiment described with respect to FIG. 17, the bottom cup 1804 may be covered with an insulating surface (not shown) to mitigate heat transfer to the consumer when holding the microwavable package 1800 after it has been heated in a microwave oven.

Figure 19:
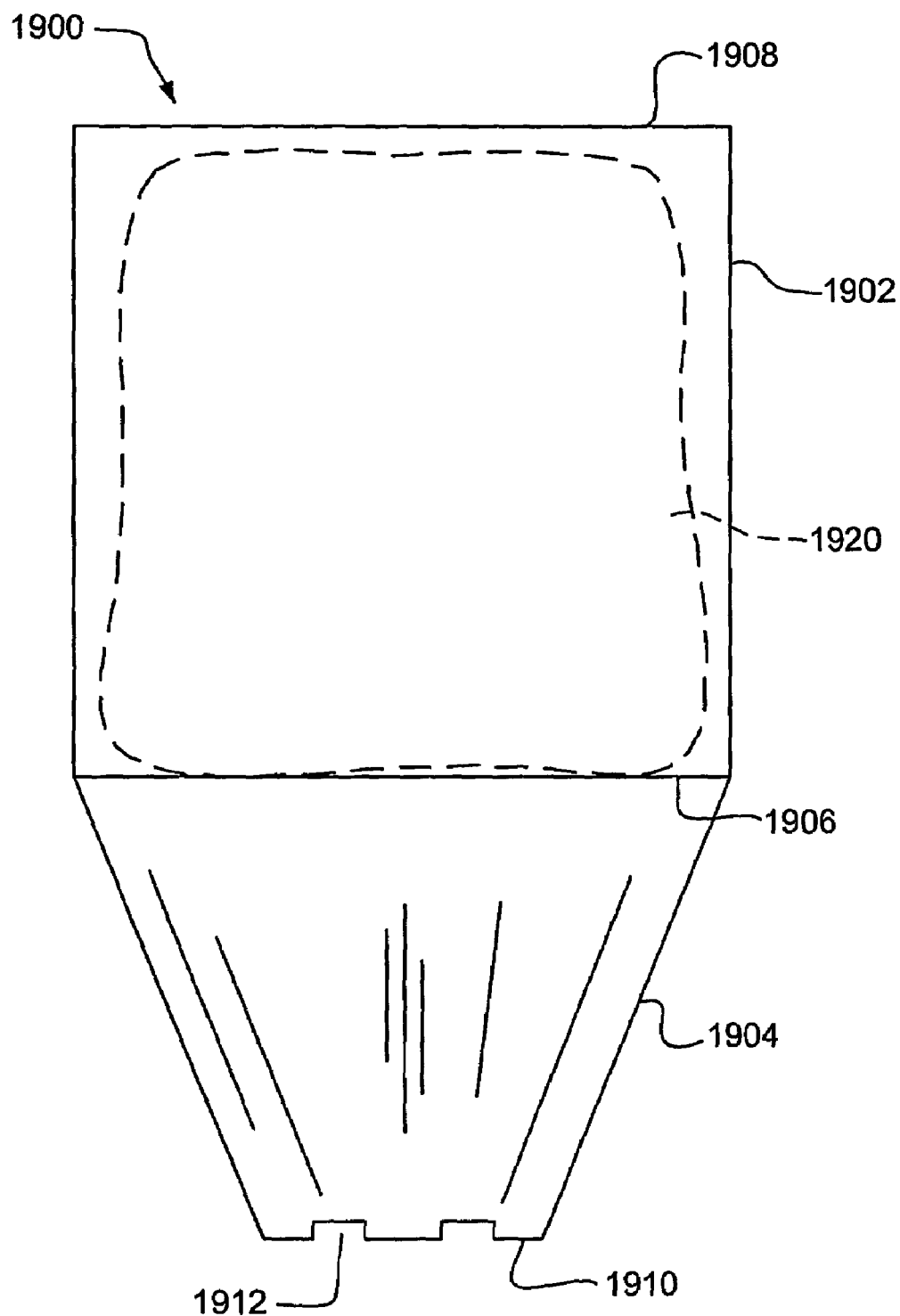
FIG. 19 is an elevation view of a microwavable package according to the present invention also designed for ease of handling by a consumer.

In the embodiment of FIG. 19, a microwavable package 1900 is again formed from a paperboard substrate. The upper portion 1902 of the microwavable package 1900 contains the food product 1920 to be heated. The inner wall of the paperboard substrate in the upper portion 1902 may be covered by a susceptor (not shown) to enhance the crisping and browning of the food product 1920 inside. The food product 1920 may be supported by a floor 1906 in the upper portion 1902 of the microwavable package 1900 that separates the upper portion 1902 from the lower portion 1904.

The lower portion 1904 of the microwavable package 1900 may not be covered by a susceptor film as there is no food product 1920 in lower portion of the microwavable package 1900. Further, the lower portion 1904 may be tapered for ease of holding the microwavable package 1900 by the consumer. For example, if the upper portion 1902 of the microwavable package 1900 were cylindrical, as the cup embodiments previously described, the lower portion 1904 may be a frustum. The bottom 1910 of the lower portion 1904 may be flat in order to support the microwavable package 1900 in an upright position on a flat surface, for example, on a shelf for storage or in the microwave during cooking.

As in the previous embodiments described with respect to FIGS. 16–18, the microwavable package 1900 depicted in FIG. 19 may provide for upward exhausting of water vapor from the upper portion during cooking. The top 1908 of the upper portion 1902 may be a sheet, for example of paper or plastic, that is easily removable by the consumer. Alternatively, the top 1908 may contain apertures to allow the water vapor released during the cooking process to escape the upper portion 1902. In addition, the floor 1906, in conjunction with the lower portion 1904, may be configured to provide a draft through vent holes (not shown) in the floor 1906 and vent windows 1912 in the lower portion 1904, creating a chimney effect as described with respect to previous embodiments.

Figure 20:
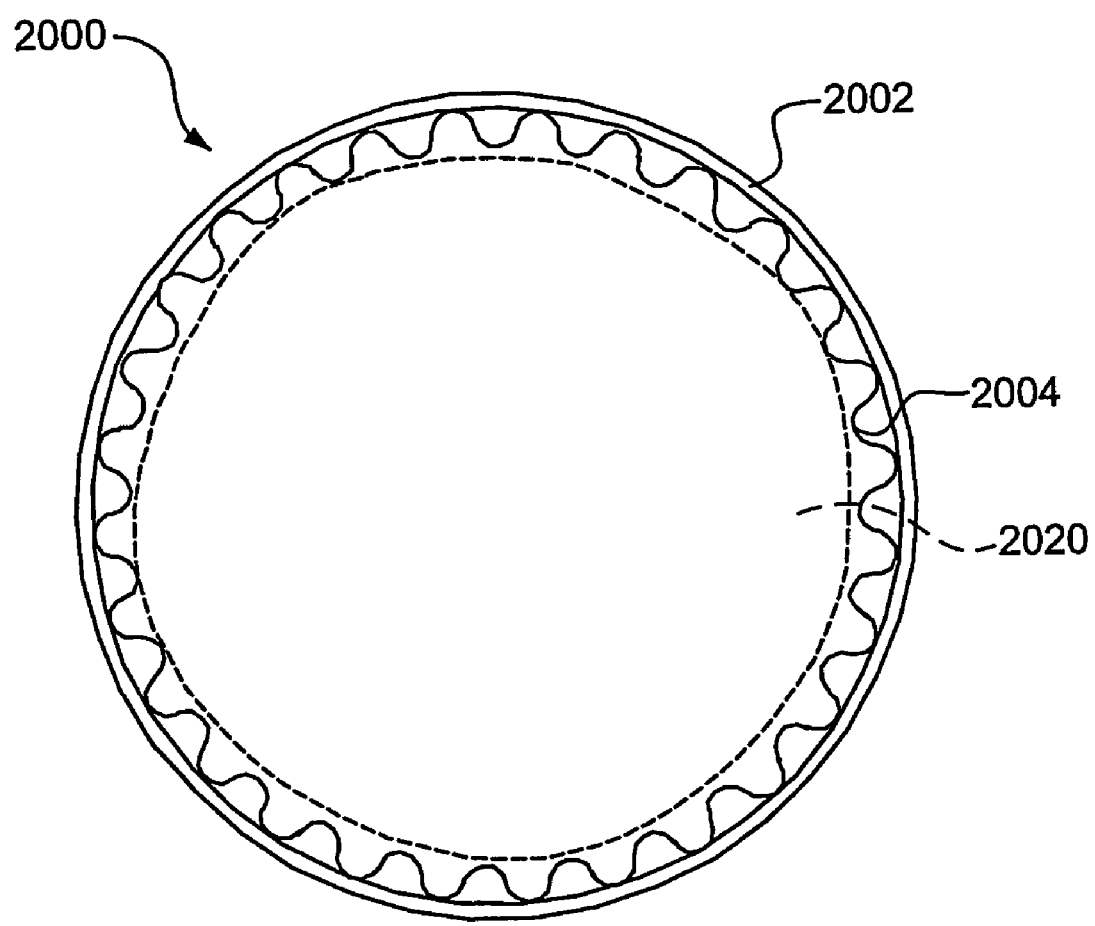
FIG. 20 is a top plan view, in cross-section, of another embodiment of a microwavable package according to the present invention with a corrugated susceptor.

Yet another embodiment of the present invention is depicted in FIG. 20. A microwavable package 2000 is created from a paperboard substrate forming a package wall 2002. Lining the interior of the package wall 2002 is a corrugated susceptor 2004 (i.e., a susceptor film adhered to a dimensionally stable substrate, for example, paper). The corrugated susceptor 2004 provides enhanced browning and crisping to a food product 2020 placed within the microwavable package 2000. The corrugated susceptor 2004 provides an added benefit by mitigating the heat transfer between the corrugated susceptor 2004 and the package wall 2002, and thus heat transfer to the consumer holding the microwavable package 2000 after cooking. This mitigation occurs because of the low surface area contact between the corrugated susceptor 2004 and the package wall 2002.

When used in a package configuration as depicted in FIG. 16, the corrugated susceptor 2004 of FIG. 20 provides additional benefits. If the food product 2020 is bulky or substantially fills the space within the microwavable package 2000, the corrugated susceptor 2004 may still provide for venting of water vapor from the food product 2020 along the channels forming the corrugation. Similarly, a draft of air from vents in the bottom of the microwavable package 2000 may still be drawn to create a chimney-like effect with an opening in the top of the microwavable package 2000. Further, the channels formed between the corrugated susceptor 2004 and the package wall 2002 may allow air to draft from vents in the bottom of the microwavable package 2000, which further insulates the package wall 2002 from the heat of the corrugated susceptor 2004.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An insulating microwave packaging material comprising:
   a first substantially vapor impermeable substrate;
   a layer of microwave interactive material supported by the first substantially vapor impermeable substrate;
   a dimensionally stable substrate bonded to the layer of microwave interactive material; and
   a second substantially vapor impermeable substrate bonded to the dimensionally stable substrate, wherein
      the second substantially vapor impermeable substrate and the dimensionally stable substrate are bonded along bond lines formed in a pattern;
      the bond lines are substantially vapor impermeable; and
      the pattern defines a plurality of closed cells bounded by the second substantially vapor impermeable substrate, the dimensionally stable substrate, and the bond lines; wherein,
   upon impingement of the insulating microwave packaging material by microwave energy in a microwave oven, each of the plurality of closed cells expands to form an insulating pocket comprising;
      a bulging side; and
      an opposing side; wherein
         the bulging side comprises a portion of each of the first substantially vapor impermeable substrate, the microwave interactive material layer, and the dimensionally stable substrate;
         the opposing side comprises a portion of the second substantially vapor impermeable substrate; and
         the bulging side lofts away from the opposing side.

2. The insulating microwave packaging material as described claim 1, wherein when a food product is situated adjacent to the first substantially vapor impermeable substrate, upon impingement of the insulating microwave packaging material by microwave energy in the microwave oven, each of the insulating pockets insulates at least one of the food product and the layer of microwave interactive material from the microwave oven environment to reduce heat transfer from at least one of the food product and the layer of microwave interactive material to the microwave oven environment.

3. The insulating microwave packaging material as described claim 1, wherein upon impingement of the insulating microwave packaging material by microwave energy in the microwave oven, the microwave interactive material layer creates sensible heat that further heats and softens the first substantially vapor impermeable substrate, decreasing resistance of the first substantially vapor impermeable substrate to the formation of the insulating pocket.

4. The insulating microwave packaging material as described claim 1, wherein
   upon impingement of the insulating microwave packaging material by microwave energy in the microwave oven,
   the microwave interactive material layer creates sensible heat that further heats the second substantially vapor impermeable substrate, and
   the second substantially vapor impermeable substrate contracts in at least one of the X and Y directions, enhancing the loft of the bulging side.

5. The insulating microwave packaging material as described claim 1, wherein upon impingement of the insulating microwave packaging material by microwave energy in the microwave oven, a distance between the second vapor impermeable substrate and the dimensionally stable substrate in a center of each of the plurality of closed cells increases by at least an order of magnitude more than the distance before such impingement.

6. The insulating microwave packaging material as described claim 1, wherein upon impingement of the insulating microwave packaging material by microwave energy in the microwave oven, a distance between the second vapor impermeable substrate and the dimensionally stable substrate in a center of each of the plurality of closed cells increases by up to 30 times more than the distance before such impingement.

7. The insulating microwave packaging material as described claim 1, further comprising:
   a first edge; and
   a second edge opposite the first edge; wherein
   the first edge is bonded to the second edge; and
   the microwave packaging material forms a sleeve for surrounding the food product.

8. The insulating microwave packaging material as described claim 7, wherein
   the first substantially vapor impermeable substrate comprises an interior surface of the sleeve; and
   the second substantially vapor impermeable substrate comprises an exterior surface of the sleeve.

9. The insulating microwave packaging material as described claim 8, wherein the bond between the first edge and the second edge is formed by a heat seal.

10. The insulating microwave packaging material as described claim 7, wherein the bond between the first edge and the second edge is formed by an adhesive.

11. The insulating microwave packaging material as described in claim 1, wherein
   a portion of a first sheet of the insulating microwave packaging material is bonded to a portion of a second sheet of the insulating microwave packaging material; and
   the second substantially vapor impermeable substrate of the first sheet faces the second substantially vapor impermeable substrate of the second sheet.

12. The insulating microwave packaging material as described in claim 11, wherein
   the first sheet is defined by a first perimeter;
   the second sheet is defined by a second perimeter; and
   the first sheet is bonded to the second sheet at a plurality of points spaced apart along the first perimeter and the second perimeter, wherein,
   the first sheet and the second sheet are substantially unrestricted from contraction in at least one of the X and Y directions, and wherein
      upon impingement of the insulating microwave packaging material by microwave energy in the microwave oven,
      the microwave interactive material layer creates sensible heat that further heats the second substantially vapor impermeable substrate of each of the first sheet and the second sheet, and
      the second substantially vapor impermeable substrate of each of the first sheet and the second sheet contracts in at least one of the X and Y directions, enhancing the loft of the bulging side of each of the insulating pockets.

13. The insulating microwave packaging material as described in claim 12, wherein
   when the food product is situated over at least a portion of the first sheet, and
   the second sheet is situated against a surface of the microwave oven,
   upon impingement of the insulating microwave packaging material by microwave energy in the microwave oven,
   the microwave interactive material layer of the second sheet heats the surface of the microwave oven and the first sheet,
      counteracting the heat transfer between the food product and the surface of the microwave oven;
      augmenting the contraction of the second substantially vapor impermeable substrate of the first sheet; and
      enhancing the expansion of each of the plurality of closed cells of the first sheet.

14. The insulating microwave packaging material as described in claim 11, wherein, upon impingement of the insulating microwave packaging material by microwave energy in the microwave oven,
   the first sheet deforms into a convex canopy with respect to a plane dividing the first sheet and the second sheet; wherein
   a space is created between the first sheet and the second sheet.

15. The insulating microwave packaging material as described in claim 11, wherein, upon impingement of the insulating microwave packaging material by microwave energy in the microwave oven,
   the second sheet deforms into a convex canopy with respect to a plane dividing the first sheet and the second sheet; wherein
   a space is created between the first sheet and the second sheet.

16. The insulating microwave packaging material as described in claim 1, wherein
   a first sheet of the insulating microwave packaging material defined by a first perimeter is bonded to a second sheet of the insulating microwave packaging material defined by a second perimeter;
   at least a portion of the first perimeter is bonded to at least a portion of the second perimeter creating a cavity between the first sheet and the second sheet for receiving a food product; and
   the first substantially vapor impermeable substrate of the first sheet faces the first substantially vapor impermeable substrate of the second sheet.

17. The insulating microwave packaging material as described in claim 16, wherein an opening to the cavity between the first sheet and the second sheet is provided.

18. The insulating microwave packaging material as described in claim 17, wherein the opening is large enough to accept the food product, and the cavity comprises a pouch.

19. The insulating microwave packaging material as described in claim 17, wherein the opening is a vent to allow water vapor to escape from the cavity during cooking of the food product.

20. The insulating microwave packaging material as described in claim 16, wherein all of the first perimeter is bonded to all of the second perimeter and the food product in the cavity is completely enclosed by the first sheet and the second sheet.

21. The insulating microwave packaging material as described in claim 16, wherein
   a third sheet of the insulating microwave packaging material defined by a third perimeter is bonded to the second sheet at a plurality of points spaced apart along the third perimeter and the second perimeter; and
   the second substantially vapor impermeable substrate of the second sheet faces the second substantially vapor impermeable substrate of the third sheet; and wherein
   when the food product is situated within the cavity, and
   the third sheet is situated against a surface of the microwave oven,
   upon impingement of the insulating microwave packaging material by microwave energy in the microwave oven,
   the microwave interactive material layer of the third sheet heats the surface of the microwave oven and the second sheet,
      counteracting the heat transfer between the food product and the surface of the microwave oven;
      augmenting the contraction of the second substantially vapor impermeable substrate of the second sheet; and
      enhancing the expansion of each of the plurality of closed cells of the second sheet.

22. The insulating microwave packaging material as described in claim 1, wherein the first substantially vapor impermeable substrate comprises a biaxially-oriented polyester film.

23. The insulating microwave packaging material as described in claim 1, wherein the second substantially vapor impermeable substrate comprises a biaxially-oriented polyester film.

24. A microwave packaging carton comprising:
   a top surface;
   a bottom surface;
   a first sheet of insulating microwave packaging material according to claim 1; and a second sheet of insulating microwave packaging material according to claim 1; wherein
the first sheet of insulating microwave packaging material is affixed to the top surface in a manner allowing the first sheet to contract in at least on of the X and Y directions upon impingement of the insulating microwave packaging material by microwave energy; and
the second sheet of insulating microwave packaging material is affixed to the bottom surface in a manner allowing the first sheet to contract in at least on of the X and Y directions upon impingement of the insulating microwave packaging material by microwave energy.

25. The microwave packaging carton of claim 24, wherein at least one of the first sheet and the second sheet is affixed to the top surface or the bottom surface, respectively, by an adhesive.

26. The microwave packaging carton of claim 24, wherein at least one of the first sheet and the second sheet has at least one slit cut adjacent to a portion of a perimeter of the respective first sheet or the second sheet augmenting the ability of the respective first sheet or the second sheet to contract in at least on of the X and Y directions.

27. An insulating microwave packaging material comprising:
a first substantially vapor impermeable substrate;
a layer of microwave interactive material supported by the first substantially vapor impermeable substrate;
a dimensionally stable substrate bonded to the layer of microwave interactive material; and
a second substantially vapor impermeable substrate bonded to the dimensionally stable substrate, wherein
the second substantially vapor impermeable substrate and the dimensionally stable substrate are bonded along bond lines formed in a pattern;
the bond lines are substantially vapor impermeable; and
the pattern defines a plurality of closed cells bounded by the second substantially vapor impermeable substrate, the dimensionally stable substrate, and the bond lines; wherein,
upon impingement of the insulating microwave packaging material by microwave energy in a microwave oven, each of the plurality of closed cells expands to form an insulating pocket comprising:
a bulging side; and
an opposing side; wherein
the bulging side comprises a portion of the second substantially vapor impermeable substrate;
the opposing side comprises a portion of each of the first substantially vapor impermeable substrate, the microwave interactive material layer, and the dimensionally stable substrate; and
the bulging side lofts away from the opposing side.

28. The insulating microwave packaging material as described in claim 27, wherein when a food product is situated adjacent to the second substantially vapor impermeable substrate, upon impingement of the insulating microwave packaging material by microwave energy in the microwave oven, each of the insulating pockets insulates at least one of the food product and the layer of microwave interactive material from the microwave oven environment to reduce heat transfer from at least one of the food product and the layer of microwave interactive material to the microwave oven environment.

29. The insulating microwave packaging material as described in claim 27, wherein when a food product is situated adjacent to the second substantially vapor impermeable substrate, upon impingement of the insulating microwave packaging material by microwave energy in the microwave oven, each of the insulating pockets insulates at least one of the food product and the layer of microwave interactive material from a consumer's skin to reduce heat transfer from at least one of the food product and the insulating microwave packaging material to the consumer's skin when the consumer removes the insulating microwave packaging material from the microwave oven after cooking.

30. The insulating microwave packaging material as described claim 27, wherein upon impingement of the insulating microwave packaging material by microwave energy in the microwave oven, the microwave interactive material layer creates sensible heat that further heats and softens the second substantially vapor impermeable substrate, decreasing resistance of the second substantially vapor impermeable substrate to the formation of the insulating pocket.

31. The insulating microwave packaging material as described in claim 27, wherein the second substantially vapor impermeable substrate comprises an amorphous polyester film.

32. The insulating microwave packaging material as described claim 1 or 27, wherein upon impingement of the insulating microwave packaging material by microwave energy in the microwave oven, moisture trapped in the dimensionally stable substrate heats and expands as a vapor, creating pressure, which forms the insulating pocket.

33. The insulating microwave packaging material as described claim 1 or 27, wherein upon impingement of the insulating microwave packaging material by microwave energy in the microwave oven, the microwave interactive material layer creates sensible heat that further heats moisture trapped in the dimensionally stable substrate, which moisture expands as a vapor, creating pressure, which forms the insulating pocket.

34. The insulating microwave packaging material as described claim 1 or 27, wherein upon impingement of the insulating microwave packaging material by microwave energy in the microwave oven, the opposing side remains substantially flat.

35. The insulating microwave packaging material as described claim 1 or 27, wherein upon impingement of the insulating microwave packaging material by microwave energy in the microwave oven, the microwave interactive material layer becomes insulated from the microwave oven environment to reduce heat transfer from the layer of microwave interactive material to the microwave oven environment.

36. The insulating microwave packaging material as described in claim 1 or 27, wherein the pattern comprises an array of shapes selected from a group comprising: a circle, an oval, a curvilinear shape, a symmetrical curvilinear shape, a triangle, a square, a rectangle, a polygon, a right polygon, and an equilateral polygon.

37. The insulating microwave packaging material as described in claim 36, wherein the equilateral polygon is a hexagon.

38. The insulating microwave packaging material as described in claim 36, wherein each of the shapes in the array is nested with each adjacent shape in the array in a tile-like pattern.

39. The insulating microwave packaging material as described in claim 36, wherein each of the shapes in the array is elongate and oriented parallel to adjacent shapes.

40. The insulating microwave packaging material as described in claim 1 or 27, wherein the microwave interactive material layer comprises aluminum.

41. The insulating microwave packaging material as described in claim 1 or 27, wherein the dimensionally stable substrate is selected from a group comprising: paper, paperboard, and plastic.

42. The insulating microwave packaging material as described in claim 1 or 27, wherein the bond lines comprise an adhesive.

43. The insulating microwave packaging material as described in claim 42, wherein the adhesive penetrates the dimensionally stable substrate to form a substantially vapor impermeable barrier in conjunction with the first substantially vapor impermeable substrate.

44. The insulating microwave packaging material as described in claim 1 or 27, wherein the wherein portions of the microwave interactive material are inactivated in the same pattern as the bond lines.

45. The insulating microwave packaging material as described in claim 1 or 27, wherein the bond lines comprise a heat seal.

46. The insulating microwave packaging material as described in claim 45, wherein the heat seal is formed by melting the second substantially vapor impermeable substrate along the bond lines, and wherein a melted portion of the second substantially vapor impermeable substrate penetrates the dimensionally stable substrate to form a substantially vapor impermeable barrier in conjunction with the first substantially vapor impermeable substrate.

47. A method of making an insulating microwave packaging material, the method comprising:
   providing a first substantially vapor impermeable substrate;
   supporting a layer of microwave interactive material on the first substantially vapor impermeable substrate;
   bonding a dimensionally stable substrate to the layer of microwave interactive material; and
   bonding a second substantially vapor impermeable substrate to the dimensionally stable substrate along bond lines formed in a pattern, wherein
      the bond lines are substantially vapor impermeable; and
      the pattern defines a plurality of closed cells bounded by the second substantially vapor impermeable substrate, the dimensionally stable substrate, and the bond lines; and wherein,
   upon impingement of the insulating microwave packaging material by microwave energy in a microwave oven, each of the plurality of closed cells expands to form an insulating pocket comprising:
      a bulging side; and
      an opposing side; wherein
         the bulging side comprises a portion of each of the first substantially vapor impermeable substrate, the microwave interactive material layer, and the dimensionally stable substrate;
         the opposing side comprises a portion of the second substantially vapor impermeable substrate; and
         the bulging side lofts away from the opposing side.

48. The method as described claim 47, wherein when a food product is situated adjacent to the first substantially vapor impermeable substrate, upon impingement of the insulating microwave packaging material by microwave energy in the microwave oven, each of the insulating pockets insulates at least one of the food product and the layer of microwave interactive material from the microwave oven environment to reduce heat transfer from at least one of the food product and the layer of microwave interactive material to the microwave oven environment.

49. The method as described claim 47, wherein upon impingement of the insulating microwave packaging material by microwave energy in the microwave oven, the microwave interactive material layer creates sensible heat that further heats and softens the first substantially vapor impermeable substrate decreasing resistance of the first substantially vapor impermeable substrate to the formation of the insulating pocket.

50. The method as described claim 47, wherein upon impingement of the insulating microwave packaging material by microwave energy in the microwave oven,
   the microwave interactive material layer creates sensible heat that further heats the second substantially vapor impermeable substrate, and
   the second substantially vapor impermeable substrate contracts in at least one of the X and Y directions, enhancing the loft of the bulging side.

51. The method as described claim 47, wherein upon impingement of the insulating microwave packaging material by microwave energy in the microwave oven, a distance between the second vapor impermeable substrate and the dimensionally stable substrate in a center of each of the plurality of closed cells increases by at least an order of magnitude more than the distance before such impingement.

52. The method as described claim 47, wherein upon impingement of the insulating microwave packaging material by microwave energy in the microwave oven, a distance between the second vapor impermeable substrate and the dimensionally stable substrate in a center of each of the plurality of closed cells increases by up to 30 times more than the distance before such impingement.

53. The method as described claim 47, wherein the insulating microwave packaging material further comprises:
   a first edge; and
   a second edge opposite the first edge; and
   wherein the method further comprises:
      bonding the first edge to the second edge; wherein
      the microwave packaging material forms a sleeve for surrounding the food product.

54. The method as described claim 53, wherein the first substantially vapor impermeable substrate comprises an interior surface of the sleeve; and the second substantially vapor impermeable substrate comprises an exterior surface of the sleeve.

55. The method as described claim 54, wherein the step of bonding the first edge and the second edge further comprises heat sealing the first substantially vapor impermeable substrate along the first edge to the first substantially vapor impermeable substrate along the second edge.

56. The method as described claim 53, wherein the step of bonding the first edge to the second edge further comprises dispensing an adhesive between the first edge and the second edge.

57. The method as described in claim 47, further comprising:
   dividing the insulating microwave packaging material to form a first sheet and a second sheet;
   placing the second substantially vapor impermeable substrate of the first sheet facing the second substantially vapor impermeable substrate of the second sheet; and
   bonding a portion of the first sheet of the insulating microwave packaging material to a portion of the second sheet of the insulating microwave packaging material.

58. The method as described in claim 57, wherein
the first sheet is defined by a first perimeter;
the second sheet is defined by a second perimeter; and
wherein the step of bonding the first sheet to the second sheet further comprises:
bonding the first sheet to the second sheet at a plurality of points spaced apart along the first perimeter and the second perimeter, wherein,
the first sheet and the second sheet are substantially unrestricted from contraction in at least one of the X and Y directions, and wherein
upon impingement of the insulating microwave packaging material by microwave energy in the microwave oven,
the microwave interactive material layer creates sensible heat that further heats the second substantially vapor impermeable substrate of each of the first sheet and the second sheet, and
the second substantially vapor impermeable substrate of each of the first sheet and the second sheet contracts in at least one of the X and Y directions, enhancing the loft of the bulging side of each of the insulating pockets.

59. The method as described in claim 58, wherein
when the food product is situated over at least a portion of the first sheet, and
the second sheet is situated against a surface of the microwave oven,
upon impingement of the insulating microwave packaging material by microwave energy in the microwave oven, the microwave interactive material layer of the second sheet heats the surface of the microwave oven and the first sheet,
counteracting the heat transfer between the food product and the surface of the microwave oven;
augmenting the contraction of the second substantially vapor impermeable substrate of the first sheet; and
enhancing the expansion of each of the plurality of closed cells of the first sheet.

60. The method as described in claim 57, wherein upon impingement of the insulating microwave packaging material by microwave energy in the microwave oven,
the first sheet deforms into a convex canopy with respect to a plane dividing the first sheet and the second sheet; and
a space is created between the first sheet and the second sheet.

61. The method as described in claim 57, wherein upon impingement of the insulating microwave packaging material by microwave energy in the microwave oven,
the second sheet deforms into a convex canopy with respect to a plane dividing the first sheet and the second sheet; wherein
a space is created between the first sheet and the second sheet.

62. The method as described in claim 47, further comprising:
dividing the insulating microwave packaging material to form a first sheet and a second sheet, wherein
the first sheet is defined by a first perimeter, and
the second sheet is defined by a second perimeter;
placing the first substantially vapor impermeable substrate of the first sheet facing the first substantially vapor impermeable substrate of the second sheet; and
bonding at least a portion of the first perimeter to at least a portion of the second perimeter creating a cavity between the first sheet and the second sheet for receiving a food product.

63. The method as described in claim 62 further comprising forming an opening to the cavity between the first sheet and the second sheet.

64. The method as described in claim 63, wherein the opening is large enough to accept the food product, and the cavity comprises a pouch.

65. The method as described in claim 63, wherein the opening is a vent to allow water vapor to escape from the cavity during cooking of the food product.

66. The method as described in claim 62, wherein the step of bonding at least a portion of the first perimeter to at least a portion of the second perimeter further comprises bonding all of the first perimeter to all of the second perimeter, wherein the food product in the cavity is completely enclosed by the first sheet and the second sheet.

67. The method as described in claim 62, wherein the step of dividing further comprises
dividing the insulating microwave packaging material to form a third sheet, wherein
the third sheet is defined by a third perimeter; and
wherein the method further comprises:
placing the second substantially vapor impermeable substrate of the second sheet facing the second substantially vapor impermeable substrate of the third sheet; and
bonding the third sheet to the second sheet at a plurality of points spaced apart along the third perimeter and the second perimeter; and wherein
when the food product is situated within the cavity, and
the third sheet is situated against a surface of the microwave oven,
upon impingement of the insulating microwave packaging material by microwave energy in the microwave oven, the microwave interactive material layer of the third sheet heats the surface of the microwave oven and the second sheet,
counteracting the heat transfer between the food product and the surface of the microwave oven;
augmenting the contraction of the second substantially vapor impermeable substrate of the second sheet; and
enhancing the expansion of each of the plurality of closed cells of the second sheet.

68. The method as described in claim 47, wherein the first substantially vapor impermeable substrate comprises a biaxially-oriented polyester film.

69. The method as described in claim 47, wherein the second substantially vapor impermeable substrate comprises a biaxially-oriented polyester film.

70. A method of making an insulating microwave packaging material, the method comprising:
providing a first substantially vapor impermeable substrate;
supporting a layer of microwave interactive material on the first substantially vapor impermeable substrate;
bonding a dimensionally stable substrate to the layer of microwave interactive material; and
bonding a second substantially vapor impermeable substrate to the dimensionally stable substrate along bond lines formed in a pattern, wherein
the bond lines are substantially vapor impermeable; and
the pattern defines a plurality of closed cells bounded by the second substantially vapor impermeable substrate, the dimensionally stable substrate, and the bond lines; and wherein,
upon impingement of the insulating microwave packaging material by microwave energy in a microwave oven, each of the plurality of closed cells expands to form an insulating pocket comprising:
a bulging side; and
an opposing side; wherein
the bulging side comprises a portion of the second substantially vapor impermeable substrate;
the opposing side comprises a portion of each of the first substantially vapor impermeable substrate, the microwave interactive material layer, and the dimensionally stable substrate; and
the bulging side lofts away from the opposing side.

71. The insulating microwave packaging material as described in claim 70, wherein when a food product is situated adjacent to the first substantially vapor impermeable substrate, upon impingement of the insulating microwave packaging material by microwave energy in the microwave oven, each of the insulating pockets insulates at least one of the food product and the layer of microwave interactive material from the microwave oven environment to reduce heat transfer from at least one of the food product and the layer of microwave interactive material to the microwave oven environment.

72. The insulating microwave packaging material as described in claim 70, wherein when a food product is situated adjacent to the first substantially vapor impermeable substrate, upon impingement of the insulating microwave packaging material by microwave energy in the microwave oven, each of the insulating pockets insulates at least one of the food product and the layer of microwave interactive material from a consumer's skin to reduce heat transfer from at least one of the food product and the insulating microwave packaging material to the consumer's skin when the consumer removes the insulating microwave packaging material from the microwave oven after cooking.

73. The method as described claim 70, wherein upon impingement of the insulating microwave packaging material by microwave energy in the microwave oven, the microwave interactive material layer creates sensible heat that further heats and softens the second substantially vapor impermeable substrate decreasing resistance of the second substantially vapor impermeable substrate to the formation of the insulating pocket.

74. The method as described in claim 70, wherein the second substantially vapor impermeable substrate comprises an amorphous polyester film.

75. The method as described claim 47 or 70, wherein upon impingement of the insulating microwave packaging material by microwave energy in the microwave oven, moisture trapped in the dimensionally stable substrate heats and expands as a vapor, creating pressure, which forms the insulating pocket.

76. The method as described claim 47 or 70, wherein upon impingement of the insulating microwave packaging material by microwave energy in the microwave oven, the microwave interactive material layer creates sensible heat that further heats moisture trapped in the dimensionally stable substrate, which moisture expands as a vapor, creating pressure, which forms the insulating pocket.

77. The method as described claim 47 or 70, wherein upon impingement of the insulating microwave packaging material by microwave energy in the microwave oven, the opposing side remains substantially flat.

78. The method as described claim 47 or 70, wherein upon impingement of the insulating microwave packaging material by microwave energy in the microwave oven, the microwave interactive material layer becomes insulated from the microwave oven environment to reduce heat transfer from the microwave interactive material layer to the microwave oven environment.

79. The method as described in claim 47 or 70, wherein the pattern comprises an array of shapes selected from a group comprising: a circle, an oval, a curvilinear shape, a symmetrical curvilinear shape, a triangle, a square, a rectangle, a polygon, a right polygon, and an equilateral polygon.

80. The method as described in claim 79, wherein the equilateral polygon is a hexagon.

81. The method as described in claim 79, wherein each of the shapes in the array is nested with each adjacent shape in the array in a tile-like pattern.

82. The method as described in claim 79, wherein each of the shapes in the array is elongate and oriented parallel to adjacent shapes.

83. The method as described in claim 47 or 70, wherein the microwave interactive material layer comprises aluminum.

84. The method as described in claim 47 or 70, wherein the dimensionally stable substrate is selected from a group comprising: paper, paperboard, and plastic.

85. The method as described in claim 47 or 70, wherein the step of bonding the second substantially vapor impermeable substrate and the dimensionally stable substrate further comprises dispensing an adhesive along the bond lines.

86. The method as described in claim 85, wherein the adhesive penetrates the dimensionally stable substrate to form a substantially vapor impermeable barrier in conjunction with the first substantially vapor impermeable substrate.

87. The method as described in claim 47 or 70 further comprising the step of inactivating portions of the microwave interactive material in the same pattern as the bond lines.

88. The method as described in claim 47 or 70, wherein the step of bonding the second substantially vapor impermeable substrate and the dimensionally stable substrate further comprises heat sealing the substantially vapor impermeable substrate to the dimensionally stable substrate along the bond lines.

89. The method as described in claim 88, wherein the step of heat sealing further comprises melting the second substantially vapor impermeable substrate along the bond lines, wherein a melted portion of the second substantially vapor impermeable substrate penetrates the dimensionally stable substrate to form a substantially vapor impermeable barrier in conjunction with the first substantially vapor impermeable substrate.

90. A microwavable baking surface comprising:
a baking substrate containing an aperture;
a first sheet of an insulating microwave packaging material; and
a second sheet of the insulating microwave packaging material; wherein
the first sheet and the second sheet are arranged adjacent to each other and substantially cover the aperture; and
the insulating microwave packaging material comprises:
a first substantially vapor impermeable substrate;
a layer of microwave interactive material supported by the first substantially vapor impermeable substrate;
a dimensionally stable substrate bonded to the layer of microwave interactive material; and
a second substantially vapor impermeable substrate bonded to the dimensionally stable substrate, wherein the second substantially vapor impermeable substrate and the dimensionally stable substrate are bonded along bond lines formed in a pattern;
the bond lines are substantially vapor impermeable; and
the pattern defines a plurality of closed cells bounded by the first substantially vapor impermeable substrate, the dimensionally stable substrate, and the bond lines; wherein
upon impingement of the insulating microwave packaging material by microwave energy in a microwave oven, each of the plurality of closed cells expands to form an insulating pocket comprising:
a bulging side; and
an opposing side; wherein
the bulging side comprises a portion of each of the first substantially vapor impermeable substrate, the microwave interactive material layer, and the dimensionally stable substrate;
the opposing side comprises a portion of the second substantially vapor impermeable substrate; and
the bulging side lofts away from the opposing side.

91. The microwavable baking surface as described in claim 90, wherein when a food product is situated adjacent to the first sheet, upon impingement of the insulating microwave packaging material by microwave energy in the microwave oven, each of the insulating pockets of the second sheet insulates at least one of the food product and the first sheet from the microwave oven environment to reduce heat transfer from at least one of the food product and the layer of microwave interactive material of the first sheet to the microwave oven environment.

92. The microwavable baking surface as described in claim 90, wherein the second substantially vapor impermeable substrate of the first sheet faces the second substantially vapor impermeable substrate of the second sheet.

93. The microwavable baking surface as described in claim 92, wherein the baking substrate further comprises:
a top side; and
a bottom side; and wherein
the first sheet is defined by a first perimeter;
the second sheet is defined by a second perimeter;
a portion of the second substantially vapor impermeable substrate of the first sheet along the first perimeter is bonded to the top side of the baking substrate; and
a portion of the second substantially vapor impermeable substrate of the second sheet along the second perimeter is bonded to the bottom side of the baking substrate.

94. The microwavable baking surface as described in claim 93, wherein the bond between the portion of the second substantially vapor impermeable substrate of the first sheet and the top side of the baking substrate and the bond between the portion of the second substantially vapor impermeable substrate of the second sheet and the bottom side of the baking substrate comprise a temperature sensitive adhesive, and wherein
upon impingement of the insulating microwave packaging material by microwave energy in the microwave oven,
the microwave interactive material layer of each of the first sheet and the second sheet creates sensible heat that further heats the temperature sensitive adhesive;
the temperature sensitive adhesive decomposes at a certain temperature, releasing the bonds; and
the second substantially vapor impermeable substrate of each of the first sheet and the second sheet contracts in at least one of the X and Y directions, enhancing the loft of the bulging side of each of the insulating pockets.

95. The microwavable baking surface as described in claim 92, wherein, upon impingement of the insulating microwave packaging material by microwave energy in the microwave oven,
the first sheet deforms into a convex canopy with respect to a plane dividing the first sheet and the second sheet; and
a space is created between the first sheet and the second sheet.

96. The microwavable baking surface as described in claim 92, wherein, upon impingement of the insulating microwave packaging material by microwave energy in the microwave oven,
the second sheet deforms into a convex canopy with respect to a plane dividing the first sheet and the second sheet; wherein
a space is created between the first sheet and the second sheet.

97. The microwavable baking surface as described claim 90, wherein,
upon impingement of the insulating microwave packaging material by microwave energy in the microwave oven,
the microwave interactive material layer of each of the first sheet and the second sheet creates sensible heat that further heats the second substantially vapor impermeable substrate of each of the first sheet and the second sheet; and
the second substantially vapor impermeable substrate of each of the first sheet and the second sheet contracts in at least one of the X and Y directions, enhancing the loft of the bulging side of each of the insulating pockets.

98. The microwavable baking surface as described in claim 97, wherein
when the food product is situated over at least a portion of the first sheet, and
the second sheet is situated against a surface of the microwave oven,
upon impingement of the insulating microwave packaging material by microwave energy in the microwave oven,
the microwave interactive material layer of the second sheet heats the surface of the microwave oven and the first sheet,
counteracting the heat transfer between the food product and the surface of the microwave oven;
augmenting the contraction of the second substantially vapor impermeable substrate of the first sheet; and
enhancing the expansion of each of the plurality of closed cells of the first sheet.

99. The microwavable baking surface as described in claim 90, wherein, upon impingement of the insulating microwave packaging material by microwave energy in the microwave oven, the opposing side remains substantially flat.

100. The microwavable baking surface as described claim 90, wherein, upon impingement of the insulating microwave packaging material by microwave energy in the microwave oven, a distance between the second vapor impermeable substrate and the dimensionally stable substrate in a center of each of the plurality of closed cells of at least one of the first sheet and the second sheet increases by at least an order of magnitude more than the distance before such impingement.

101. The microwavable baking surface as described claim 90, wherein, upon impingement of the insulating microwave packaging material by microwave energy in the microwave oven, a distance between the second vapor impermeable substrate and the dimensionally stable substrate in a center of each of the plurality of closed cells of at least one of the first sheet and the second sheet increases by up to 30 times more than the distance before such impingement.

102. The microwavable baking surface as described in claim 90, wherein the pattern comprises an array of shapes selected from the group comprising: a circle, an oval, a curvilinear shape, a symmetrical curvilinear shape, a triangle, a square, a rectangle, a polygon, a right polygon, and an equilateral polygon.

103. The microwavable baking surface as described in claim 102, wherein the equilateral polygon is a hexagon.

104. The microwavable baking surface as described in claim 102, wherein each of the shapes in the array is nested with each adjacent shape in the array in a tile-like pattern.

105. The microwavable baking surface as described in claim 90, wherein the baking substrate comprises paperboard.

106. The microwavable baking surface as described in claim 90, wherein the baking substrate comprises a susceptor.

107. The microwavable baking surface as described in claim 90, wherein the baking substrate comprises an abuse-tolerant microwave packaging material.

108. The microwavable baking surface as described in claim 90, wherein the baking substrate is disk-shaped.

109. The microwavable baking surface as described in claim 108, wherein the aperture is circular and concentric with the baking surface.

110. The microwavable baking surface as described in claim 90, wherein the food product is a frozen pizza.

111. The microwavable baking surface as described in claim 90, wherein the first substantially vapor impermeable substrate comprises a biaxially-oriented polyester film.

112. The microwavable baking surface as described in claim 90, wherein the second substantially vapor impermeable substrate comprises a biaxially-oriented polyester film.

113. The microwavable baking surface as described in claim 90, wherein the microwave interactive material layer comprises aluminum.

114. The microwavable baking surface as described in claim 90, wherein the dimensionally stable substrate is selected from a group comprising: paper, paperboard, and plastic.

115. The microwavable baking surface as described in claim 90, wherein the bond lines comprise an adhesive.

116. The microwavable baking surface as described in claim 115, wherein the adhesive penetrates the dimensionally stable substrate to form a substantially vapor impermeable barrier in conjunction with the first substantially vapor impermeable substrate.

117. The microwavable baking surface as described in claim 90, wherein the bond lines comprise a heat seal.

118. The microwavable baking surface as described in claim 117, wherein the heat seal is formed by melting the second substantially vapor impermeable substrate along the bond lines, and wherein a melted portion of the second substantially vapor impermeable substrate penetrates the dimensionally stable substrate to form a substantially vapor impermeable barrier in conjunction with the first substantially vapor impermeable substrate.

119. A microwave package comprising:
a carton form comprising:
a base with a central fold line;
a first side wall hinged to the base along a first fold line; and
a second side wall hinged to the base along a second fold line; and
a pouch comprising microwave interactive material, the pouch supported by the carton form; wherein
the pouch is positioned between the base, the first side wall, and the second side wall of the carton form;
the carton form and the pouch may be alternately folded flat and erected to open the pouch; and wherein
when the carton form is erected by opening the folded base into a V-form, the base may be inverted and the carton form is braced open by the base which is held open in tension between the first side wall and the second side wall.

120. The microwave package of claim 119, wherein the first fold line and the second fold line are convexly curved so that, upon inverting, the base of the carton form assumes a concavely curved form with the first side wall and the second side wall of the carton form bowed or convexly curved.

121. The microwave package of claim 119, wherein the pouch is affixed to at least one of the first side wall and the second side wall of the carton form.

122. The microwave package of claim 119, wherein the microwave interactive material comprises insulating microwave packaging material according to claim 1.

123. A microwave cooking container comprising:
a first end, wherein the first end contains a first aperture;
a second end, wherein the second end contains a second aperture; and
a body, wherein the body comprises a microwave interactive material; and wherein
a food product is at least partially surrounded by the body;
the first end provides a foundation for maintaining the container in an upright position when the first end is placed upon a surface;
the first aperture in the first end is exposed to a source of air in a cooking environment when the first end is placed upon a surface; and
a draft is created during a cooking cycle in a microwave oven wherein air is ported through the first aperture and vented through the second aperture.

124. The microwave cooking container of claim 123, wherein the microwave interactive material comprises an insulating microwave interactive material according to claim 1.

125. The microwave cooking container of claim 123, wherein the microwave interactive material comprises an insulating microwave interactive material according to claim 27.

126. The microwave cooking container of claim 123, wherein the body further comprises an exterior surface; and
the exterior surface further comprises an insulating material that reduces heat transfer from the container to a consumer touching the container.

127. The microwave cooking container of claim 123, wherein the body further comprises an interior surface; and
at least a first portion of the interior surface further comprises the microwave interactive material.

128. The microwave cooking container of claim 127, wherein a second portion of the interior surface of the body does not comprise the microwave interactive material; and the body further comprises an exterior surface;
    wherein a portion of the exterior surface opposite the second portion of the interior surface reduces the heat transfer from the container to a consumer touching the container.

129. The microwave cooking container of claim 128, wherein the portion of the exterior surface opposite the second portion of the interior surface is frusto-conical in shape.

130. The microwave cooking container of claim 123, wherein
    the body further comprises an upper portion having the first end and a lower portion having the second end;
    the upper portion and the lower portion are each of separate construction; and
    the upper portion is attached to the lower portion at a common interface between the upper portion and the lower portion.

\* \* \* \* \*